US011614746B2

(12) United States Patent
Fong et al.

(10) Patent No.: US 11,614,746 B2
(45) Date of Patent: Mar. 28, 2023

(54) MOBILE CLEANING ROBOT TEAMING AND PERSISTENT MAPPING

(71) Applicant: iRobot Corporation, Bedford, MA (US)

(72) Inventors: Philip Fong, South Pasadena, CA (US); Clifton Eric Smith, Stow, MA (US); Mario Munich, Bedford, MA (US); Stephen Ernest O'Dea, Bedford, MA (US)

(73) Assignee: iRobot Corporation, Bedford, MA (US)

( * ) Notice: Subject to any disclaimer, the term of this patent is extended or adjusted under 35 U.S.C. 154(b) by 1108 days.

(21) Appl. No.: 15/863,681

(22) Filed: Jan. 5, 2018

(65) Prior Publication Data

US 2019/0212752 A1 Jul. 11, 2019

(51) Int. Cl.
*G05D 1/02* (2020.01)
*A47L 11/40* (2006.01)
(Continued)

(52) U.S. Cl.
CPC .......... *G05D 1/0274* (2013.01); *A47L 9/2815* (2013.01); *A47L 9/2826* (2013.01);
(Continued)

(58) Field of Classification Search
CPC .. G05D 1/0274; G05D 1/0234; G05D 1/0297; G05D 1/0219; G05D 2201/0203; G06K 9/00; G06K 9/6267; G06K 9/00691; A47L 9/2826; A47L 9/2857; A47L 9/2815; A47L 11/4011; A47L 2201/022;
(Continued)

(56) References Cited

U.S. PATENT DOCUMENTS 8,433,442 B2 * 4/2013 Friedman ............. G05D 1/0274
700/245
2002/0095239 A1 * 7/2002 Wallach ............... G05D 1/0274
700/245
(Continued)

FOREIGN PATENT DOCUMENTS

CN 101953172 1/2011
CN 105843228 8/2016
(Continued)

OTHER PUBLICATIONS

Translation of Foreign Patent Document JP2014054335 (Year: 2012).*
(Continued)

*Primary Examiner* — Jeff A Burke
*Assistant Examiner* — Kyle T Johnson
(74) *Attorney, Agent, or Firm* — Fish & Richardson P.C.

(57) ABSTRACT

A multi-robot system includes a first a mobile cleaning robot that has a local storage device to store a persistent map of an environment, at least one sensor to sense the environment, and a control module. The control module is configured to: control the mobile cleaning robot to navigate in the environment using the persistent map and sensing data provided by the at least one sensor, share the persistent map with a second mobile cleaning robot, and coordinate with the second mobile cleaning robot to perform cleaning tasks.

30 Claims, 24 Drawing Sheets

(51) Int. Cl.
A47L 9/28 (2006.01)
G06K 9/00 (2022.01)

(52) U.S. Cl.
CPC ......... *A47L 9/2857* (2013.01); *A47L 11/4011* (2013.01); *G05D 1/0219* (2013.01); *G05D 1/0234* (2013.01); *G05D 1/0297* (2013.01); *G06K 9/00* (2013.01); *A47L 2201/022* (2013.01); *A47L 2201/024* (2013.01); *A47L 2201/04* (2013.01); *A47L 2201/06* (2013.01); *G05D 2201/0203* (2013.01)

(58) Field of Classification Search
CPC ............. A47L 2201/04; A47L 2201/06; A47L 2201/024; A47L 2201/00; A47L 11/4008; A47L 11/4061; A47L 11/40; A47L 11/24
See application file for complete search history.

(56) References Cited

U.S. PATENT DOCUMENTS

| | | | |
|---|---|---|---|
| 2007/0250212 | A1* | 10/2007 | Halloran ................ A47L 5/30 700/245 |
| 2012/0165978 | A1 | 6/2012 | Li et al. |
| 2015/0148951 | A1 | 5/2015 | Jeon et al. |
| 2015/0223659 | A1* | 8/2015 | Han ..................... G05D 1/0246 134/18 |
| 2016/0320774 | A1* | 11/2016 | Kuhara ............... G05D 1/0027 |
| 2017/0083005 | A1 | 3/2017 | Hickman et al. |
| 2017/0361468 | A1 | 12/2017 | Cheuvront et al. |
| 2018/0073266 | A1* | 3/2018 | Goldenberg .............. B25J 3/00 |
| 2018/0317725 | A1 | 11/2018 | Lee et al. |
| 2018/0344114 | A1* | 12/2018 | Scholten ............. A47L 11/4011 |
| 2019/0212752 | A1* | 7/2019 | Fong .................... A47L 9/2857 |

FOREIGN PATENT DOCUMENTS

| | | |
|---|---|---|
| JP | 2003180587 | 7/2003 |
| JP | 2014054335 | 3/2014 |
| JP | 2015082193 | 4/2015 |
| JP | 2015172878 | 10/2015 |
| JP | 2015205167 | 11/2015 |
| JP | 2016186748 | 10/2016 |
| JP | 2016201095 | 12/2016 |
| JP | 2016212462 | 12/2016 |
| JP | 2017142659 | 8/2017 |
| JP | 2017199190 | 11/2017 |
| WO | WO 2009/102970 | 8/2009 |
| WO | WO 2017/073955 | 5/2017 |

OTHER PUBLICATIONS

Angra et al., "Machine Learning and its Applications: A Review," 2017 International Conference on Big Data Analytics and Computational Intelligence (ICBDAC), Mar. 23-25, 2017, 4 pages.

Bagnell et al., "Learning for Autonomous Navigation," IEEE Robotics & Automation Magazine, Jun. 2010, 11 pages.

Ellis et al., "Autonomous Navigation and Sign Detector Learning," 2013 IEEE Workshop on Robot Vision (WORV), Jan. 15-17, 2013, 8 pages.

Fromm et al., "Robust Multi-Algorithm Object Recognition Using Machine Learning Methods," 2012 IEEE International Conference on Multisensor Fusion and Integration for Intelligent Systems (MFI) Sep. 13-15, 2012. Hamburg, Germany, 8 pages.

Golding et al., "Indoor navigation using a diverse set of cheap, wearable sensors," Digest of Papers. Third International Symposium on Wearable Computers, Oct. 18-19, 1999, 8 pages.

Howard et al., "MobileNets: Efficient Convolutional Neural Networks for Mobile Vision Applications," Joshua's Blog, retrieved from the Internet <https://joshua19881228.github.io/2017-07-19-MobileNet/>, retrieved on Nov. 15, 2018, 7 pages.

LeCun et al., "Learning Methods for Generic Object Recognition with Invariance to Pose and Lighting," Proceedings of the 2004 IEEE Computer Society Conference on Computer Vision and Pattern Recognition, 2004. CVPR 2004, Jun. 27-Jul. 2, 2004, 8 pages.

Louridas et al., "Machine Learning," IEEE Software, vol. 33 Issue 5 • Sep.-Oct. 2016, 6 pages.

Malowany et al., "Visual Reinforcement Learning for Object Recognition in Robotics," 2016 ICSEE International Conference on the Science of Electrical Engineering, Jan. 1995, 14(1):1-5.

Moore et al., "Efficient Memory-based Learning for Robot Control," Dissertation submitted for the degree of Doctor of Philosophy in the University of Cambridge, Oct. 1990, 42 pages.

Murase et al., "Visual Learning and Recognition of 3-D Objects from Appearance," International Journal of Computer Vision, 1995, 14:5-24.

Paletta et al., "Active object recognition by view integration and reinforcement learning," Robotics and Autonomous Systems, 2000, 31:71-86.

Pontil et al. "Support Vector Machines for 3D Object Recognition," IEEE Transactions on Pattern Analysis and Machine Intelligence, Jun. 1998, 20(6):637-646.

Stauffer et al., "Learning Patterns of Activity Using Real-Time Tracking," IEEE Transactions on Pattern Analysis and Machine Intelligence, Aug. 2000, 22(8):747-757.

Thrun, "Learning metric-topological maps for indoor mobile robot navigation," Artificial Intelligence, 1998, 99:21-71.

Tsutsumi et al., "Hybrid Approach of Video Indexing and Machine Learning for Rapid Indexing and Highly Precise Object Recognition," Proceedings 2001 International Conference on Image Processing (Cat. No. 01CH37205), Oct. 7-10, 2001, 4 pages.

Viola et al., "Rapid Object Detection using a Boosted Cascade of Simple Features," Proceedings of the 2001 IEEE Computer Society Conference on Computer Vision and Pattern Recognition. CVPR 2001, Dec. 8-14, 2001, 8 pages.

Xu et al., "Extreme Learning Machine Based Fast Object Recognition," 2012 15th International Conference on Information Fusion, Jul. 9-12, 2012, 7 pages.

Zuo et al., "A Reinforcement Learning Based Robotic Navigation System," 2014 IEEE International Conference on Systems, Man, and Cybernetics, Oct. 5-8, 2014, San Diego, CA, USA, 6 pages.

Partial European Search Report for European Application No. 18206728.0, dated Apr. 26, 2019, 12 pages.

European Search Report in European Application No. 18206728.0, dated Jul. 30, 2019, 10 pages.

* cited by examiner

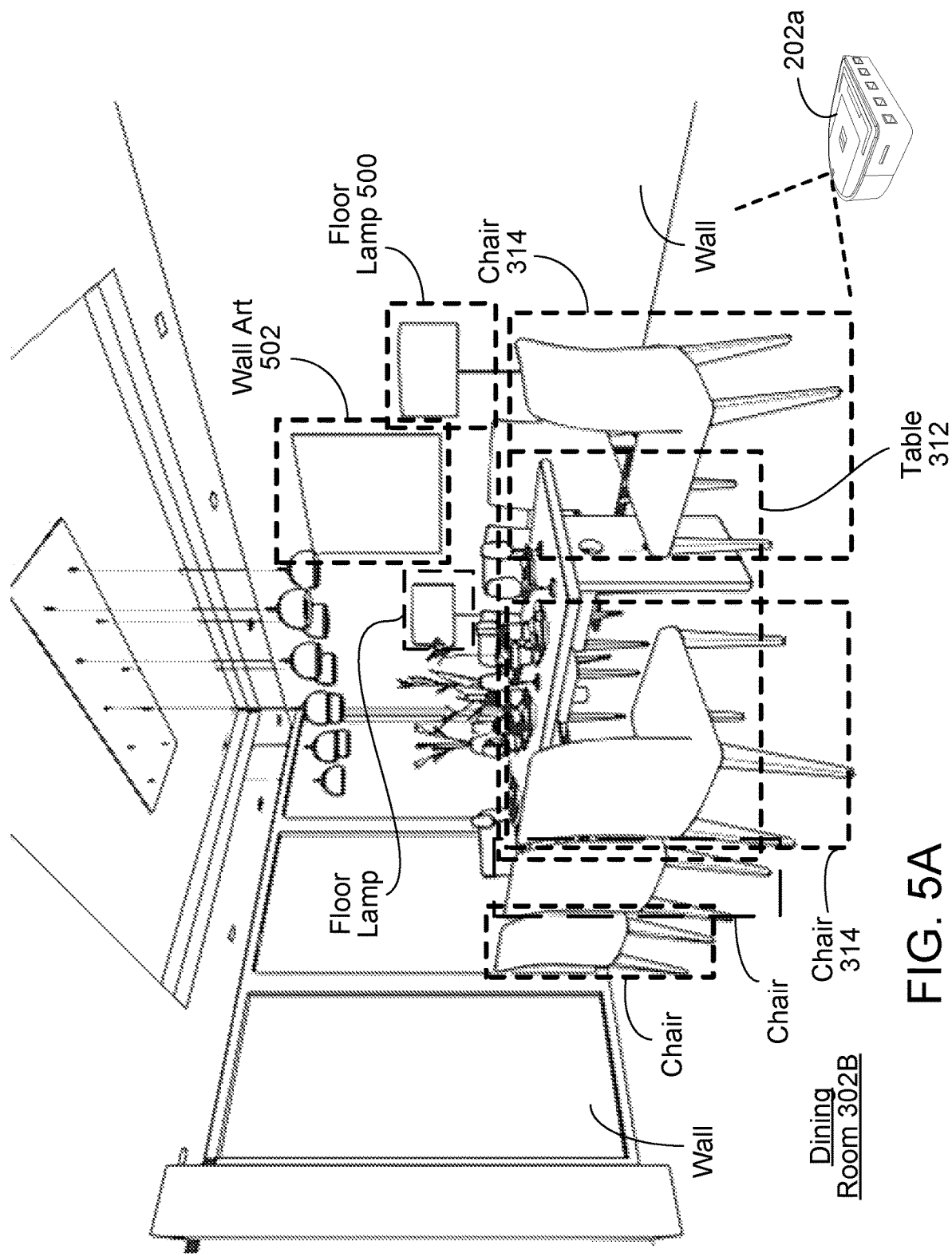

MOBILE CLEANING ROBOT TEAMING AND PERSISTENT MAPPING

TECHNICAL FIELD

The description relates to a mobile cleaning robot teaming and persistent mapping.

BACKGROUND

Many home environments include mobile robots that autonomously navigate through the home and perform cleaning operations within defined areas using programs stored in memories coupled to controllers. A cleaning robot can clean a home without the need for the user to manually move the cleaning robot about the home. The cleaning robot can include a manual input device, e.g., a button that the user presses to initiate the autonomous cleaning operation within the home. The cleaning robot establishes a map of the areas that it has traveled. After the robot determines that it has covered most of the floor areas of the room, the robot returns to a charging station to recharge and waits for the next scheduled cleaning session. For example, each time the robot leaves the charging station to perform a new cleaning task, the robot generates a new map as the robot navigates within the home to perform the new cleaning task. When there are multiple robots in the home, each robot establishes its own map as it navigates within the home to perform its assigned tasks.

SUMMARY

In a general aspect, a system including a mobile cleaning robot having teaming capabilities is provided. The mobile cleaning robot includes a local storage device to store a persistent map of an environment; at least one sensor to sense the environment; and a control module. The control module is configured to: control the mobile cleaning robot to navigate in the environment using the persistent map and sensing data provided by the at least one sensor, share the persistent map with a second mobile cleaning robot, and coordinate with the second mobile cleaning robot to perform cleaning tasks.

Implementations of the system can include one or more of the following features. The control module can be configured to: control the at least one sensor to sense the environment to identify a set of features in the environment, update the persistent map to add representations of the features sensed by the at least one sensor that are not already on the persistent map, and share the updated persistent map with the second mobile cleaning robot.

The mobile cleaning robot can be configured to perform multiple cleaning sessions, and prior to the start of each cleaning session, receive at least one of a version of the persistent map or a persistent map update from a remote storage device, and perform at least one of (i) store the received persistent map in the local storage device, or (ii) update a locally stored persistent map using the received persistent map update. The mobile cleaning robot can be configured to, during each cleaning session, localize the first mobile cleaning robot on the persistent map, sense features in the environment, update the persistent map to add representations of the features sensed by the first mobile cleaning robot that are not already on the map, and store the updated persistent map in the remote storage device.

In another general aspect, a system including a server computer to facilitate teaming of multiple mobile robots is provided. The system includes a storage device configured to store at least one of multiple versions of a persistent map of an environment or multiple versions of persistent map updates for the environment. The system includes one or more data processors configured to execute instructions to perform: managing the at least one of the multiple versions of the persistent map or multiple versions of the persistent map updates; upon receiving a request from a first mobile cleaning robot requesting access to the persistent map or the persistent map update, providing one of the versions of the persistent map or the persistent map update to the first mobile cleaning robot; and upon receiving a request from a second mobile cleaning robot requesting access to the persistent map or the persistent map update, providing one of the versions of the persistent map or the persistent map update to the second mobile cleaning robot.

Implementations of the system can include one or more of the following features. The server computer can be configured to provide a latest version of the persistent map or the persistent map update to each of the mobile cleaning robot upon receiving the request from the mobile cleaning robot.

The server computer can be configured to receive an updated persistent map or a persistent map update from the first mobile cleaning robot, and provide an updated persistent map or a persistent map update to the second mobile cleaning robot upon receiving the request from the second mobile cleaning robot.

The server computer can be configured to receive a first updated persistent map or a first persistent map update from the first mobile cleaning robot, receive a second updated persistent map or a second persistent map update from the second mobile cleaning robot, and merge (i) the first updated persistent map or the first persistent map update with (ii) the second updated persistent map or the second persistent map update, to generate a new version of the persistent map or the persistent map update.

In another general aspect, a system of mobile cleaning robots having teaming capabilities is provided. The system includes a first mobile cleaning robot configured to navigate in an environment and perform a first set of cleaning tasks, and a second mobile cleaning robot configured to navigate in the environment and perform a second set of cleaning tasks. The first mobile cleaning robot and the second mobile cleaning robot are configured to share a persistent map for navigation, and coordinate with each other when performing the first set of cleaning tasks and the second set of cleaning tasks.

Implementations of the system can include one or more of the following features. The first mobile cleaning robot and the second mobile cleaning robot can communicate directly with each other to coordinate performance of the first set of cleaning tasks and the second set of cleaning tasks.

The system can include a central server, in which each of the first mobile cleaning robot and the second mobile cleaning robot communicates with the central server, and the central server can coordinate the first mobile cleaning robot and the second mobile cleaning robot in performing the first set of cleaning tasks and the second set of cleaning tasks.

The first mobile cleaning robot can be configured to perform a first cleaning task that cleans a first portion of the environment, end the cleaning task at a first location, and provide coordinates of the first location to the second mobile cleaning robot. The second mobile cleaning robot can be configured to, upon receiving the coordinates of the first location, perform a second cleaning task starting from the first location, the second cleaning task involving cleaning a second portion of the environment, e.g., skipping the first portion that has been cleaned by the first mobile cleaning robot and proceed to clean the second portion that was not cleaned by the first mobile cleaning robot.

The first mobile cleaning robot and the second mobile cleaning robot can be configured to perform a first cleaning task and a second cleaning task, respectively, in parallel, in which the first cleaning task can involve cleaning a first portion of the environment, and the second cleaning task can involve cleaning a second portion of the environment.

The first mobile cleaning robot can have a first type of cleaning head, and the second mobile cleaning robot can have a second type of cleaning head. The first mobile cleaning robot can be configured to clean a first region in the environment using the first type of cleaning head, send a message indicating that the first region has been cleaned, and clean a second region in the environment after cleaning the first region. The second mobile cleaning robot can be configured to, after receive a message indicating that the first region has been cleaned, clean the first region using the second type of cleaning head while the first mobile cleaning robot cleans the second region.

The system can include a server computer configured to manage multiple versions of the persistent map or multiple versions of persistent map updates, in which the server computer has a storage device to store the multiple versions of the persistent map or the multiple versions of persistent map updates. The server computer can be configured to, upon receiving a request from the first mobile cleaning robot requesting access to the persistent map or the persistent map update, provide one of the versions of the persistent map or the persistent map update to the first mobile cleaning robot. The server computer can be configured to, upon receiving a request from the second mobile cleaning robot requesting access to the persistent map or the persistent map update, provide one of the versions of the persistent map or the persistent map update to the second mobile cleaning robot.

The server computer can be configured to provide a latest version of the persistent map or the persistent map update to the first mobile cleaning robot upon receiving the request from the first mobile cleaning robot.

The server computer can be configured to receive an updated persistent map or a persistent map update from the first mobile cleaning robot, and provide an updated persistent map or a persistent map update to the second mobile cleaning robot upon receiving the request from the second mobile cleaning robot.

The server computer can be configured to receive a first updated persistent map or a first persistent map update from the first mobile cleaning robot, receive a second updated persistent map or a second persistent map update from the second mobile cleaning robot, and merge (i) the first persistent map or the first persistent map update with (ii) the second updated persistent map or the second persistent map update, to generate a new version of a persistent map or a persistent map update.

In another general aspect, a system of mobile cleaning robots having teaming capabilities is provided. The system includes a first mobile cleaning robot having at least one sensor; and a first control module configured to: generate or receive a map of an environment, control the first mobile cleaning robot to navigate in the environment using the map and perform a cleaning task, control the at least one sensor to sense the environment to identify a first set of features in the environment, update the map to add features sensed by the at least one sensor that are not already on the map, and share the updated map with one or more other mobile cleaning robots. The system includes a second mobile cleaning robot having at least one sensor; and a second control module configured to: receive a copy of the updated map shared by the first mobile cleaning robot, control the at least one sensor to sense the environment to identify a second set of features, in which some of the second set of features overlap some of the features already on the map, identify features on the map that correspond to at least some of the features in the second set of features sensed by the at least one sensor, and localize the second mobile cleaning robot on the map based on the features identified on the map, control the second mobile cleaning robot to navigate in the environment using the map, and update the map to add features sensed by the at least one sensor that are not already on the map, and share the updated map with the first mobile cleaning robot.

Implementations of the system can include one or more of the following features. The system can include a remote storage device configured to store one or more versions of the map, in which the first mobile cleaning robot can include a first local storage device to locally store a copy of at least a portion of the map while the first mobile cleaning robot navigates in the environment, the first control module is configured to share the updated map by uploading the updated map to the remote storage device.

The system can include a user interface to enable a user to configure the map stored in the first local storage device to add a keep-out zone to the map to generate an updated map. The first mobile cleaning robot can be configured to upload the updated map to the remote storage device, the second mobile cleaning robot can be configured to download the updated map from the remote storage device, and the second mobile cleaning robot can be configured to perform cleaning tasks taking into account of the keep-out zone.

The remote storage device can include a cloud storage device.

Both the first mobile cleaning robot and the second mobile cleaning robot can access the remote storage device wirelessly.

The first mobile cleaning robot can be configured to perform multiple cleaning sessions, and prior to the start of each cleaning session, retrieve the map from the remote storage device and store the map in the local storage device. The first mobile cleaning robot can be configured to, during each cleaning session, localize the first mobile cleaning robot on the map, sense features in the environment, update the map to add features sensed by the first mobile cleaning robot that are not already on the map, and store the updated map in the remote storage device.

The first and second mobile cleaning robots can be configured to coordinate with each other when performing cleaning tasks.

The first mobile cleaning robot can communicate directly with the second mobile cleaning robot to coordinate performance of the cleaning tasks.

The system can include a central server, in which each of the first and second mobile cleaning robots can communicate with the central server, and the central server can coordinate the first mobile cleaning robot and the second mobile cleaning robot in performing the cleaning tasks.

The first mobile cleaning robot can be configured to perform a first cleaning task that cleans a first portion of the environment, end the cleaning task at a first location, and provide coordinates of the first location to the second mobile cleaning robot. The second mobile cleaning robot can be configured to, upon receiving the coordinates of the first location, perform a second cleaning task starting from the first location, the second cleaning task involving cleaning a second portion of the environment, e.g., skipping the first portion that has been cleaned by the first mobile cleaning robot and proceed to clean the second portion that was not cleaned by the first mobile cleaning robot.

The first mobile cleaning robot and the second mobile cleaning robot can be configured to perform a first cleaning task and a second cleaning task, respectively, in parallel. The first cleaning task can involve cleaning a first portion of the environment, and the second cleaning task can involve cleaning a second portion of the environment.

The first mobile cleaning robot can have a first type of cleaning head, and the second mobile cleaning robot can have a second type of cleaning head. The first mobile cleaning robot can be configured to clean a first region in the environment using the first type of cleaning head, send a message indicating that the first region has been cleaned, and clean a second region in the environment after cleaning the first region. The second mobile cleaning robot can be configured to, after the message indicating that the first region has been cleaned is sent from the first mobile cleaning robot, clean the first region using the second type of cleaning head while the first mobile cleaning robot cleans the second region.

The first mobile cleaning robot and the second mobile cleaning robot can have different capabilities such that a first portion of the environment represented by a first portion of the map is reachable by the first mobile cleaning robot but not by the second mobile cleaning robot.

The at least one sensor can include at least one camera, and the first set of features can include a set of visual landmarks sensed by the at least one camera.

The system can include a computer configured to provide a user interface to enable a user to configure and modify the map.

The user interface can be configured to enable the user to label each of a plurality of rooms in the environment, and the same label for each room is shared by the first mobile cleaning robot and the second mobile cleaning robot.

The user interface can be configured to enable the user to perform at least one of (i) instruct one of the mobile cleaning robots to clean a particular room, or (ii) instruct both the first mobile cleaning robot and the second mobile cleaning robot to clean a particular room in parallel.

The user interface can be configured to enable the user to perform at least one of (i) identify a border, or (ii) modify a border, of each of a plurality of rooms in the environment.

In another general aspect, a system of mobile cleaning robots having teaming capabilities is provided. The system includes a server computer configured to manage access to a persistent map of an environment, the server computer having a storage device to store the persistent map. The system includes a first mobile cleaning robot having a first control module configured to: receive at least a portion of the persistent map of the environment from the server computer, control the first mobile cleaning robot to navigate the environment using the persistent map, and perform first cleaning tasks in the environment. The system includes a second mobile cleaning robot having a second control module configured to: receive at least a portion of the persistent map of the environment from the server computer, navigate the environment using the persistent map, and perform second cleaning tasks in the environment.

Implementations of the system can include one or more of the following features. The first mobile cleaning robot can include a first local storage device to locally store at least a portion of the persistent map while the first mobile cleaning robot navigates in the environment, and the first control module can be configured to update the persistent map based on sensor data and upload the updated persistent map to the server computer.

The system can include a user interface to enable a user to configure the persistent map stored in the first local storage device to add at least one of (i) a keep-out zone, or (ii) a no-touch zone, to the persistent map to generate an updated map. The first mobile cleaning robot can be configured to upload the updated persistent map to the server computer, the second mobile cleaning robot can be configured to download the updated persistent map from the server computer, and the second mobile cleaning robot can be configured to perform cleaning tasks taking into account of the at least one of (i) the keep-out zone, or (ii) the no-touch zone.

In another general aspect, a mobile cleaning robot includes a local storage device; at least one sensor; and a control module. The control module is configured to: receive a persistent map of an environment from a remote storage device and store the persistent map in the local storage device, control the mobile cleaning robot to navigate in the environment using the persistent map and perform a cleaning task, control the at least one sensor to sense the environment to identify a set of features in the environment, update the persistent map to add features sensed by the at least one sensor that are not already on the persistent map, and upload the updated persistent map to the remote storage device.

Implementations of the mobile cleaning robot can include one or more of the following features. The control module can be configured to upload the updated persistent map to a remote storage device that is accessible to one or more other mobile cleaning robots.

The mobile cleaning robot can be configured to perform multiple cleaning sessions, and prior to the start of each cleaning session, receive the persistent map from a remote storage device and store the persistent map in the local storage device. The mobile cleaning robot can be configured to, during each cleaning session, localize the first mobile cleaning robot on the map, sense features in the environment, update the map to add features sensed by the first mobile cleaning robot that are not already on the map, and store the updated map in the remote storage device.

In another general aspect, a method for operating a mobile cleaning robot have teaming capabilities is provided. The method includes storing, at a local storage device of a mobile cleaning robot, a persistent map of an environment; sensing, using at least one sensor of the mobile cleaning robot, the environment to generate sensing data; navigating, using one or more data processors of the mobile cleaning robot, in the environment using the persistent map and the sensing data; sharing the persistent map with a second mobile cleaning robot; and coordinating with the second mobile cleaning robot to perform cleaning tasks.

Implementations of the method can include one or more of the following features. The method can include sensing, using the at least one sensor, the environment to identify a set of features in the environment, updating the persistent map to add representations of the features sensed by the at least one sensor that are not already on the persistent map, and sharing the updated persistent map with the second mobile cleaning robot.

The method can include performing, using the mobile cleaning robot, multiple cleaning sessions, and prior to the start of each cleaning session, receiving at least one of a version of the persistent map or a persistent map update from a remote storage device, and performing at least one of (i)

storing the received persistent map in the local storage device, or (ii) updating a locally stored persistent map using the received persistent map update. The method can include, during each cleaning session, localizing the first mobile cleaning robot on the persistent map, sensing features in the environment, updating the persistent map to add representations of the features sensed by the first mobile cleaning robot that are not already on the map, and storing the updated persistent map in the remote storage device.

In another general aspect, a method for operating a server computer to enable sharing of a persistent map is provided. The method includes storing, at a storage device of a server computer, multiple versions of a persistent map of an environment or multiple versions of persistent map updates for the environment; managing, using one or more data processors of the server computer, the multiple versions of the persistent map or the multiple versions of persistent map updates. Managing the multiple versions of the persistent map or the multiple versions of persistent map updates further includes: upon receiving a request from a first mobile cleaning robot requesting access to the persistent map or the persistent map update, providing one of the versions of the persistent map or the persistent map update to the first mobile cleaning robot. Managing multiple versions of the persistent map or the multiple versions of persistent map updates includes: upon receiving a request from a second mobile cleaning robot requesting access to the persistent map or the persistent map update, providing one of the versions of the persistent map or the persistent map update to the second mobile cleaning robot.

In another general aspect, a method for operating multiple mobile robots that share a persistent map is provided. The method includes performing, using a first mobile cleaning robot, a first set of cleaning tasks; performing, using a second mobile cleaning robot, a second set of cleaning tasks; sharing a persistent map of an environment between the first mobile cleaning robot and the second mobile cleaning robot; navigating the first mobile cleaning robot in the environment using the persistent map; navigating the second mobile cleaning robot in the environment using the persistent map; and coordinating the first mobile cleaning robot and the second mobile cleaning robot in performing the first set of cleaning tasks and the second set of cleaning tasks.

In another general aspect, a method for operating multiple mobile robots that share a map is provided. The method includes at a first mobile cleaning robot, generating or receiving a map of an environment, navigating in the environment using the map and perform a cleaning task, sensing the environment to identify a first set of features in the environment, updating the map to add features sensed by the at least one sensor that are not already on the map, and sharing the updated map with one or more other mobile cleaning robots. The method includes at a second mobile cleaning robot, receiving a copy of the updated map shared by the first mobile cleaning robot; sensing the environment to identify a second set of features, in which some of the second set of features overlap some of the features already on the map; identifying features on the map that correspond to at least some of the features in the second set of features sensed by the at least one sensor, and localizing the second mobile cleaning robot on the map based on the features identified on the map; navigating in the environment using the map; and updating the map to add features sensed by the at least one sensor that are not already on the map, and sharing the updated map with the first mobile cleaning robot.

In another general aspect, a method of operating multiple mobile robots that share a persistent map is provided. The method includes storing a persistent map of an environment in a storage device of the server computer; managing, using the server computer, access to the persistent map; receiving, at a first mobile cleaning robot, at least a portion of the persistent map of the environment from the server computer; navigating the first mobile cleaning robot in the environment using the persistent map; performing, using the first mobile cleaning robot, a first set of cleaning tasks in the environment; receiving, at a second mobile cleaning robot, at least a portion of the persistent map of the environment from the server computer; navigating the second mobile cleaning robot in the environment using the persistent map; and performing, using the second mobile cleaning robot, a second set of cleaning tasks in the environment.

In another general aspect, a method of operating multiple mobile robots that share a persistent map is provided. The method includes receiving, at a mobile cleaning robot, a persistent map of an environment from a remote storage device that is accessible to multiple mobile cleaning robots; storing the persistent map in a local storage device of the mobile cleaning robot; controlling the mobile cleaning robot to navigate in the environment using the persistent map and performing a cleaning task; sensing, using at least one sensor of the mobile cleaning robot, the environment to identify a set of features in the environment; updating the persistent map to add features sensed by the at least one sensor that are not already on the persistent map, and uploading the updated persistent map to the remote storage device to share the updated persistent map with the multiple mobile cleaning robots.

Other features and advantages of the description will become apparent from the following description, and from the claims.

Unless otherwise defined, all technical and scientific terms used herein have the same meaning as commonly understood by one of ordinary skill in the art to which this invention belongs. In case of conflict with patents or patent applications incorporated herein by reference, the present specification, including definitions, will control.

DESCRIPTION OF DRAWINGS

FIG. 5A is a diagram showing a mobile cleaning robot recognizing objects.

DESCRIPTION

In this document, we describe a novel system for enabling two or more mobile robots to collaborate as a team to perform tasks. For example, the two or more mobile robots can be mobile cleaning robots that collaborate to perform cleaning tasks. The teaming of the mobile robots takes into account the characteristics and conditions of the robots and the environment. For example, the scheduling of multiple cleaning robots may take into account of, e.g., the conditions of the debris bins and batteries of the robots. If two mobile cleaning robots collaborate to clean a room, the robots may each start from opposite ends of the room and clean toward the middle portion of the room, instead of both starting from the same end of the room. In some implementations, the mobile robots communicate with each other so that each robot is aware of the conditions of the other robots, such as the locations and the tasks being performed by the other robots. In some implementations, a central controller manages the scheduling of the operations of the robots.

In some implementations, the two or more mobile robots share a persistent map of an environment that is updated over time by the mobile robots as the robots navigate in the environment to perform various tasks. For example, multiple mobile cleaning robots in a home can share a persistent map stored in a home server computer or a cloud storage system in which the persistent map is maintained over several days, weeks, months, or years. Each of the mobile cleaning robots navigates around the home using the persistent map and performs scheduled cleaning tasks. Each mobile cleaning robot uses various sensors to obtain information about the home and can update the persistent map based on new data provided by the sensors. A map merge module receives versions of the persistent map, or versions of updates of the persistent map, from the multiple mobile robots and generates a merged version of the persistent map that can be shared with the mobile robots.

Figure 1:
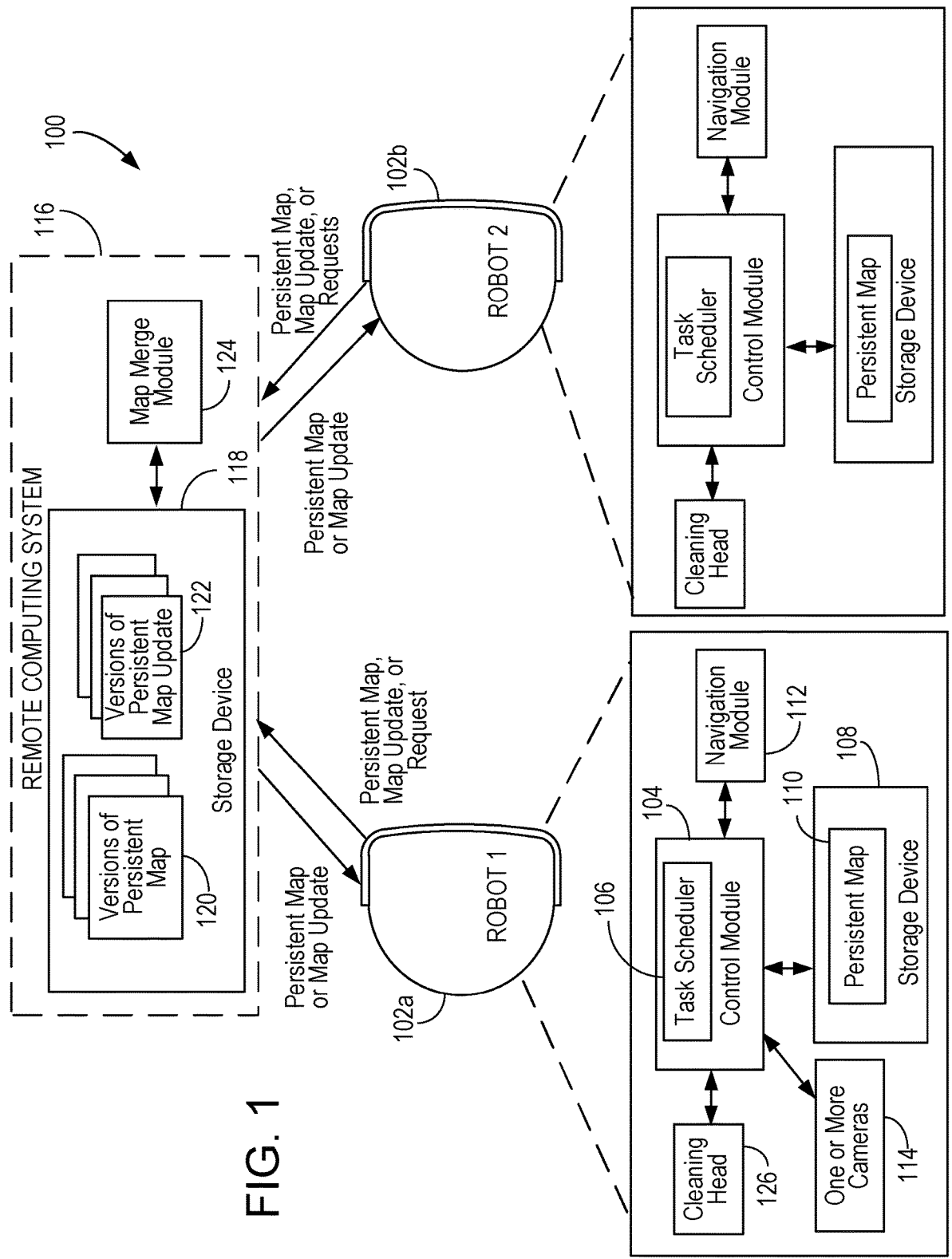
FIGS. 1 and 2 are block diagrams of example systems that enable mobile robot teaming.

Referring to FIG. 1, in some implementations, a multi-robot system 100 includes a first mobile robot 102a and a second mobile robot 102b, collectively referenced as 102. For example, the mobile robots 102a, 102b can be mobile cleaning robots. Each mobile robot 102 includes, e.g., a control module 104 that controls the operations of various components of the robot 102. The control module 104 includes one or more data processors that can execute instructions to perform various operations. The control module 104 includes a task scheduler 106 for scheduling various tasks (such as cleaning tasks) to be performed by the mobile robot 102.

The mobile robot 102 includes a storage device 108 that stores a map 110 used for navigation, and program instructions or program code that can be executed by the one or more data processors of the control module 104. The map 110 can be, e.g., a persistent map. The mobile robot 102 includes a navigation module 112 that enables the mobile robot 102 to navigate in an environment based on the map 110. The mobile robot 102 includes one or more cameras 114 that are configured to capture images of the surroundings, allowing the mobile robot 102 to recognize objects in the images. This enables the mobile robot 102 to perform tasks more intelligently based on an understanding of its surroundings. In examples in which the mobile robot 102 is a mobile cleaning robot, a cleaning head 126 is provided to enable the mobile robot 102 to perform cleaning tasks.

The second mobile robot 102b includes modules similar to those of the first mobile robot 102a.

It is understood that a user of the robots 102a, 102b has approved the robots to collect information about the home to assist the robots in performing tasks in the home. In some implementations, a light indicator may be provided on the robot so that the user knows when a camera of the robot is capturing images of the home, or when a microphone of the robot is capturing audio in the home. One or more switches may be provided on the robot to enable the user to conveniently switch on or off one or more of the sensors, such as the camera or microphone. A user interface on a mobile computing device of the user, such as a mobile phone of the user, can also be used to provide indicators to inform the user whether the sensors, such as the camera and microphone, are activated. The user interface can allow the user to conveniently turn on or off one or more of the sensors, such as the camera or microphone.

The multi-robot system 100 includes a remote computing system 116 that communicates with the mobile robots 102a, 102b. The remote computing system 116 includes a storage device 118 that stores multiple versions of a persistent map 120 and multiple versions of persistent map updates 122. A map merge module 124 analyzes two or more versions of the persistent map (e.g., one version is the current map, and another version is an updated map provided by one of the robots) to generate a merged version of the persistent map that is considered the latest version of the persistent map and can be shared with the mobile robots 102. The map merge module 124 can also analyze two or more versions of persistent map updates (e.g., two persistent map updates sent from two different robots) to generate a merged version of the persistent map that is considered as the latest version of the persistent map and can be shared with the mobile robots 102.

In some implementations, the persistent map 110 or 120 is updated after each operation of the mobile robot 102 to incorporate any new information that is gathered by the robot 102. If the home owner moves a furniture, the change in position of the furniture will be reflected in the persistent map 110. If the home owner closes or opens a door, the information about the open or closed state of the door will also be added to the persistent map 110. If the home owner hangs a new painting in the living room, the robot 102 will see the painting and add that to the map 110. This will help the robot 102 determine its position the next time that the robot 102 is in the living room. The information added to the map across various missions of the robot makes the map richer over time.

The systems 100 and 200 are configured such that if the user 10 makes changes to the map, the system 100 or 200 will honor those changes. For example, the robot 102 may detect a long table in the middle of a room, thinks that the long table is a wall, and determines that there are two rooms on two sides of the wall. The user 10 may revise the map 110 to show that there is actually only one room, and the wall is actually a long table. For example, a thick carpet may prevent the robot 102 from traveling to a region of a room, such that the robot 102 may think that the room ends at the edge of the thick carpet. The user may spend time revising the map 110 to mark the room boundaries correctly and label various objects in the room, so that the map 110 accurately reflects the actual configuration of the home 300.

The systems 100 and 200 keep track of the changes made by the user 10. When the robot 102 navigates in the home 300, it may execute an automatic room segmentation procedure, which may divide the room again, thinking that the long table is a wall. When the map merge module 124 receives updates from the robot 102, if the updates from the robot 102 are not consistent with the information provided by the user 10, the information provided by the user 10 is given more weight.

In some implementations, the map merge module 124 implements a "transfer function" for updating the map 120. The robot starts its mission with a user-defined set of rooms. The robot executes the mission, and then executes the room segmentation algorithm at the end of the mission. This results in two different room segmentations, in which the first room segmentation is the one provided by the user 10 based on an old version of the occupancy grid, and the second room segmentation is based on the new version of the occupancy grid. The merge map module 104 overlays the old room segmentation on top of the new room segmentation to honor all of the edits previously made by the user 10, but also update the room segmentation based on any new information obtained by the robot 102 during the mission. Thus, the merge map module 124 can merge two maps (i.e., the old and new room segmentations) while also honoring the user-made edits to the map.

For example, there may be a "keep-out" zone on the map 110 so that the robot 102 needs to keep out of the area. The map merge module 124 is configured to maintain the keep-out zone in the same place after updating the map 120. In some implementations, the map merge module 124 uses "anchor points," such as corners of a room, that helps place the occupancy grid over it. The map merge module 124 can choose the four corners of the keep-out zone as anchor points, and at the end of each mission the keep-out zone will be placed based on the anchor points.

The map merge module 124 honors the room labels provided by the user. If the user 10 labeled a room as the "Living Room," the map merge module 124 will try to find out which region in the new occupancy grid is the living room and associate it with the label "Living Room."

The persistent map 110 is shared between the robots 102a, 102b. The persistent map 110 can be considered a database of information about the environment, such as a home. Thus, the system 100 enables a single database that is shared among multiple robots. This allows the user to edit the map once, such as segmenting and labeling rooms, and the edits will propagate to the maps used by the multiple robots. When one robot learns that something in the home has changed, the other robot will automatically inherit that new knowledge. For example, a first robot may be able to travel on carpet, while a second robot may not be able to travel on the carpet. When the first robot navigates in the home, it may detect a carpet in a region of the home. The first robot can update the map 110 to show that there is a carpet in a particular region. When the second robot navigates in the home, it will know there is a carpet in a particular region and avoid going to that region. The persistent map can show floor types of various regions, such as whether a region has hard floor or carpet. A first robot may have a hard floor brush and a second robot may have a carpet brush. Based on the persistent map, the first robot may go clean the regions that have hard floor, and the second robot may go clean the regions that have carpet.

For example, sharing the persistent map enables teaming of two robots having different capabilities. A first robot may have vacuum capability, and a second robot may have mopping capability. The user may want to vacuum and mop the floor of a room. The first robot can perform a vacuum operation, then the second robot can perform a mopping operation at the areas that have been vacuumed. The second robot does not have to wait until the first robot finished vacuuming the entire room. The second robot can wait a few minutes after the first robot starts vacuuming, then start mopping the areas that have been vacuumed. The first and second robots can work in tandem because they share a persistent map, enabling the second robot to know precisely where the first robot has vacuumed.

When constructing the persistent map, the robots identify landmarks in the environment and place the landmarks on the map. When the robot navigates in the environment, the robot has feature detectors that can recognize the landmarks to help the robot determine its location.

Different robots have different capabilities in terms of traversing different types of terrain. A first robot may be able to travel over a carpet, whereas a second robot may not be able to travel over a carpet. When the first and second robots establish maps, the occupancy grids will be different for the two robots. Suppose half of a room is covered by carpet. The first robot can travel over the carpet and correctly identifies the walls of the room. The second robot cannot travel over the carpet, thinks there is a wall, and establishes a map with a room that is half the actual size. When the map merge module 124 receive map updates from different robots, the map merge module 124 takes into account the capabilities of the robots.

It is understood that the user of the robots 102a, 102b has approved the robots to transmit map information about the home to the remote computing device 116.

In the example of FIG. 1, the remote computing system 116 stores multiple versions of the persistent map 120. In some implementations, the system 116 can keep one official version of the persistent map. When a mobile robot sends a modified persistent map to the system 116, the map merge module 124 compares the modified persistent map with the official persistent map to determine whether the official persistent map needs to be updated to include new information contained in the modified persistent map. If the map merge module 124 determines that the official persistent map needs to be updated, the map merge module 124 modifies the official persistent map, and the modified map becomes the new official persistent map that is shared with the robots 102.

In some implementations, when the mobile robot 102 powers up to start a mission, such as a cleaning mission, the robot 102 contacts the remote computing system 116 to check whether there is a new version of the persistent map. For example, the robot 102 can compare the version number of the map 110 stored in the storage device 108 of the robot 102 with the version number of the map 120 stored in the storage device 118 of the remote computing system 116. If the system 116 has a new version of the persistent map, the robot 102 downloads the new version of the persistent map from the system 116 and stores the new version of the map 110 in the storage device 108.

In this document, the reference number 110 is used to refer to the map stored at the robot 102, and the reference number 120 is used to refer to the map stored at the remote computing device 116. If the robot 102 has not modified the map after downloading the map from the remote computing device 116, then the map 110 is the same as the map 120. However, if the robot modifies the map stored at the robot's storage device, then the map 110 may be different from the map 120.

When the mobile robot 102 powers up to start a mission, such as a cleaning mission, the robot 102 contacts the remote computing system 116 to check whether there is a new version of the persistent map. For example, the robot 102 can compare the version number of the map 110 stored in the storage device 108 of the robot 102 with the version number of the map 120 stored in the storage device 118 of the remote computing system 116. If the system 116 has a newer version of the persistent map, the robot 102 downloads the new version of the persistent map from the system 116 and stores the new version of the map 110 in the storage device 108.

In some implementations, instead of downloading the entire persistent map 120 from the system 116, the robot 102 downloads a persistent map update 122 from the system 116. The persistent map update 122 includes information about the differences between a current version of the persistent map 120 and a previous version of the persistent map 120. The persistent map update 122 has a smaller file size compared to the full persistent map 120. Downloading the persistent map update 122 may be faster than downloading the full persistent map 120. After the robot 102 downloads the persistent map update 122 from the remote computing system 116, the robot 102 updates the persistent map 110 using the persistent map update 122 so that the persistent map 110 stored in the storage device 108 has the newest map data.

As the robot 102 navigates around the environment, e.g., a home, to perform various tasks, e.g., cleaning tasks, the robot 102 uses the camera 114 and other sensors to detect conditions in the home. The robot 102 compares the sensed data with information on the map 110. If the sensed data is not consistent with the map 110, the robot 102 can update the map 110. For example, if the map 110 shows that an obstacle is located at a first location, but the sensor data indicate that at time t1 there is no obstacle at the first location, whereas a second location near the first location has an obstacle, the robot 102 can update the map 110 to show that at time t1 there is no obstacle at the first location, and at time t1 there is an obstacle at the second location.

In some examples, the robot 102 has recognition capabilities and can recognize objects, such as recognize whether the object is a chair, a table, or a bed. Assuming that the obstacle is a chair, the robot 102 can update the map 110 to show that at time t1 there is no chair at the first location, and at time t1 there is a chair at the second location. By storing information about how the environment changes over time, the persistent map can include statistical information about the environment, enabling the robots 102 to perform tasks more intelligently.

For example, if the persistent map shows that statistically there is more foot traffic at a first location than at a second location, then when performing cleaning tasks, the robot 102 can spend more time at the first location than at the second location. If the persistent map shows that there is more foot traffic in the dining room than in the living room and the bedroom, then both robots 102a, 102b can be assigned to clean the dining room in parallel, one robot 102a is assigned to clean the living room, and one robot 102b is assigned to clean the bedroom.

The control module 104 of the first robot 102a coordinates with the control module 104 of the second robot 102b. For example, the control modules 104 of the robots 102a, 102b can collectively determine that the first robot 102a should clean the dining room starting from a first end of the room, and the second robot 102b should clean the dining room starting from a second end of the room. The control modules 104 of the robots 102a, 102b can collectively determine that the first robot 102a should clean the living room, and the second robot 102b should clean the bedroom.

At the end of the cleaning sessions, the robots 102a, 102b return to their respective docking stations to recharge their batteries and empty debris from the debris bins. The robots 102a, 102b each communicates with the remote computing system 116 to provide updated map information. For example, the first robot 102a may have a first updated persistent map 110 that includes data about new objects detected by the first robot 102a as it navigates around the home to perform cleaning tasks. The second robot 102b may have a second updated persistent map 110 that includes data about new objects detected by the second robot 102b as it navigates around the home to perform cleaning tasks. Some of the new objects detected by the first robot 102a may be the same as some of the new objects detected by the second robot 102b. Some of the new objects detected by the first robot 102a may be different from the new objects detected by the second robot 102b. The first updated persistent map from the first robot 102a may not be entirely consistent with the second updated persistent map from the second robot 102b. For example, the first robot 102a may detect a chair at a first location at time t1, and the second robot 102b may detect no chair at the first location at time t2. For example, due to inconsistencies in the sensors, the first robot 102a may detect a chair at a first location at time t1, and the second robot 102b may detect no chair at the first location at time t1.

In some implementations, the first robot 102a sends the first updated persistent map to the remote computing system 116, and the second robot 102b sends the second updated persistent map to the remote computing system 116. The map merge module 124 analyzes the official version of the persistent map 120 stored in the storage device 118, the first updated persistent map 110 provided by the first robot 102a, and the second updated persistent map 110 provided by the second robot 102b. The map merge module 124 resolves inconsistencies in the updated persistent maps, if any, and generates a new official version of the persistent map 120 that includes new map data provided by the robots 102a, 102b.

In some implementations, the first robot 102a stores a first persistent map update having information about changes to the persistent map 110 stored at the first robot 102a after the map 110 has been downloaded from the remote computing system 116. Similarly, the second robot 102b stores a second persistent map update having information about changes to the persistent map 110 stored at the second robot 102b after the map 110 has been downloaded from the remote computing system 116. Each of the first and second persistent map update has a file size that is smaller than the full persistent map. The first robot 102a sends the first persistent map update to the remote computing system 116, and the second robot 102b sends the second persistent map update to the remote computing system 116. The map merge module 124 analyzes the official version of the persistent map 120, the first persistent map update provided by the first robot 102a, and the second persistent map update provided by the second robot 102b. The map merge module 124 resolves inconsistencies in the persistent map updates, if any, and generates a new official version of the persistent map 120 that includes new map data provided by the robots 102a, 102b. The remote computing system 116 provides the latest version of the official persistent map, or the persistent map update, to each of the mobile cleaning robot 102 upon receiving a request from the mobile cleaning robot 102 for a new map or a new map update.

Figure 2:
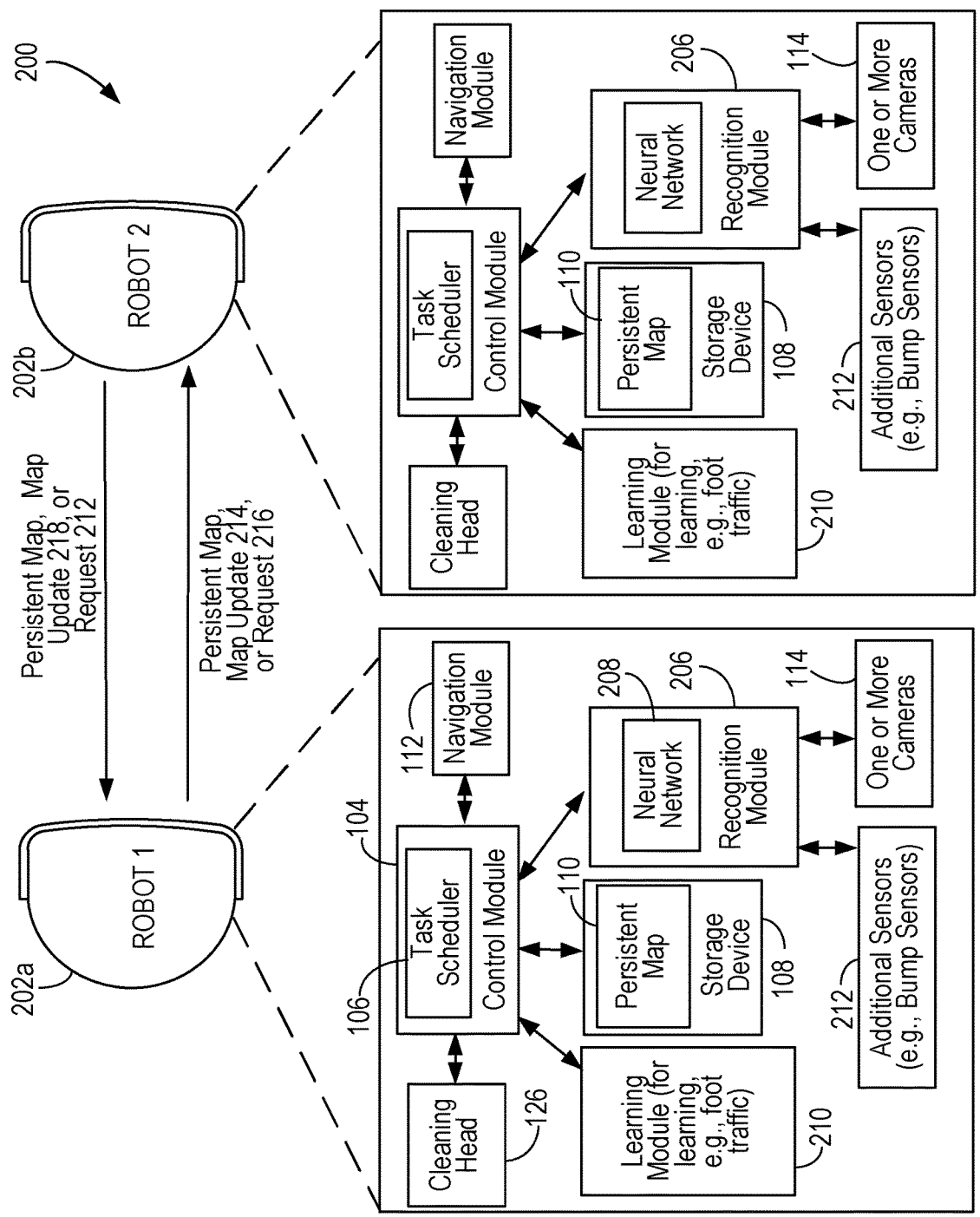

Referring to FIG. 2, in some implementations, multi-robot system 200 includes a first mobile robot 202a and a second mobile robot 202b (collectively referenced as 202) that communicate with each other. The first mobile robot 202a includes, e.g., a control module 104 having a task scheduler 106, a storage device 108 that stores a persistent map 110, and a navigation module 112, similar to the first mobile robot 102a of FIG. 1. The first mobile robot 202a includes one or more cameras 114 that are configured to capture images of the surroundings, allowing the mobile robot 202a to recognize objects in the images. This enables the mobile robot 202a to perform tasks more intelligently based on an understanding of its surroundings.

The mobile robot 202 includes a recognition module 206 that is configured to recognize scenes and objects in the environment. For example, the recognition module 206 enables the mobile robot 202 to determine whether it is in a kitchen or a bedroom. In some implementations, the recognition module 206 includes a neural network 208 that is trained using images of scenes and objects that are common in homes. The neural network 208 can be, e.g., a convolutional neural network. The recognition module 206 can include multiple neural networks 208 trained to classify various categories of objects. For example, a first neural network can be trained to recognize scenes and determine which room the mobile robot 202a is located, a second neural network can be trained to recognize objects in a room, and a third neural network can be trained to recognize individuals and pets.

The mobile robot 202a includes a learning module 210 that is configured to learn about patterns in the environment, such as foot traffic in a home. For example, the learning module 210 can be configured to store certain parameter values over time and perform statistical analyses of the stored parameter values to detect patterns in the data. The learning module 210 may store counts of human presence at each grid point on a map for each time period of the day for each day of the week. By analyzing the stored data, the learning module 210 can determine, e.g., for a given time during a given day of the week, which grid points on the map have higher or lower foot traffic. The learning module 210 can determine, e.g., for a given room in the house, which periods of time have less or no foot traffic.

In examples in which the mobile robot 202a is a mobile cleaning robot, a cleaning head 126 is provided to enable the mobile robot 102 to perform cleaning tasks. The mobile robot 202a can include additional sensors 212, such as bump sensors.

The second mobile robot 202b includes components similar to those of the first mobile robot 202a.

In some implementations, the first and second mobile robots 202a, 202b operate in sequence. The first mobile robot 202a navigates around the home and performs tasks, such as cleaning tasks. The first mobile robot 202a updates the persistent map 110 based on sensor data provided by the various sensors, including the camera 114 and the sensors 212. The first mobile robot 202a updates the persistent map 110 based on new objects that are recognized by the recognition module 206. The first mobile robot 202a updates the persistent map 110 based on new patterns that are learned by the learning module 210.

When the first mobile robot 202a returns to the docking station to recharge its battery, the second mobile robot 202b sends a request 212 to the first mobile robot 202a to request an update on the map. The first mobile robot 202a sends an updated persistent map, or a persistent map update 214 to the second mobile robot 202b. The second mobile robot 202b replaces its older persistent map 110 stored at its storage device 108 with the newer updated map 214 provided by the first mobile robot 202a, or updates its persistent map 110 stored at its storage device 108 using the persistent map update 214 provided by the first mobile robot 202a.

The second mobile robot 202b navigates about the home using the persistent map 110, and updates the map 110 based on sensor data provided by the various sensors (including the camera 114 and the sensors 212), new objects that are recognized by the recognition module 206, and new patterns that are learned by the learning module 210. When the second mobile robot 202b returns to the docking station to recharge its batteries, the first mobile robot 202a sends a request 216 to the second mobile robot 202b to request an update on the map. The second mobile robot 202b sends an updated persistent map, or a persistent map update 218 to the first mobile robot 202a, and so forth.

Each of the mobile robots 202a, 202b can have a map merge module that determines how its persistent map should be updated based on new map information provided by the other robot.

There are a number of ways that the first and second robots 102a and 102b can work as a team. Because the robots 102a, 102b share a map, each robot knows where the other robots is. The robots 102a, 102b can operate in a "fast follower" mode in which the second robot does not wait for the first robot to finish a mission before the second robot starts its mission. The robots 102a, 102b can follow each other, e.g., as soon as the robot 102a completes its mission in the first room, the robot 102a tells the robot 102b, and the robot 102b goes to perform its mission in the first room. The robots 102a, 102b operate in a way such that one robot follow the other in a coordinated cleaning.

For example, if the robot 102a detected dirt while it was cleaning the kitchen, the robot 102b knows to perform a focus scrubbing at the area where the robot 102a detected dirt. If a mopping robot knows there is a stain at a particular spot, it can scrub the spot well and remove the stain. A first robot has a light sensor that can detect reflectivity of the floor. The first robot can generate a histogram of reflectivity of the floor. If the first robot detects a large variance in the reflectivity indicating a dark colored stain, the first robot can flag that and tell the mopping robot to go scrub the area having low reflectivity. The next time the robot navigates to that area the robot checks that area to see whether there is still a variance. If there is no variance, it indicates that the scrubbing was likely effective in removing the stain. If there is still variance, then it indicates that the variance is probably permanent. The first robot adds that information to the persistent map indicating that it is an actual variance.

When the robots perform operations as a team, they take into account of the schedule of the user. For example, the user may want the robots to operate in tandem so that one robot follow the other. However, in some cases, the schedule may show a black out time, e.g., for a baby's nap time, so the robots may decide that the second robot should not start until after the nap time is over.

For example, a patrol robot may notice places that have dirt and indicate the dirt spots on the map, and inform the cleaning robot to come clean the dirt spot.

Sharing the persistent map allows a second robot to inherit the knowledge gained by a first robot. For example, the user may have a first robot that has been operating in the home for several months and learned much information about the home, such as where the keep-out zones are. The user may buy a second robot. By sharing the persistent map, when the second robot boots up for the first time in the home, the second robot can also have the information known to the first robot. For example, the persistent map may show a keep-out zone around a china cabinet and a keep-out zone around the pet dog's water bowl. By using the persistent map, the new robot will not bump into the china cabinet or the pet dog's water bowl. For example, the persistent map can show where the rugs are, where the thresholds are, so when the user buys a robot that cannot travel on rugs or thresholds, the new robot will already know where the rugs and the thresholds are and can clean the home intelligently instead of having to go through a learning process to learn where the rugs and thresholds are.

For example, the user may have a single robot and uses it to clean the first floor and the second floor. The robot establishes a map with a first floor plan and a second floor plan. Later, the user buys a second robot and uses the new robot to clean the second floor. By sharing the persistent map, the new robot can inherit information about the second floor and intelligently clean the second floor without going through a learning process.

Figure 3:
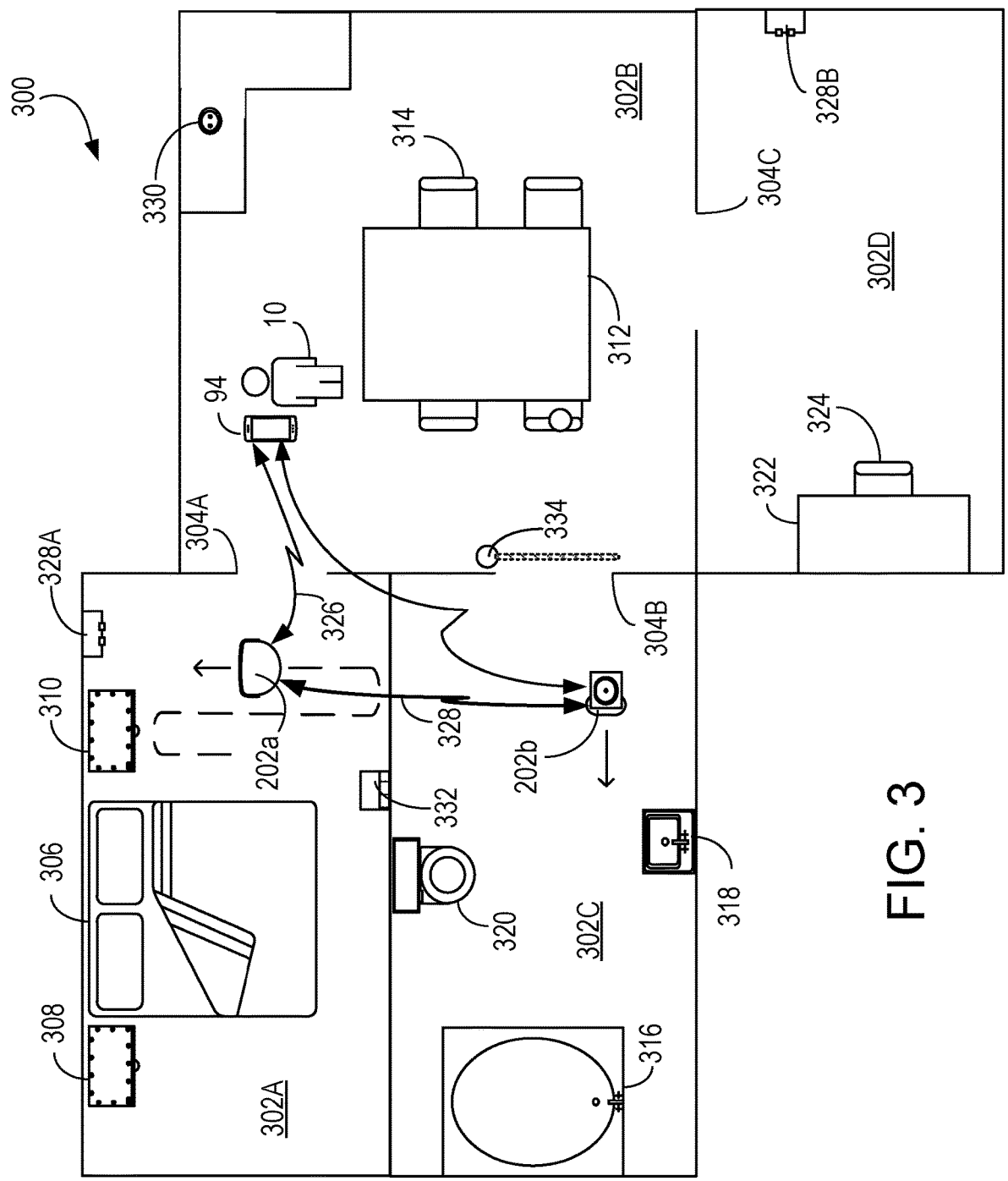
FIGS. 3 and 4 are schematic views of example environments in which multiple robots can operate.

FIG. 3 shows a schematic view of an example of an environment in which the system 200 (FIG. 2) can be used. In the description below, the mobile robot 202a is a mobile cleaning robot, but the same principles described here can be used for other types of mobile robots, such as home security mobile robots. The mobile cleaning robot 202a can operate within one or more enclosure spaces or within an environment including one or more enclosure spaces. The environment includes, for example, a home environment, a living space, a work environment, or other environments. The enclosure spaces correspond to, for example, rooms within the environment. In the exemplary environment shown in FIG. 3, the environment includes a home 300 where a user 10 and the mobile cleaning robot 202a are located. The user 10 operates a mobile computing device 94 (see FIG. 21), which can be, e.g., a mobile phone or a tablet computer. The home 300 includes rooms 302A, 302B, 302C, and 302D (collectively referenced as 302). In the example shown in FIG. 3, the mobile cleaning robot 202a is located within the room 302A, and the user 10 is located within the room 302B. The room 302A is adjacent to and connected to the room 302B by a doorway 304A, the room 302B is adjacent to and connected to the room 302C by a doorway 304B, and the room 302B is adjacent to and connected to the room 302D by a doorway 304C.

In this example, the room 302A is a bedroom that includes a bed 306 and end tables 308, 310. The room 302B is a dining room that includes a dining table 312 and dining chairs 314. The room 302C is a bathroom that includes a tub 316, a sink 318, and a toilet 320. The room 302D is a home office that includes a desk 322 and a chair 324.

In the example shown in FIG. 3, the mobile cleaning robot 202a autonomously navigates through the room 302A to perform a cleaning mission, such as cleaning a floor surface of the room 302A. The mobile cleaning robot 102 navigates around obstacles (e.g., the bed 306 and end tables 308, 310) positioned in the room 302A while performing its mission. As the mobile cleaning robot 202a moves about the home 300 during the mission, the mobile cleaning robot 202a uses its sensors to generate a map of the home 300 and localizes the mobile cleaning robot 202a within the map. The mobile cleaning robot 202a includes sensors that generate signals indicative of a status of the mobile cleaning robot 202a, such as a status of the components of the mobile cleaning robot 202a or a status of the mission or operation being performed by the mobile cleaning robot 202a.

In some implementations, the mobile computing device 94 enables the user 10 to provide inputs on the mobile computing device 94. The mobile computing device 94 can include user input elements such as, for example, one or more of a touch screen display, buttons, a microphone, a mouse pad, a trackball, a keyboard, or other devices that respond to inputs provided by the user 10. The mobile computing device 94 alternatively or additionally includes immersive media (e.g., virtual reality) with which the user 10 interacts to provide a user input. The mobile computing device 94 in these examples can be, for example a virtual reality headset or a head-mounted display. The user 10 can provide inputs corresponding to commands for the mobile cleaning robot 202a. In some implementations, a wireless link 326 is established between the mobile computing device 94 and the mobile cleaning robot 202a to enable the mobile computing device 94 to transmit a wireless command signal to the mobile cleaning robot 202a. The user 10 provides the user input indicative of the command signal to the mobile computing device 94, and the mobile computing device 94 transmits the command signal corresponding to the user input. Various type of wireless networks (e.g., Bluetooth®, radio frequency, optical based, etc.) and network architectures (e.g., mesh networks) may be employed to establish the communication link 326.

Other devices also can be wirelessly linked to the mobile cleaning robot 202a. In the example of FIG. 3, the home 300 includes linked devices 328A and 328B. In some implementations, each of the linked devices 328A and 328B includes, e.g., sensors suitable for performing one or more of monitoring the home 300, monitoring occupants of the home 300, and monitoring operations of the mobile cleaning robot 202a. These sensors can include, for example, one or more of imaging sensors, occupancy sensors, and environmental sensors.

The imaging sensors for the linked devices 328A, 328B can include one or more of visible light cameras, infrared cameras, and sensors employing other portions of the electromagnetic spectrum. Occupancy sensors for the linked devices 328A, 328B include one or more of, for example, a passive or active transmissive or reflective infrared sensor, a time-of-flight or triangulating range sensor using light, sonar, or radio frequency, a microphone to recognize sounds or sound pressure characteristic of occupancy, an airflow sensor, a camera, a radio receiver or transceiver to monitor frequencies and/or Wi-Fi frequencies for sufficiently strong receive signal strength, a light sensor capable of detecting ambient light including natural lighting, artificial lighting, and light emitted from a mobile computing device (e.g., the mobile computing device 94), and/or other appropriate sensors to detect the presence of the user 10 or other occupants within the home 300. The occupancy sensors alternatively or additionally detect motion of the user 10 or motion of the autonomous mobile cleaning robot 202a. If the occupancy sensors are sufficiently sensitive to the motion of the autonomous mobile cleaning robot 202a, the occupancy sensors of the linked devices 328A, 328B generate signals indicative of the motion of the mobile cleaning robot 202a. Environmental sensors for the linked devices 328A, 328B can include, e.g., an electronic thermometer, a barometer, a humidity or moisture sensor, a gas detector, or an airborne particulate counter.

In the example shown in FIG. 3, a second mobile cleaning robot 202b is located in the room 302C. The second mobile cleaning robot 202b, similar to the first mobile cleaning robot 202a, performs a mission, e.g., a cleaning mission, within the room 302C. In some examples, the mobile computing device 94 is wirelessly connected to the multiple robotic devices, including the first mobile cleaning robot 202a and the second mobile cleaning robot 202b, thus enabling the user 10 to interact with the mobile computing device 94 to control and monitor multiple robotic devices 202a, 202b. In some examples, the controller 104 for each of the mobile cleaning robots 202a, 202b, the linked devices 328A, 328B, and other devices may initiate and maintain wireless links directly with one another, for example, to initiate and maintain a wireless link between the mobile cleaning robot 202a or 202b and one of the linked devices 328A, 328B. Wireless links also may be formed with other remote electronic devices, such as a mobile phone, a tablet, a laptop, another mobile computing device, one or more environmental control devices, or other types of electronic devices. In certain implementations, the wireless links permit communication with one or more devices including, but not limited to smart light bulbs, thermostats, garage door openers, door locks, remote controls, televisions, security systems, security cameras, smoke detectors, video game consoles, other robotic systems, or other communication enabled sensing and/or actuation devices or appliances.

The wireless links may utilize various communication schemes and protocols, such as, for example, Bluetooth® classic, Wi-Fi®, Bluetooth®-low-energy, also known as BLE, 802.15.4, Worldwide Interoperability for Microwave Access (WiMAX), an infrared channel, or a satellite band. In some examples, the wireless links include any cellular network standards used to communicate among mobile computing devices, including, but not limited to, standards that qualify as 1G, 2G, 3G, or 4G. The network standards, if utilized, qualify as, for example, one or more generations of mobile telecommunication standards by fulfilling specifications or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

When the mobile robot 202a navigates in the room 302A, the mobile robot 202a can capture images of the bed 306 and end tables 308, 310, and use the recognition module 206 to identify the bed 306 and the end tables, 308, 310. Alternatively, the mobile robot 202a can determine there are objects in the room 302, and the user 10 can manually label the objects as "Bed" and "End Tables." The robot 202a detects the borders of the bed 306 and the end tables 308, 310 and records the information in the map 110. The next time that the robot 202a cleans the room 302A, it can plan a path through the room 302A that avoids bumping into the bed 306 and the end tables 308, 310. A map 2302 (see FIG. 21) shown on the display of the mobile computing device 94 can show an outline of the walls of the room 302A, and show icons for a bed and two end tables inside the room 302A.

As the mobile robot 202a navigates to the other rooms 302B, 302C, and 302D, the mobile robot 202a can recognize one or more objects in the rooms 302B, 302C, and 302D, or the user 10 can manually label one or more objects in the rooms 302B, 302C, and 302D. The map 110 maintained by the robot 202a can be updated to include the positions and borders of the objects in the rooms 302B, 302C, and 302D. The map 2302 shown on the display of the mobile computing device 94 can be updated to include walls of the rooms 302B, 302C, 302D and icons of the objects in the rooms 302B, 302C, and 302D.

In some implementations, the home 300 includes one or more audio media devices 330 that interact with the user 10 through natural speech. The audio media device 330 can receive speech uttered by the user 10, and can output audio emissions to be heard by the user 10. The user 10 can send commands or queries to the mobile robot 202a through the audio media device 330 instead of, or in addition to, using the mobile computing device 94. The audio media device 330 can include other sensors, such as an image capture sensor, a motion detection sensor, an optical sensor, a global position system (GPS) transceiver, device presence sensor (e.g., for geo-fencing) and other sensors that can detect conditions of an environment of the audio media device 330. In some examples, the audio media device 330 includes a sensor to detect an amount of light in an environment, and the audio media device 330 activates a lamp to illuminate the environment in low light conditions. In some examples, the audio media device 330 includes a camera to detect the distance and orientation of the user 10 from the audio media device 330 or to enable teleconferencing operations using the camera. Examples of the audio media device 330 is the audio media device 400 described in U.S. application Ser. No. 15/614,844, filed on Jun. 6, 2017, the entire contents of which are incorporated by reference.

The sensors of the audio media device 330 enables the device 330 to obtain information about the home 300. Such information can be provided to the mobile robot 202a to enhance the robot's awareness of the events happening in the home 300. For example, the user 10 may access the audio media device 330 to stream music in the room 302B. When the audio media device 330 is streaming music in the room 302B, it is likely that one or more individuals is using the room 302B. In this case, the mobile cleaning robot 202a schedules a cleaning task in the room 302B at some other time. It is understood that sharing of information between the audio media device 330 and the mobile robot 202a is approved by the user 10 in advance.

After the robot 202a recognizes the objects in the home 300, the robot 202a can perform tasks, such as cleaning tasks, taking into account of the characteristics of the objects. The robot 202a may clean high traffic areas more often, and clean low traffic areas less often. For example, the area deep under the bed has low traffic. The robot 202a may be configured to clean the open floor area in the room 302A and the area within, e.g., 1 feet deep under the bed 306 every day, and to clean the floor area more than, e.g., 1 feet deep under the bed 306 once a week, bi-weekly, or once a month. The robot 202a may be configured to clean the floor area near the dining table 312 and dining chairs 314 of the dining room 302B more carefully than other areas farther away from the dining table 312 and dining chairs 314. Because it is important to thoroughly clean the dining room, the robot 202a may schedule cleaning tasks such that it cleans the dining room completely before moving on to other rooms. The robot 202b may be configured to clean the floor area near the toilet 320 in the bathroom 302C more carefully than areas farther away from the toilet 320.

The mobile robots 202a, 202b may coordinate with each other so that the robot 202a cleans the bedroom 302A, and the robot 202b cleans the bathroom 302C. After cleaning the bedroom 302A, the mobile robot 202a may proceed to clean the dining room 302B starting from the end of the dining room that is closer to the bedroom 302A. After cleaning the bathroom 302C, the mobile robot 202b may clean the home office 302D first. After cleaning the home office 302D, the mobile robot 202b may proceed to clean the dining room 302B from the end of the dining room that is closer to the home office 302D. While cleaning the dining room 302B, the mobile robots 202a and 202b communicate with each other so that they do not clean the same area twice.

There can be many variations of the collaboration between the mobile robots 202a, 202b. For example, after a children's birthday party at the home, the user 10 may decide that the dining room 302B needs extra cleaning because of confetti and bits and pieces of pizza and popcorn scattered on the floor. The user 10 may instruct the mobile robots 202a, 202b to perform an "intense cleaning" so that each floor area in the dining room 302B is cleaned by each of the robot 202a, 202b at least once. This way, each floor area in the dining room 302B is clean twice by the robots 202a, 202b, ensuring that the dining room 302B is thoroughly cleaned. In this example, the robot 202a may clean the dining room 302B starting from the end of the dining room closer to the bedroom 302A and ending at the end of the dining room closer to the home office 302D. The robot 202b may clean the dining room 302B starting from the end of the dining room closer to the home office 302D and ending at the end of the dining room closer to the bedroom 302A.

Figure 4:
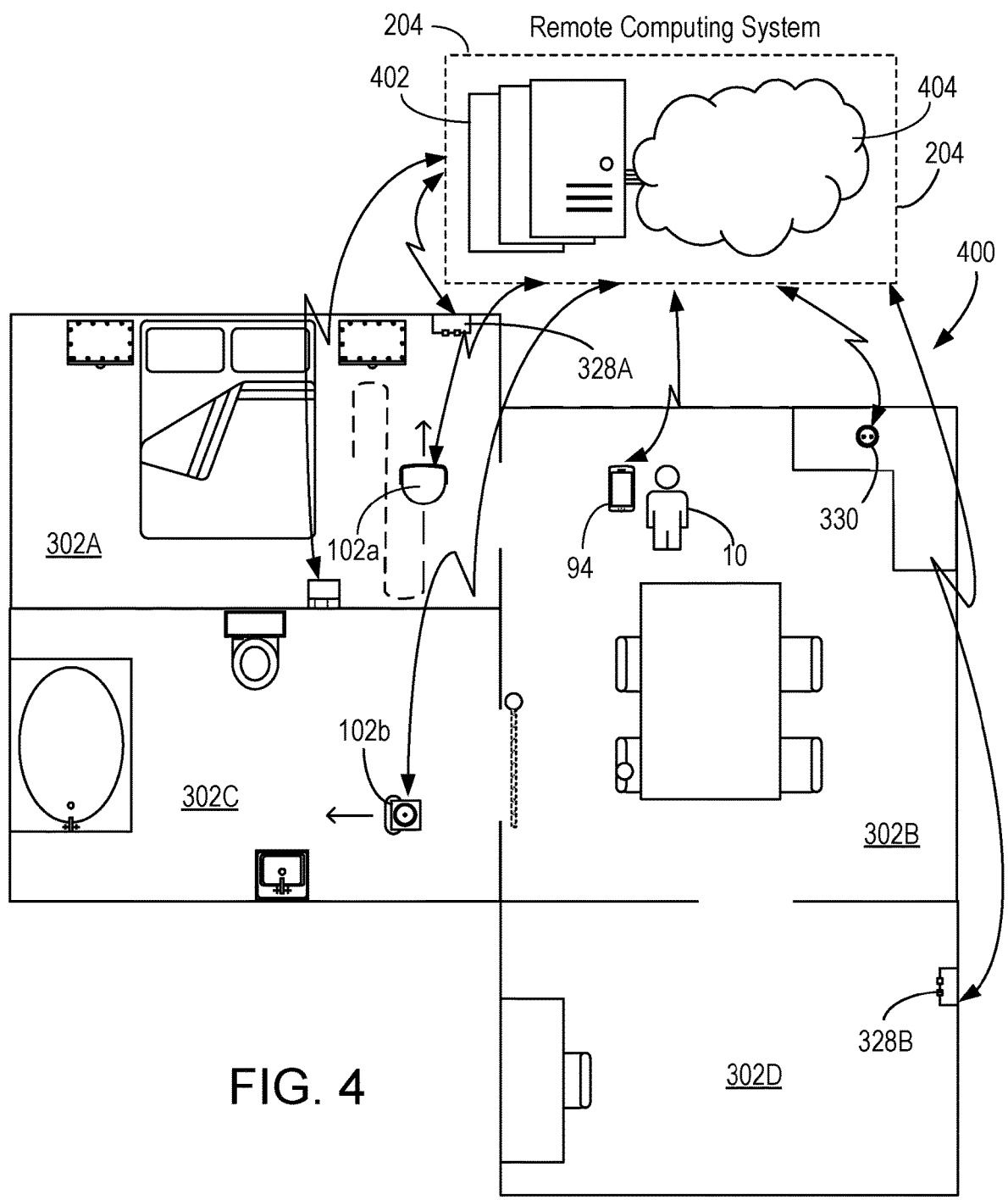

FIG. 4 shows a schematic view of an example of an environment in which the system 100 (FIG. 1) can be used. In this example, the environment includes a home 400 similar to that of the example shown in FIG. 3. The mobile computing device 94 sends commands to the remote computing system 116, which forwards the commands to the robots 102a, 102b. Each of the robots 102a, 102b downloads the persistent map or the persistent map update from the remote computing system 116. Each of the robots 102a, 102b uploads the updated persistent map or the persistent map update to the remote computing system 116. The remote computing system 116 merges the new map data provided by the robots 102a, 102b, and generates a new official version of the persistent map.

In some examples, the mobile robots 102a, 102b send notification messages to the remote computing system 116, which forwards the notification messages to the mobile computing device 94. For example, the mobile robot 102a may notify the user 10 that the bedroom 302A has been cleaned and that it is starting to clean the dining room 302B. The mobile robot 102b may notify the user 10 that the bathroom 302C has been cleaned, and that the robot 102b cannot leave the bathroom 302B because the door is closed.

In the example of FIG. 4, the remote computing system 116 is a cloud server computer. In some examples, a home server computer can be provided inside the user's home, in which the home server computer can perform the functions of the remote computing system 116 described above.

Other devices can also be wirelessly linked to the remote computing system 116. For example, the linked devices 328A, 328B transmit images generated by the imaging sensors to the remote computing system 116. The remote computing system 116 may have image processing capabilities and can analyze the images provided by the linked devices 328A, 328B. The linked devices 328A, 328B transmit sensor signals from the combination of imaging sensors, the occupancy sensors, the environmental sensors, and other sensors present in the linked devices 328A, 328B to the remote computing system 116. These signals serve as input data for the remote computing system 116 to control or monitor operations of the mobile cleaning robots 102a, 102b. It is understood that the user 10 has approved the linked devices 328A, 328B to transmit data about the home to the remote computing system 116.

Because the remote computing system 116 is connected to multiple robotic devices, including the mobile robots 102a, 102b, this enables the user 10 to interact with the mobile computing device 94 to control and monitor multiple robotic devices 102a, 102b through the remote computing system 116. The controllers for each of the mobile robots 102a, 102b, the linked devices 328A, 328B, and other devices may initiate and maintain wireless links for communication with the remote computing system 116.

In this document, some operations are described as being performed by one of the mobile robots 102a, 102b, 202a, and 202b. It is understood that the same or similar operations can be performed by the other mobile robots.

Referring to FIG. 5A, in some examples, the robot 202a navigates to the dining room 302B and captures images of objects in the dining room 302B. For example, the robot 202a uses the camera 114 to capture an image of the dining chair 314. The robot 202a uses the recognition module 206 to determine that the object in the image is a dining chair. The robot 202a updates the map 110 to include the dining chair 314. Next, the robot 202a uses the camera 114 to capture images of a dining table 312, a floor lamp 500, and wall art 502, and uses the recognition module 206 to determine that the objects in the images are a dining table, a floor lamp, and wall art, respectively. The robot 202a updates the map 110 to include the dining table 312, the floor lamp 500, and the wall art 502 at their respective locations.

Figure 5B:
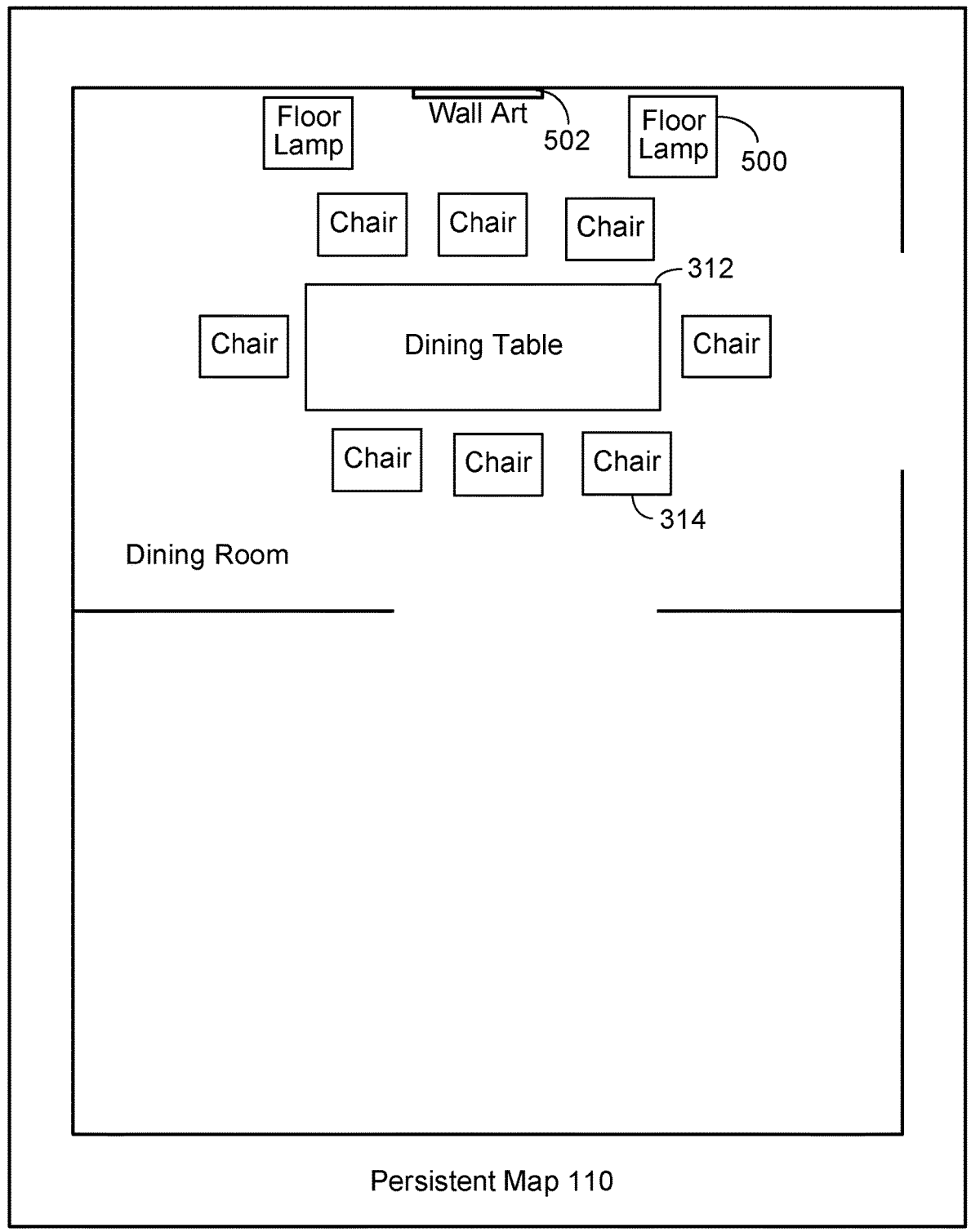
FIG. 5B is a diagram showing a portion of an example persistent map.

FIG. 5B shows an exemplary persistent map 110 after being updated by the robot 202a, in which the dining table 312, the dining chairs 314, and the floor lamps 500 are placed at their respective locations. The map shown in FIG. 5B is merely an example, the persistent map 110 generated by the robot 202a can include much more information.

Figure 6A:
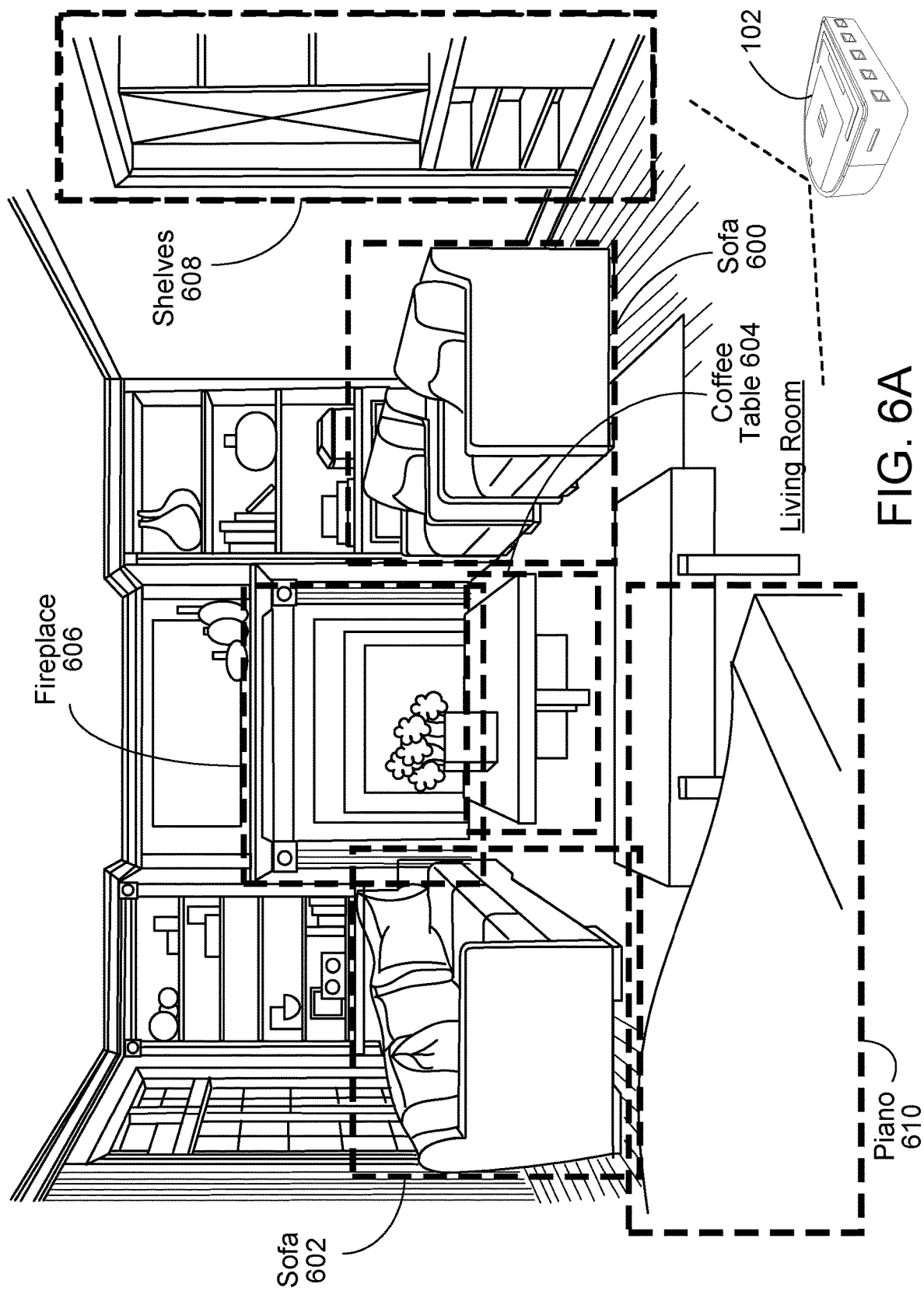
FIG. 6A is a diagram showing the mobile cleaning robot recognizing objects.

Referring to FIG. 6A, in some examples, the robot 202a navigates to a living room and captures images of objects in the living room. For example, the robot 202a uses the camera 114 to capture images of a first sofa 600, a second sofa 602, a coffee table 604, a fireplace 606, shelves 608, and a grand piano 610. The robot 202a uses the recognition module 206 to determine that the objects in the images are a first sofa, a second sofa, a coffee table, a fireplace, shelves, and a grand piano, respectively. The robot 202a updates the map 110 to include the first sofa 600, the second sofa 602, the coffee table 604, the fireplace 606, the shelves 608, and the grand piano 610 at their respective locations.

Figure 6B:
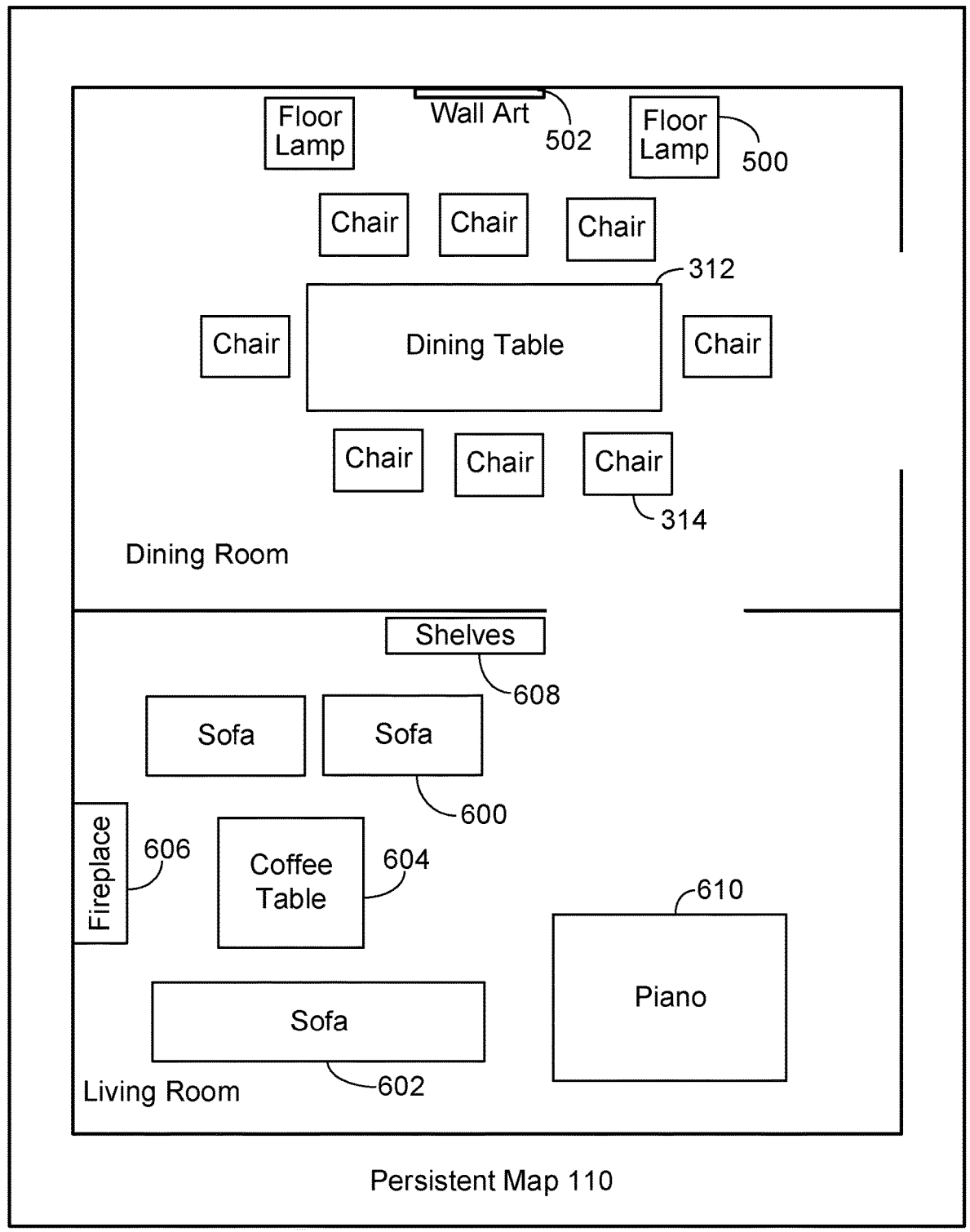
FIG. 6B is a diagram showing a portion of the persistent map.

FIG. 6B shows the persistent map 110 after being updated by the robot 202a, in which the first sofa 600, the second sofa 602, the coffee table 604, the fireplace 606, the shelves 608, and the grand piano 610 are placed at their respective locations. The map 110 shown in FIG. 6B is for illustrative purposes only, it is understood that the configurations of the rooms can be different for different homes, so the maps for different homes will also be different.

Figure 7:
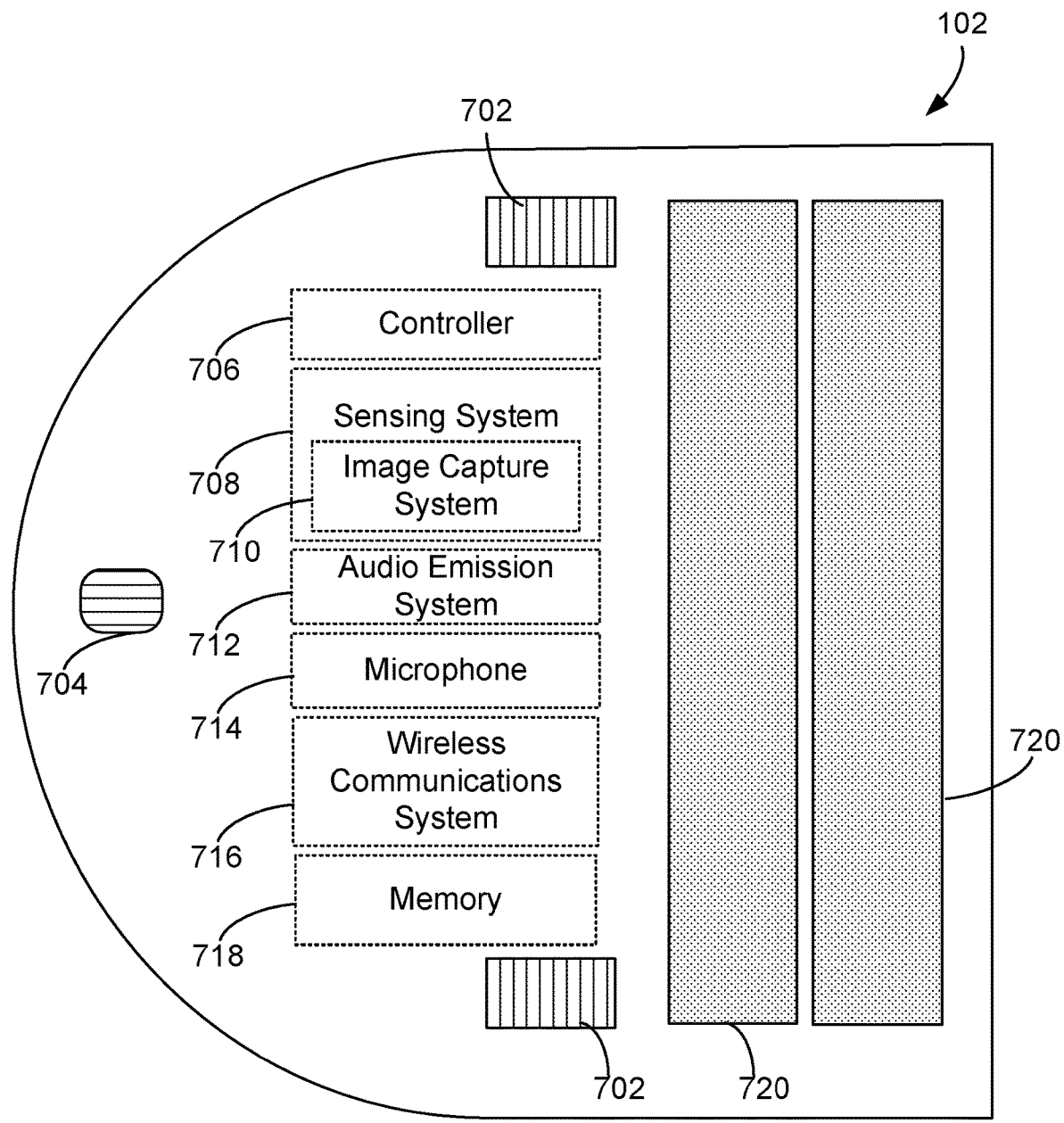
FIG. 7 is a schematic bottom view of an example of a mobile cleaning robot.

The following describes examples of mobile cleaning robots. The mobile cleaning robots 102 (FIG. 1) and 202 (FIG. 2) autonomously navigate about the environment, e.g., the home 300, 400, using a drive system and a suite of sensors. FIG. 7 shows a schematic bottom view of an example of the mobile cleaning robot 102 of FIG. 1. While FIG. 7 is described with respect to the mobile cleaning robot 102, the mobile cleaning robot of FIG. 7 additionally or alternatively corresponds to the mobile cleaning robot 202. The mobile cleaning robot 102 includes a drive system including drive wheels 702. In some examples, a caster wheel 704 supports the mobile cleaning robot 102 above the floor surface. The mobile cleaning robot 102 further includes a controller 706 operable with one or more motors connected to the drive wheels 702. The controller 706 of the mobile cleaning robot 102 selectively activates the motors to drive the drive wheels 702 and navigate the mobile cleaning robot 102 across a floor surface.

The controller 706 is also operable with a sensing system 708. The sensing system 708 includes sensors usable by the controller 706 to navigate about the home 300. The sensing system 708, for example, has sensors to generate signals for detecting obstacles within the home 300 and for generating the map of the home 300. The sensing system 708 can include obstacle detection sensors, such as a time-of-flight sensor to detect distances to obstacles, cliff detection sensors to detect a drop-off (e.g., a staircase), bump sensors associated with a bumper mounted on the mobile cleaning robot 102, and contact sensors. The controller 706 operates the drive system for the mobile cleaning robot 102 to move around obstacles when the obstacle detection sensors detect the obstacles.

The controller 706 uses signals from its sensor system to generate a map of the home 300 by tracking and updating positions and orientations of the mobile cleaning robot 102 over time. The mapping sensors include, for example, simultaneous localization and mapping (SLAM) sensors, dead reckoning sensors, and obstacle detection and avoidance (ODOA) sensors. The controller 706 constructs a two-dimensional map of the floor surface of the home 300, determines the robot pose on the map and determines positions of portions of the home 300 that the mobile cleaning robot 102 can traverse (e.g., unoccupied, traversable floor). Using signals from the dead reckoning sensors, the contact sensors, and the non-contact obstacle detection sensors, the controller 706 indicates floor areas that the mobile cleaning robot 102 cannot traverse because of obstacles on the floor surface or above the floor surface. In one example, the controller 706 constructs a map of walls and obstacles as it transits, generating an occupancy grid of traversable and occupied space. In some implementations, the map uses a Cartesian coordinate system or a polar coordinate system. In some examples, the map is a topological map, a representational map, or a probabilistic map.

In some examples, using simultaneous localization and mapping (SLAM) techniques, the controller 706 determines a pose of the mobile cleaning robot 102 within a two-dimensional map of the home 300. The SLAM sensors include, for example, one or more cameras for visual identification of features and landmarks used in calculating robot pose on a map. The mobile cleaning robot 102 includes additional sensors that generate signals to enable the controller 706 to estimate the position and/or orientation of the mobile cleaning robot 102 as the mobile cleaning robot 102 moves about the home 300. These sensors, alone or in combination with the SLAM sensors, determine the pose of the mobile cleaning robot 102 on the robot map built by the transiting mobile cleaning robot 102. In some implementations, the controller 706 uses signals from the additional sensors to validate or adjust pose determined by the SLAM sensors. In some implementations, the additional sensors include odometers, accelerometers, gyroscopes, inertial measurement units, and/or other sensors that generate signals indicative of a distance travelled, an amount of rotation, a velocity, or an acceleration of the mobile cleaning robot 102. For example, the mobile cleaning robot 102 includes a directional sensor, such as a gyroscope, that generates signals indicative of an amount that the mobile cleaning robot 102 has rotated from a heading. In some implementations, the sensing system 708 includes a dead reckoning sensor, such as an IR wheel encoder, to generate signals indicative of the rotation of the drive wheels 702, and the controller 706 uses the detected rotation to estimate the distance travelled by the mobile cleaning robot 102. In some implementations, the sensing system 708 includes, for example, a laser scanner or a time-of-flight sensor that generates sensor readings for determining distances to the observed obstacles and objects within the environment. Alternatively or additionally, the sensing system 708 includes an optical mouse sensor facing the floor surface to determine a distance the mobile cleaning robot 102 has drifted laterally across the floor surface relative to a heading.

In some implementations, the mobile cleaning robot 102 employs visual simultaneous localization and mapping (VSLAM) to build its map and determine a current pose on the map. The sensing system 708 includes one or more localization sensors, e.g., a camera 710 (image capture system) that generate signals for the controller 706 to determine the mobile cleaning robot's location and orientation relative to features detected in the environment. In some implementations, the mobile cleaning robot 102 includes an image capture system 710, e.g., a visible light camera 710, under the top surface of the robot body and angled in an upward direction, e.g., angled in a range between 30 degrees and 80 degrees from the floor surface about which the mobile cleaning robot 102 navigates. The camera 710 is aimed at locations on the wall and ceiling having a high concentration of static elements, such as window frames, pictures frames, doorway frames and other objects with visible, detectable features such as lines, corners and edges. For example, when the camera 710 is angled upward, a center of a viewing cone of the camera 710 is angled upward such that the center of the viewing cone is aimed at the locations on the wall and ceiling. Using the images captured by the camera 710, the controller 706 determines the robot pose on a map (e.g., the map 110) the mobile cleaning robot 102 builds as it navigates about rooms or enclosure spaces, e.g., a series of adjoined rooms 302A, 302B, 302C, 302D (collectively referred to as enclosure spaces or rooms 302).

The localization sensors, in some examples, include sensors on the mobile cleaning robot 102 capable of generating signals in response to detection of walls and objects in the environment that occupy non-traversable floor space. In addition to VSLAM cameras, these localization sensors include, for example, contact sensors such as bump sensors, and non-contact time of flight sensors, such as lasers, volumetric point cloud sensors, point line sensors (e.g., a time of flight line sensor such as those made by PIXART), IR proximity sensors, light detection and ranging (LIDAR) sensors, and acoustic sensors. The localization sensors generate signals from which unique signatures, patterns, or features are extracted, particularly distinguishing non-traversable floor from traversable floor, or traversable floor space added to the expanding robot map as it is traversed by the mobile cleaning robot 102. When the controller 706 determines that these features have been detected, the controller 706 determines the pose of the mobile cleaning robot 102 on the map of the home 300 using the location and orientation of the mobile cleaning robot 102 relative to these detected features. The controller 706 localizes the mobile cleaning robot 102 within the home 300, in particular by determining a current pose of the mobile cleaning robot 102 with reference to the features corresponding to objects within the home 300. The extracted features indicate the room where the mobile cleaning robot 102 is located.

The extracted features form unique identifiers for each of the rooms 302A, 302B, 302C, and 302D. In some implementations, the mobile cleaning robot 102 uses the extracted features to determine which of the rooms 302A, 302B, 302C, and 302D it is currently located in response to detecting a specific feature or features associated with a room identifier. In some implementations, the mobile cleaning robot 102 recognizes pre-identified rooms through object recognition. The mobile cleaning robot 102, for example, uses its camera 710 to capture images of objects associated with each room 302 (e.g., a stove, a dishwasher, or a refrigerator). A user 10 communicates to the mobile cleaning robot 102 a particular room identifier (e.g., kitchen) associated with those recognizable objects. During a cleaning mission, when the mobile cleaning robot 102 recognizes one or more of these objects, it communicates its location to the user by causing emission of an audible alert, e.g., by requesting that the mobile computing device 104 produce an audible alert, or causing a visual alert to issue, e.g., by displaying a text notification on the mobile computing device 104 indicating the associated stored room identifier.

In some implementations, the map is persistent and stored in the remote computing system 116 or the home server computer for access by one or more mobile cleaning robots 102, 202. In each subsequent run or cleaning session, the mobile cleaning robot 102 updates the persistent map according to changing conditions within the home 300, such as moved furniture. The persistent map accumulates information about the environment over time. In some examples, the mobile cleaning robot 102 discovers connected devices in the home 300 through standard protocols and localizes them on the map. This includes positions of connected lights and speakers, vents, door and window sensors, and other connected devices in the home 300. The mobile cleaning robot 102 roams the home 300 and uses radio frequency (RF) signatures, visual recognition, received signal strength and other methods to recognize connected devices in the home 300 and automatically places them on the robot map of the home 300. For example, the mobile cleaning robot 102 explores the home 300 and recognizes a NEST® thermostat on the wall in the living room, a connected SAMSUNG™ fridge in the kitchen, and Philips™ HUE BLOOM lights in the family room and the bedroom. The mobile cleaning robot 102 puts the recognized connected devices on the map and enables the user 10 to take advantage of this spatial knowledge of the connected devices.

The sensing system 708 generates signals indicative of operations of the mobile cleaning robot 102. In some examples, the sensing system 708 includes a stall sensor unit integrated with the drive system that generates signals indicative of a stall condition of the mobile cleaning robot 102 in which the mobile cleaning robot 102 is unable to move along the floor surface within the home 300. The stall sensor unit generates a signal to indicate a change in current delivered to a motor of the drive system. The change in current can be indicative of a stasis condition for the mobile cleaning robot 102, in which the mobile cleaning robot 102 is unable to move substantially from its current pose. The stall sensor unit alternatively or additionally includes optical sensors that generate signals indicative of whether a wheel, e.g., the caster wheel 704 or one of the drive wheels 702, is moving when power is being delivered to motors of the drive wheels 702. The stall sensor unit, in some examples, is a mouse sensor for tracking and detecting motion, or lack thereof, by comparing successive images for change. In some implementations, the mobile cleaning robot 102 relies on an accelerometer to generate a signal indicative of an acceleration of the mobile cleaning robot 102. The controller 706, upon detection of the absence of movement of the wheel, determines that the mobile cleaning robot 102 is in a stall condition.

Figure 8:
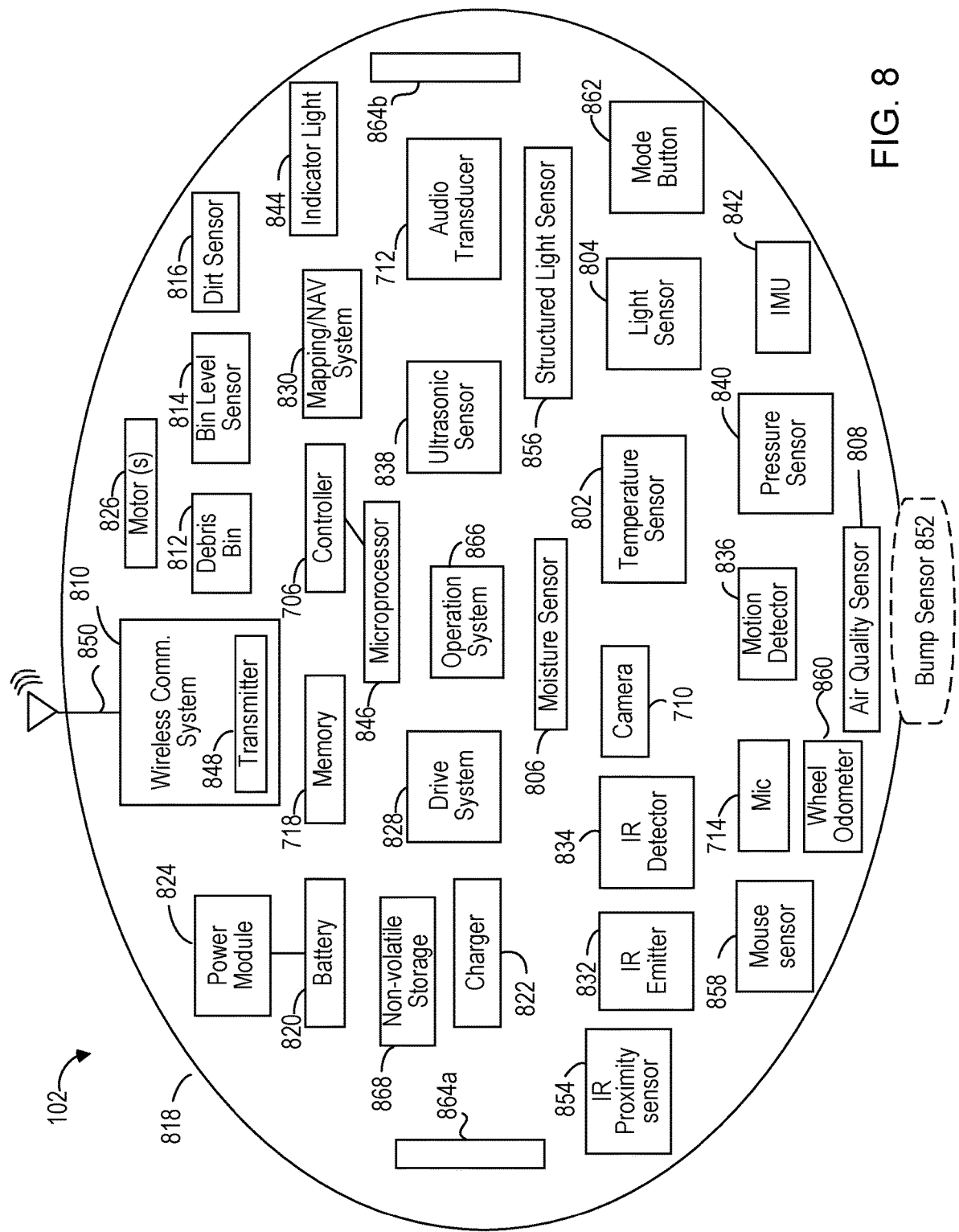
FIG. 8 is a schematic view of examples of sensors mounted on a mobile cleaning robot.

In some implementations, the mobile cleaning robot 102 includes other sensors as depicted in the schematic diagram of FIG. 8. The sensing system 708, in some examples, includes a microphone 714 that receives audible signals from the environment of the mobile cleaning robot 102. In some examples, the sensing system 708 includes environmental sensors, such as a temperature sensor 802, an ambient light sensor 804, an air moisture content sensor 806, a gas composition, air quality sensor 808, or sensors that sense other characteristics of the environment. The sensing system 708 also includes condition sensors indicative of conditions of the mobile cleaning robot 102 or of components of the mobile cleaning robot 102. These sensors include, for instance, battery charge state sensors to detect an amount of charge or a capacity for charge on a power source of the mobile cleaning robot 102, component life sensors such as wheel tread sensors to detect a serviceability of a component or an amount of remaining life of a component.

The mobile cleaning robot 102 further includes an audio emission system 712 that allows the mobile cleaning robot 102 to emit audible signals. The controller 706 causes emission of the audible signals, for example, to notify the user 10 of a status of the mobile cleaning robot 102, e.g., a status of components of the mobile cleaning robot 102, a status of operations of the mobile cleaning robot 102, or a status of a mission performed by the mobile cleaning robot 102.

The mobile cleaning robot 102 further includes a wireless communication system 810 that allows the mobile cleaning robot 102 to communicate with the remote computing system 116, as shown in FIGS. 1 and 4. Using the wireless communication system 810, the controller 706 transmits data to the remote computing system 116. In some examples, the data includes the signals generated by the sensors of the sensing system 708. In some implementations of the mobile cleaning robot 102 that includes the image capture system 710, the captured images can be transmitted directly to the remote computing system 116. In some examples, the mobile cleaning robot 102 collects information and constructs a map of the home 300 and the controller 706 transmits the map to the remote computing system 116. If the controller 706 includes condition sensors, the controller 706 also transmits information indicative of the condition of the mobile cleaning robot 102 to the remote computing system 116.

As described with respect to FIGS. 3 and 4, during its navigation about the home 300, the mobile cleaning robot 102 performs operations and completes missions within the home 300. The performed operations depend on the type of the mobile cleaning robot 102. In addition to depicting basic components that may be present in many types of mobile cleaning robots for the implementations described herein, FIG. 7 depicts components specific to a vacuum cleaning robot, which corresponds to one of many types of mobile robots that may benefit from the processes described herein. Other mobile robots may include floor washing robots, home monitoring robots, robotic lawnmowers, mopping robots, companion robots, or sweeping robots. These robots may each benefit from the processes and systems described in this document.

In some examples, the mobile cleaning robot 102 is a vacuum cleaning robot that includes a cleaning system to ingest debris on a floor surface. The cleaning system includes, for example, rotatable rollers or brushes 720 that agitate debris from the floor surface into a debris bin (not shown) mounted on the mobile cleaning robot 102. The cleaning system includes an air mover that, upon activation, moves air, and thereby debris on the floor surface, towards the debris bin. As the mobile cleaning robot 102 navigates about its environment during a cleaning mission, the mobile cleaning robot 102 activates its cleaning system to ingest debris, thereby cleaning the floor surface.

In some examples, if the mobile cleaning robot 102 is a vacuum cleaning robot, the robot 102 includes a removable debris bin 812, and the sensing system 708 includes a debris bin level sensor 814 that detects an amount of debris ingested into the removable debris bin 812. The sensing system 708 includes one or more debris sensors or dirt sensors 816 that detect when the vacuum cleaning robot ingests debris, or detects a rate of debris ingestion. In some examples, the mobile cleaning robot 102 includes a filter for debris, the sensing system 708 also includes a filter sensor to detect whether the filter requires cleaning.

The exemplary mobile cleaning robot 102 includes a chassis 818, a battery 820, a battery charger 822, a power module 824 powered by the battery 820, one or more motors 826 powered by the power module 824, a drive system 828 driven by the motors 826, a mapping/navigation system 830, an infrared (IR) emitter 832, an infrared radiation detector 834, a motion detector (e.g., a passive IR photodiode) 836, an ultrasonic sensor 838, a pressure sensor 840, an inertial measurement unit (IMU) 842, and an indicator light 844. The controller 706 may include any suitably configured processor 846 (e.g., microprocessor) or processors. The microprocessor 846 is in communication with the controller 706, memory 718, the various sensors, and the drive system 828. In some implementations, the camera 710 is an imaging device that gathers 2D images, panoramic views, video and/or 3D models. The sensors described above are not exhaustive of the types of sensors that may be provided on the robot 102 and certain of the sensors may be omitted depending on the environmental parameters to be detected by the robot 102.

The wireless communication system 810 includes a wireless communication transmitter or module 848 (e.g., a Wi-Fi® module) and an associated antenna 850 to enable wireless communication between the robot 102 and the mobile computing device 94, the remote computing system 116, a hub (such as a Google OnHub® Wi-Fi® access point), a network router, and/or a private network.

In some implementations, the mobile cleaning robot 102 includes sensors for Obstacle Detection and Obstacle Avoidance ("ODOA") during transit through the home 300. These sensors include a mechanical bumper switch sensor 852 that is triggered on contact with a stationary obstacle and non-contact sensors such as ultrasonic sensors 838, infrared emitter/detector proximity sensors 854, and structured light sensors 856 such as those made by PixArt.

The mapping/navigation system 830 enables the robot 102 to perform autonomous navigation and mapping of the home 300. The mobile cleaning robot 102 includes sensors for autonomous navigation such as the camera 710 for Visual Simultaneous Localization and Mapping ("VSLAM"), a mouse sensor 858, the IMU 842 with a 3 axis accelerometer and a 3 axis gyroscope, and/or wheel odometers 860 to determine or register the position of the robot 102 relative to the space 300 (i.e., to localize the robot 102 in the space 300). The robot 102 can localize the locations of readings collected by its onboard sensors. Any suitable technique and components may be used to localize and register the robot 102, such as machine vision (e.g., using the camera 710 and Feature Recognition or Class Recognition software), light beacons, or radio frequency received signal strength indicator (RSSI) technology.

The robot 102 can include a mode button 862 that enables the user to select one of several operation modes, such as various cleaning modes. The robot 102 includes driven locomotive members 864a, 864b in contact with a floor surface and supporting the robot chassis 818. The driven locomotive members 864a, 864b are commandable by the controller 706 to cause the mobile cleaning robot 102 to traverse the floor surface within the home 300. The microprocessor 846, in some examples, navigate the mobile cleaning robot 102 to or through one or more mapped locations within the home 300. The robot 102 includes an operating system 866 that manages various operations of the robot 102.

The controller 706 accesses a memory 718 that stores information collected by sensors and routines executable by the controller 706 to cause the mobile cleaning robot 102 to perform operations within the home 300. Routines include navigational routines, for example, to navigate the mobile cleaning robot 102 about the home 300. The controller 706 initiates operations of the mobile cleaning robot 102 in response to signals from, for example, the sensing system 708 or wireless command signals transmitted to the controller 706 through the wireless communication system 810. If the mobile cleaning robot 102 includes user input devices, such as manually operable buttons, the input devices can be operated by the user 10 to cause the controller 706 to initiate one or more operations of the mobile cleaning robot 102. The manually operable buttons, for example, correspond to push buttons or button icons on a touch screen display. In some examples, the memory 718 also stores deterministic patterns of movement that the controller 706 implements to navigate the mobile cleaning robot 102 through the home 300. The patterns include, for example, a straight motion pattern, a vine pattern, a cornrow pattern, a spiral pattern, a zigzag pattern, or other patterns including combinations of patterns. The memory 718 also stores the data collected by the sensors of the sensing system 708, including any of the dead reckoning sensors, the localization sensors, the condition sensors, or other sensors of the sensing system 708. If the controller 706 constructs the map of the home 300, the controller 706 optionally stores the map in a non-volatile storage device 868 for reuse on a subsequent cleaning mission.

The operations available to the mobile cleaning robot 102 depend on the type of the mobile cleaning robot 102. For example, if the mobile cleaning robot 102 is a vacuum cleaning robot, the memory 718 includes routines for performing floor cleaning operations. When the vacuum cleaning robot receives a command to begin a cleaning mission, the vacuum cleaning robot performs floor cleaning operations by autonomously navigating about its environment and ingesting debris from the floor surface. The floor cleaning operations include a room cleaning operation in which the controller 706 navigates the vacuum cleaning robot in a pattern, e.g., a cornrow pattern, a spiral pattern, or other appropriate movement pattern, to cover the floor surface of a room or multiple rooms.

In some examples, the floor cleaning operations include a spot cleaning operation in which the vacuum cleaning robot, upon receiving a command to perform the spot cleaning operation, restricts its cleaning operation to a localized area. The localized area may include a greater amount of detected debris, as detected by the debris sensors. As part of the spot cleaning operation, the controller 706 additionally or alternatively increases power delivered to the air mover of the vacuum cleaning robot to cause debris to be more easily ingested by the vacuum cleaning robot. To perform the spot cleaning operation, the controller 706 controls the drive system such that the vacuum cleaning robot moves in a predefined pattern, e.g., a spiral pattern, within the localized area. The initiation of any of the floor cleaning operations may occur in response to sensor signals. If the vacuum cleaning robot includes a debris sensor, the controller 706 can control the vacuum cleaning robot to perform the spot cleaning operation in response to detection of the debris by the debris sensor.

In some implementations, the mobile cleaning robot 102 communicates or otherwise interacts with other devices in its environment. The mobile cleaning robot 102, for example, includes a rechargeable battery that can be recharged at a station electrically connectable with the battery. In some examples, the battery is a removable battery that is inserted in the station, while in other examples, the mobile cleaning robot 102 docks at the station, thereby enabling the station to recharge the battery. As depicted in FIG. 3, a docking station 332 is located in the room 302A. The docking station 332 includes a charger operative to charge the battery of the mobile cleaning robot 102 when the mobile cleaning robot 102 is docked at the docking station 332, e.g., physically and/or electrically connected to the docking station 332. If the mobile cleaning robot 102 is a vacuum cleaning robot, the docking station 332 additionally or alternatively serves as an evacuation station including a motorized receptacle to empty debris from the debris bin of the vacuum cleaning robot.

In another example depicted in FIG. 3, a transmitting unit 334 located proximate the doorway 304B transmits an axially-directed confinement beam that spans at least a length of the doorway 304B. The transmitting unit 334 is positioned so that the emitted confinement beam separates the room 302C from the room 302B. In some examples, the sensing system 708 includes an omnidirectional detector that detects the emitted confinement beam. In response to detection of the confinement beam, the controller 706 navigates the mobile cleaning robot 102 to avoid crossing the confinement beam, thereby maintaining autonomous navigation of the mobile cleaning robot 102 in the room 302C or outside of the room 302C. The mobile cleaning robot 102, for examples, moves away from the confinement beam when the omnidirectional detector detects the confinement beam. If the second mobile cleaning robot 103 includes such an omnidirectional detector, the transmitting unit 334 restricts the second mobile cleaning robot 103 such that the second mobile cleaning robot 103 autonomously navigates within the room 302C without moving across the confinement beam and hence the doorway 304B.

In some examples, one or more transmitting units emit signals into the environment that are detectable by localization sensors on the mobile cleaning robot 102. The signals are, for example, optical or acoustic signals that remain stationary within the home 300. For example, if the transmitting unit transmits a narrowly directed acoustic signal into the home 300 while the mobile cleaning robot 102 navigates through the home 300, the controller 706 localizes to the acoustic signal when an acoustic receiver on the mobile cleaning robot 102 receives it. The acoustic signal can be directed towards a wall surface such that the acoustic receiver detects a reflected acoustic signal, or the acoustic signal can be directed towards a floor surface so that the acoustic receivers receive a direct emission of the acoustic signal. The transmitting unit transmits one or more of these signals into the home 300, and the mobile cleaning robot 102 uses each of these signals as localizing features. In some examples, the transmitting unit emits a narrowly focused optical beam into the home 300 that the sensing system 708 detects and the controller 706 uses to localize the mobile cleaning robot 102 within the home 300.

The wireless communication system for the mobile cleaning robot 102, 202, enables transmission of data between the mobile cleaning robot 102, 202, and the remote computing system 116, or between the mobile cleaning robot 102, 202, and the mobile computing device 94 as shown in FIGS. 3 and 4. The remote computing system 116 can be configured to include computing resources remote from the environment of the mobile cleaning robot 102, e.g., remote from the home 300. For example, as shown in FIG. 4, the remote computing system 116 can include one or more server computers 402 that establish communication links with each of the mobile cleaning robots 102a, 102b. The one or more server computers 402, in some examples, are connected to a network of one or more remotely located server computers (a "cloud" computing network 404). The remote computing system 116 includes, for example, a portion of a network-accessible computing platform implemented as a computing infrastructure of processors, storage, software, and databases maintained and accessible through a communication network. The remote computing system does not require the user 10 to be knowledgeable of the physical location and configuration of the system, nor does the remote computing system require the user 10 to be knowledgeable of the routines executed by the remote computing system 116 or services delivered by the remote computing system 116. The remote computing system 116 can include one or more databases to store mobile robot identification data and associated user data.

The dead reckoning and/or localization sensors for the mobile cleaning robot 102 can include sensors that generate signals from which features can be extracted to localize the mobile cleaning robot 102. The dead reckoning and/or localization sensors alternatively or additionally include sensors remote from the mobile cleaning robot 102, e.g., sensors on linked devices 328A, 328B.

The mobile cleaning robot 102 can emit signals detectable by remote dead reckoning sensors such that changes in the relative position and/or orientation of the mobile cleaning robot 102 while the mobile cleaning robot 102 navigates about the environment are estimated using outputs from these sensors.

Linked devices 328A, 328B (e.g., network connected devices) can generate information that, in some implementations, is accessed by the remote computing system 116 and the mobile cleaning robot 102 to improve the accuracies of the persistent map. The linked devices 328A, 328B include sensors that detect features in the home 300, such as an acoustic sensor, an image capture system, or other sensor generated signals from which features can be extracted. In some instances, the linked devices 328A, 328B transmit the information derived from the sensor signals to the remote computing system 116. The remote computing system 116 correlates the information relating to these features with features on the persistent map.

In some implementations, the linked devices 328A, 328B generate their own maps of portions of the home 300 that are compared to the persistent map maintained by the robot 102. The linked devices 328A, 328B, for example, include cameras, optical sensors, ranging sensors, acoustic sensors, or other sensors that generate signals to be used to form a map of an environment of the linked devices 328A, 328B. In some examples, the linked devices 328A, 328B cooperate with one another to form maps.

The linked devices 328A, 328B may also emit signals received by sensors on the mobile cleaning robot 102. The mobile cleaning robot 102 uses signals generated by its sensors in response to the signals from the linked devices 328A, 328B to triangulate the position of the mobile cleaning robot 102. The emitted signals can be, for example, optical signals, acoustic signals, wireless signals, and other detectable signals whose intensities change as they propagate through the environment.

In some implementations, during operations of the mobile cleaning robot 102, the sensing system for the mobile cleaning robot 102 may detect an error status associated with the mobile cleaning robot 102. The remote computing system 116 may receive indication of the error status and send a message to the user 10 and suggest the user 10 to correct the basis of the error status.

Operations for each of the processes described in this document can be executed in a distributed manner. For example, the remote computing system 116, the mobile cleaning robot 102, and the remote computing device 94 may execute one or more of the operations in concert with one another. Operations described as executed by one of the remote computing system 116, the mobile cleaning robot 102, and the mobile computing device 94 can in some implementations be executed at least in part by two or more of the remote computing system 116, the mobile cleaning robot 102, and the mobile computing device 94.

The following describes example techniques to enable the mobile robot 202 to recognize objects in the home. After the objects are recognized, the mobile robot 202 can update the persistent map 110 to include the objects that have been recognized. The updated persistent map can be shared with other mobile robots.

Figure 9:
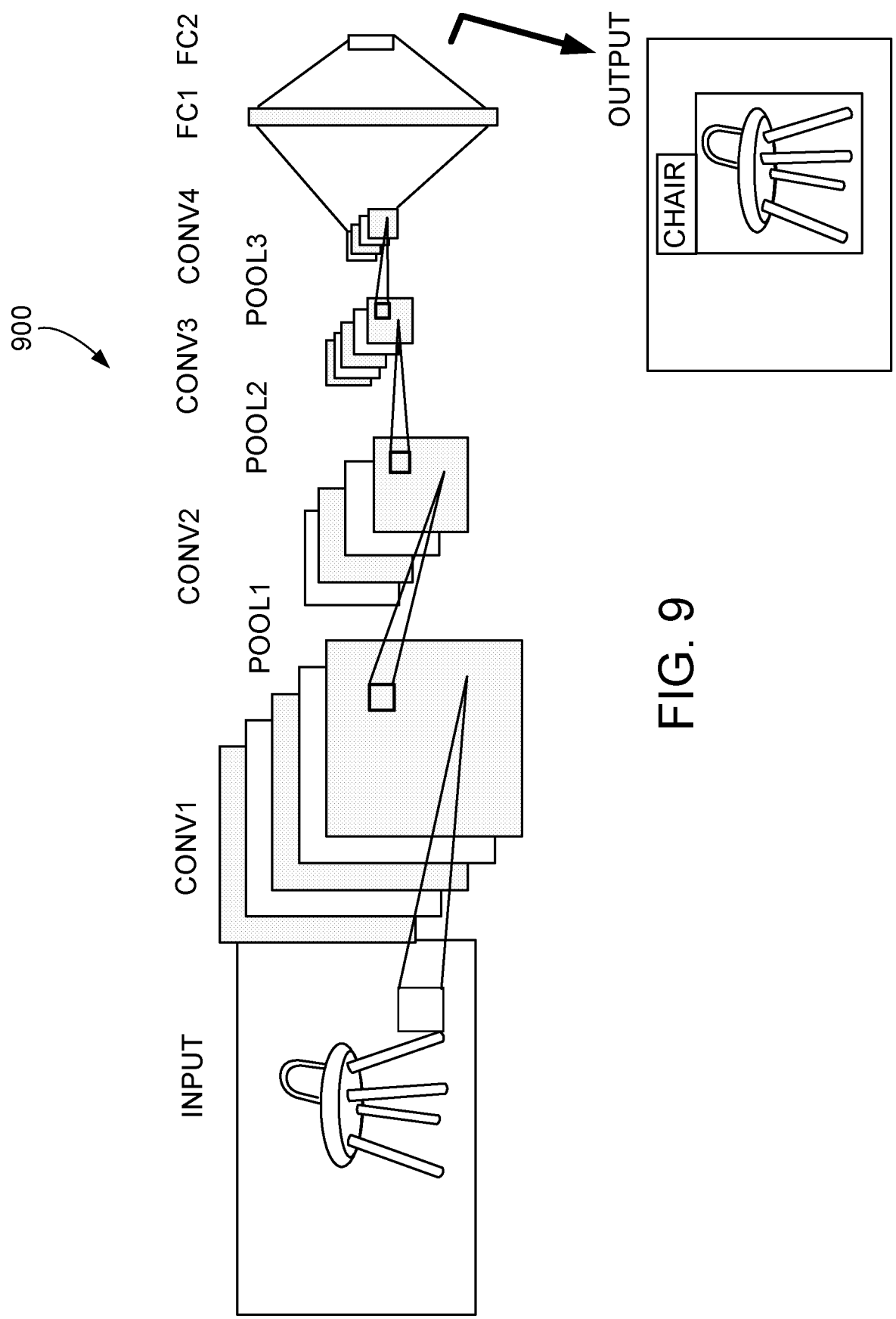
FIGS. 9 and 10 are diagrams of convolutional neural networks for recognizing objects in a home.

FIG. 9 shows an example architecture of a convolutional neural network 900 that can be used as the neural network 208 in the recognition module 206 (FIG. 2). In this example, the neural network 900 includes four convolutional layers, three average-pooling layers, and two fully connected layers. In the example shown in FIG. 9, the input to the network 900 is an image that includes a view of a chair. If the neural network 900 is trained to recognize chairs, the output of the network 900 will indicate that the object in the image is a chair.

Figure 10:
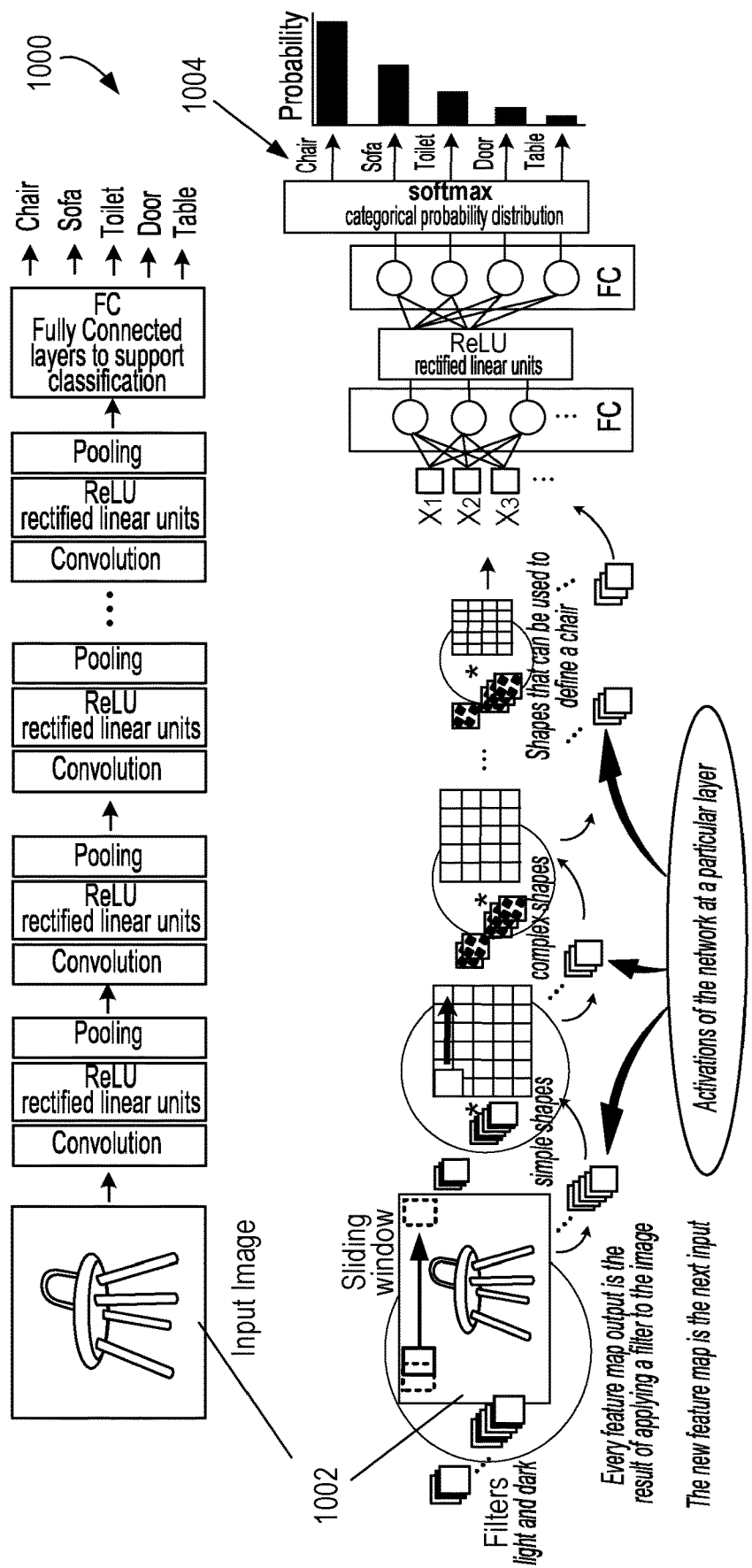

FIG. 10 shows another example architecture of a convolutional neural network 1000 that can be used as the neural network 208 in the recognition module 206 (FIG. 2). In this example, every feature map output is the result of applying a filter to the image, and the new feature map becomes the next input. The neural network includes several convolutional layers, average-pooling layers, and fully connected layers. In the example of FIG. 10, the input image 1002 is an image that includes a view of a chair. The output 1004 of the network 1000 indicates that the object in the image is most likely a chair.

Figure 11:
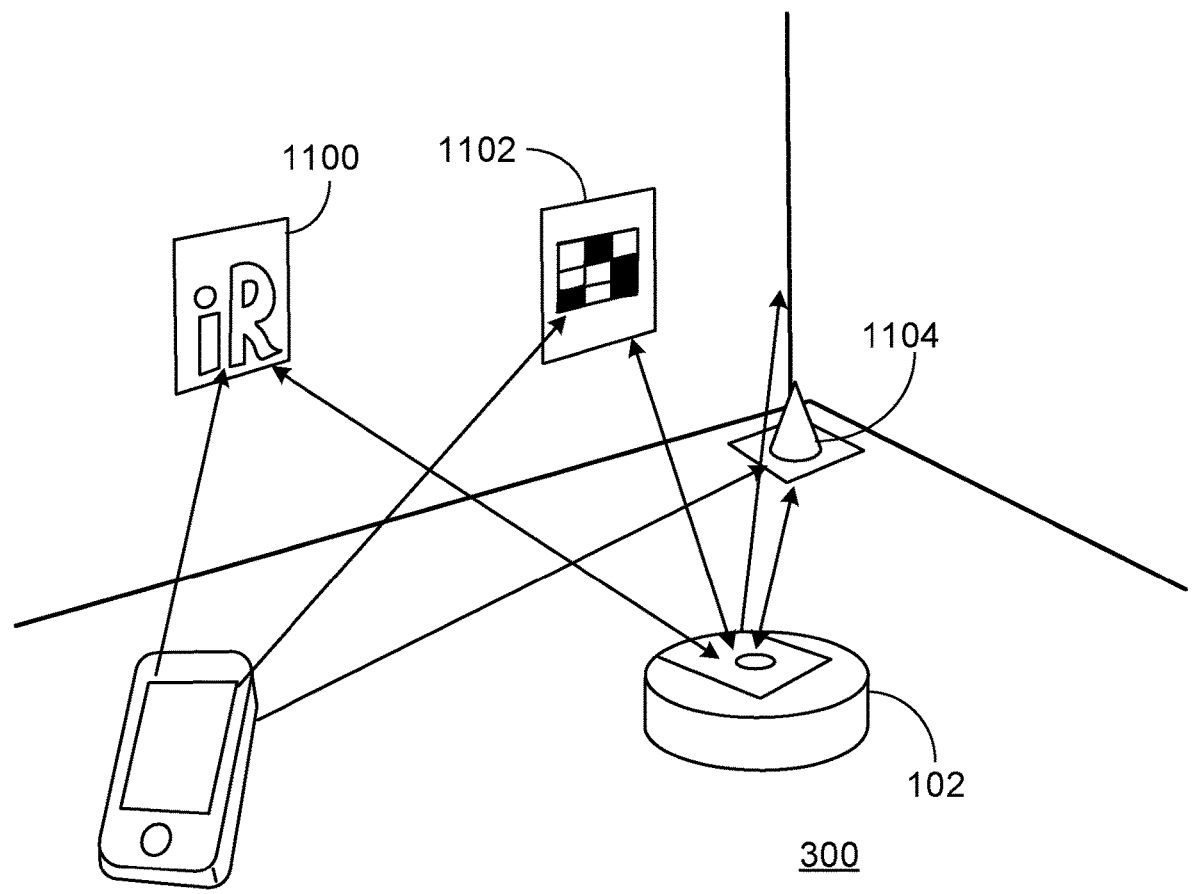
FIGS. 11 and 12 are diagrams showing examples of objects in rooms that can help a mobile cleaning robot understand its environment.

In some implementations, the robot 202 can use the camera 114 to capture images of its surroundings in the home 300 and recognize objects in order to help the robot 202 perform various tasks or to determine the location of the robot 202 on the map 110. Referring to FIG. 11, as the mobile robot 202 moves around the home 300 and performs the cleaning tasks, the mobile robot 202 updates the map to include various markers that it sees through the camera 114. For example, the markers may include one or more of a pattern 1100, a QR code 1102, and a beacon 1104. The mobile robot 202 recognizes the markers and places them on the map 110.

In some examples, the user 10 can inform the mobile robot 202 that particular markers (e.g., 1100, 1102, 1104) is in a particular room. This way, when the robot 202 sees the particular markers, the robot 202 knows that it is in the particular room. For example, a first marker can be placed in the room 302A, a second marker can be placed in the room 302B, a third marker can be placed in the room 302C, and a fourth marker can be placed in the room 302D. Suppose the user 10 wants to inform the robot 202 that the bed 306 in the room 302A is associated with the label "Bed." The user 10 can use a camera 2306 (FIG. 21) of the mobile computing device 94 to take a first image of the marker in the room 302A, take a second image of the bed 306, provide a label identifying that the object in the image is a "Bed," and send the first and second images and the label to the robot 202. The robot 202 recognizes the marker in the first image, so it knows that the object in the second image is in the room 302A. Based on the label provided by the user, the robot 202 knows that the object in the second image is a "Bed" in the room 302A. The robot 202 can update the persistent map 110, add the bed 306 to the map 110, and associate the newly added object on the map 110 with the label "Bed."

An augmented reality module 2308 (FIG. 21) executing on the mobile computing device 94 can generate a virtual space and track a correspondence between the real-world space that the user inhabits and the virtual space having visual virtual content using a visual-inertial odometry technique, in which information from the motion sensors is combined with computer vision analysis of the scene images captured by the one or more cameras. When the virtual content is displayed together with a live camera image, the user experiences augmented reality with an illusion that the virtual content is part of the real world. The augmented reality module 2308 can be used to help the robot 202 determine which object is being labeled by the user 10. In an augmented reality session, the augmented reality module 2308 establishes a coordinate system of a virtual space and tracks a correspondence between the virtual space and the real-world space.

In some implementations, the user 10 can use the augmented reality module 2308 executing on the mobile computing device 94 to determine the virtual space coordinates of an object (e.g., a chair) in the home 300, determine the virtual space coordinates of the mobile cleaning robot 202, and determine the orientation angle of the mobile cleaning robot 202 in the virtual space. Because of the correspondence between the virtual space and the real world, the mobile cleaning robot 202 can determine the real-world position of the object (e.g., the chair) in the home 300 relative to the mobile cleaning robot 202 based on the virtual-space position of the object relative to the mobile cleaning robot 202. Likewise, the mobile cleaning robot 202 can determine the orientation angle of the mobile cleaning robot 202 relative to a reference direction in the real world based on the orientation angle of the mobile cleaning robot 202 relative to a corresponding reference direction in the virtual space In some examples, the mobile computing device 94 determines the position of the object (e.g., the chair) relative to the mobile cleaning robot 202 based on a difference between the coordinates of the object (e.g., the chair) in the virtual space and the coordinates of the mobile cleaning robot 202 in the virtual space. The mobile computing device 94 sends to the mobile cleaning robot 202 information about the relative position of the object (e.g., the chair) and information about the orientation angle of the mobile cleaning robot 202. Based on the information about the relative position of the object (e.g., the chair) and information about the orientation angle of the mobile cleaning robot 202, the mobile cleaning robot 202 can determine the position of the object (e.g., the chair) and navigate to the object.

In some examples, the mobile computing device 94 sends the virtual-space coordinates of the object (e.g., the chair), the virtual-space coordinates of the mobile cleaning robot 202, and the orientation angle of the mobile cleaning robot 202 relative to a reference direction in the virtual space to the mobile cleaning robot 202. Based on the received information, the mobile cleaning robot 202 determines the relative coordinates of the object (e.g., the chair) and navigates to the object.

For example, the mobile computing device 94 uses the augmented reality module 2308 to determine a virtual plane that is parallel to and lies on the floor surface. The virtual plane corresponds to the x-y plane in the coordinate system of the virtual space. The mobile computing device 94 uses the augmented reality module 2308 to determine that the object (e.g., the chair) is at coordinates (x1, y1, 0) in the virtual space, the mobile cleaning robot 202 is at coordinates (x2, y2, 0) in the virtual space, and the orientation angle of the mobile cleaning robot is θ degree relative to the +x axis. The mobile computing device 94 sends relevant information to the mobile cleaning robot 202. The mobile cleaning robot 202 determines that the object is at a direction $$\theta - \tan^{-1} \frac{y1 - y2}{x1 - x2}$$

degrees clockwise relative to the current heading of the robot 202, and at a distance of $\sqrt{(y1-y2)^2+(x1-x2)^2}$ relative to the robot 202. Thus, if the user 10 identifies the object as a "Chair," the mobile robot 202 knows that the object at a direction $$\theta - \tan^{-1} \frac{y1 - y2}{x1 - x2}$$

degrees clockwise relative to the current heading of the robot 202, and at a distance of $\sqrt{(y1-y2)^2+(x1-x2)^2}$ relative to the robot 202, is associated with the label "Chair." The augmented reality module 2308 provides a convenient mechanism for the user 10 to convey information about real-world objects to the mobile robot 202.

In some implementations, the mobile computing device 94 provides a user interface 2304 on, e.g., a touch screen display to enable the user 10 to easily identify the objects in the home 300 and identify the mobile cleaning robot 202. For example, the user 10 can point the camera 2306 of the mobile computing device 94 towards an object (e.g., a chair) that the user 10 intends to identify (i.e., provide the label to the robot 202), and an image of a scene that includes the object is shown on the touch screen display. The user 10 provides a touch input by touching the spot in the image on the touch screen display to identify the object. The augmented reality module 2308 performs an image analysis to determine a first point in the real world that corresponds to the spot in the image identified by the user 10, and determines the coordinates of the first point in the virtual space coordinate system. Then the user 10 moves the mobile computing device 94 to a vicinity of the mobile cleaning robot 202. As the user 10 moves from a vicinity of the object (e.g., the chair) to be identified to the vicinity of the mobile cleaning robot 202, the augmented reality module 2308 continues to analyze the images captured by the camera 2306 and the motion sensing data provided by motion sensors 2310, and uses visual-inertial odometry techniques to determine the position and orientation of the mobile computing device 94 in the real world.

The user 10 points the camera 2306 of the mobile computing device 94 towards the mobile cleaning robot 202, and an image of the mobile cleaning robot 202 is shown on the touch screen display. In some implementations, the system analyzes the scene images captured by the camera 2306 (e.g., using a deep machine learning module having, e.g., a neural network that has been trained to recognize mobile robots) and automatically recognizes the mobile cleaning robot 202 without further input from the user 10. The augmented reality module 2308 performs an image analysis to determine a second point in the real world that corresponds to a point, e.g., the center, of the mobile cleaning robot 202 in the image, and determines the coordinates of the second point in the coordinate system of the virtual space. The system can send the coordinates of the first point and the coordinates of the second point to the mobile cleaning robot 202, and the mobile cleaning robot 202 can determine the position of the first point relative to the second point. Alternatively, the system can determine the position of the first point relative to the second point based on differences between the coordinates of the first point and the coordinates of the second point, and send the relative position information to the mobile cleaning robot 202.

In some implementations, the system provides a user interface to enable the user 10 to manually rotate the mobile cleaning robot 202 to change the orientation angle of the mobile cleaning robot 202 so that the mobile cleaning robot 202 is aligned with a certain direction, e.g., the +x axis or the +y axis. In some implementations, the system analyzes the scene images captured by the camera 2306 and automatically recognizes the orientation angle of the mobile cleaning robot 202 without further input from the user. The mobile computing device 94 sends to the mobile cleaning robot 202 information about the relative position of the object (e.g., the chair) to be identified (or the coordinates of the mobile cleaning robot 202 and the coordinates of the object) and information about the orientation angle of the mobile cleaning robot 202. Based on the information about the relative position of the object (or the coordinates of the mobile cleaning robot 202 and the coordinates of the object) and information about the orientation angle of the mobile cleaning robot 202, the mobile cleaning robot 202 can determine the location of the object, navigate to the object, and associate the user-provided label with that object.

In some examples, it is not necessary for the mobile cleaning robot 202 to navigate to the object in order to associate the user-provided label with the object. Based on the coordinate information provided by the mobile computing device 94, the mobile cleaning robot 202 can place the object on the map 110 and associate the object with the label provided by the user. In some examples, it is useful for the mobile cleaning robot 202 to navigate to the object, capture images of the object from various angles, and use the images of the object to train the neural network 124 so that the neural network will be able to recognize the object in the future.

In some implementations, the mobile computing device 94 includes a first image detection module having a first neural network (e.g., a convolutional neural network) that is configured to recognize the mobile cleaning robot 202. The first neural network is trained using several images of the mobile cleaning robot 202 or other mobile cleaning robots of the same model. The training images include images of the mobile cleaning robot 202 taken from various distances relative to the mobile cleaning robot 202, various viewing angles relative to the mobile cleaning robot 202, and under various lighting conditions. This allows the trained neural network to be able to recognize the mobile cleaning robot 202 under various lighting conditions, and under various circumstances in which the user can hold the camera 2306 of the mobile computing device 94 at an arbitrary distance (within a certain range) and at an arbitrary viewing angle relative to the mobile cleaning robot 202.

In some implementations, the mobile computing device 94 includes a second image detection module having a second neural network that is configured to recognize the orientation angle of the mobile cleaning robot 202. The second neural network is trained using several images of the mobile cleaning robot 202 or other mobile cleaning robots of the same model, in which the mobile cleaning robot 202 is oriented at various angles. The training images include images of the mobile cleaning robot 202 taken from various distances relative to the mobile cleaning robot 202, various viewing angles relative to the mobile cleaning robot 202, and under various lighting conditions. This allows the trained neural network to be able to recognize the orientation angle of the mobile cleaning robot 202 under various lighting conditions, and under various circumstances in which the user can hold the camera 2306 of the mobile computing device 94 at an arbitrary distance (within a certain range) and at an arbitrary viewing angle relative to the mobile cleaning robot 202.

In some implementations, during an augmented reality session, the user 10 identifies three or more markers (not in the same plane) and an object (e.g., a chair) in the home 300, and the augmented reality module 2308 determines the coordinates of the markers and the object (e.g., chair) in the virtual space. The mobile computing device 94 sends to the robot 202 the coordinates of the markers and the coordinates of the object (e.g. chair).

As discussed above, when the robot 202 moves around the home 300 and performs the cleaning tasks, the robot 202 updates the map 110 to include various markers that it sees through the camera 114. The robot 202 knows the coordinates of the markers in the robot coordinate system. By using information about the markers, the robot 202 can perform coordinate transformation or triangulation to determine the positions of the objects. Based on the coordinates of three or more markers in the three-dimensional (3D) virtual space coordinate system, and the coordinates of the markers in the 3D robot coordinate system, the robot 202 can determine a transformation between the 3D virtual space coordinate system and the 3D robot coordinate system. Given the coordinates of the object (e.g., chair) in the virtual space coordinate system, and based on information about the transformation between the virtual space coordinate system and the robot coordinate system, the robot 202 can determine the coordinates of the object (e.g., chair) in the robot coordinate system. Thus, if the user identifies an object as a "Chair" using the augmented reality module 2308, the robot 202 can determine which object is being labeled as a "Chair" by the user 10.

If the robot 202 knows the distances of an object to the markers, the robot 202 can determine the location of the object relative to the three or more markers using 3D triangulation. For example, using the information of the coordinates of the markers and the object (e.g., chair) in the virtual space coordinate system, the robot 202 can determine the distance from the object (e.g., chair) to each marker. Using the information about the coordinates of the markers in the robot coordinate system and the information about the distance from the object (e.g., chair) to each of the markers, the robot 202 can determine the coordinates of the object (e.g., chair) in the robot coordinate system by triangulation, and thus can determine which object is being labeled as a "Chair" by the user 10.

Figure 12:
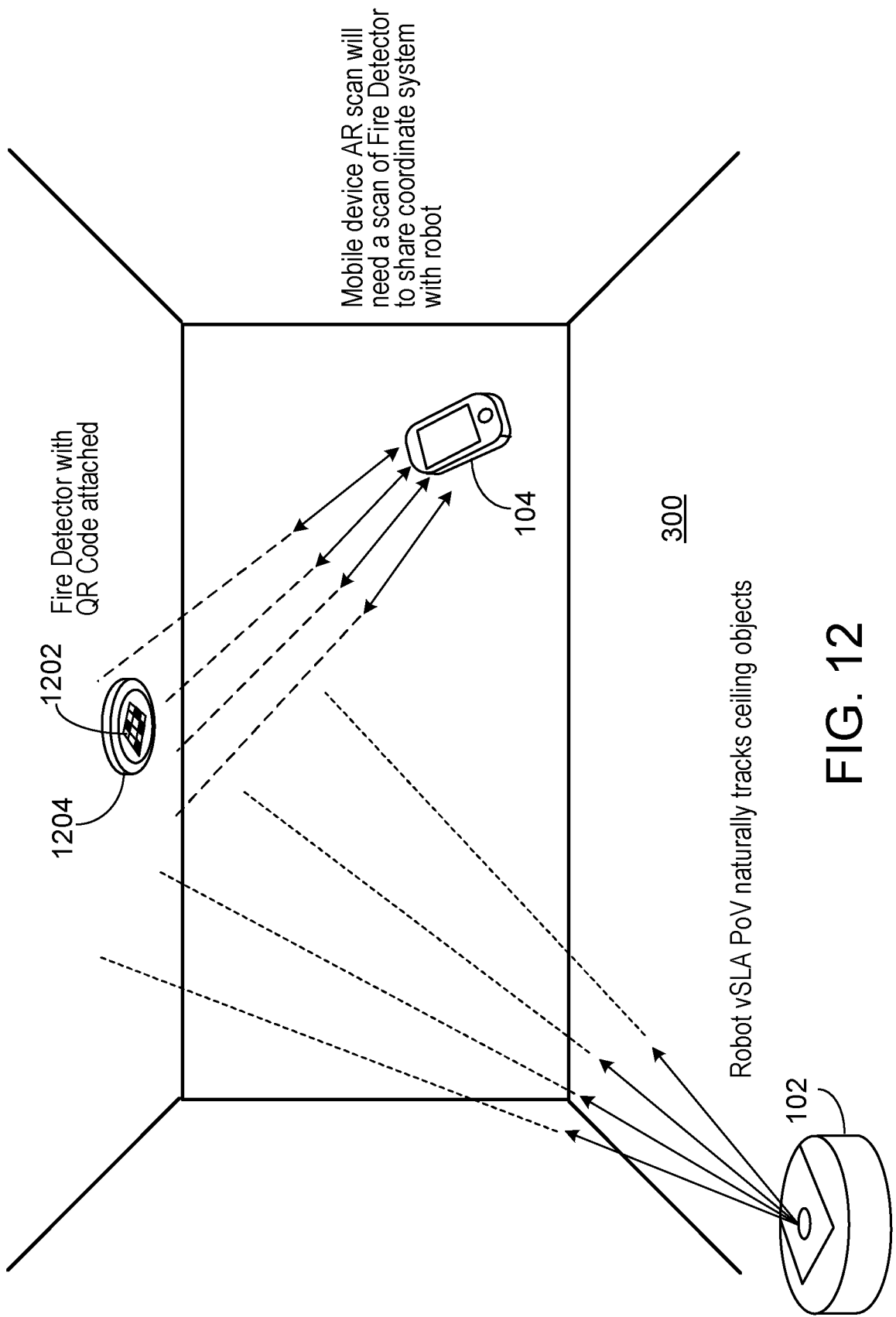

Referring to FIG. 12, in some implementations, a marker can be made small and placed at an inconspicuous location. For example, a QR code 1202 can be placed on a fire detector 1204 that is mounted on the ceiling. As another example, a QR code can be placed on the frame of a recessed ceiling light. Multiple QR codes can be placed at selected locations on the ceiling. By placing the QR code 1202 and other markers on or near the ceiling, the markers will have little effect on the décor of the home 300 and be less distracting to the user 10. The robot 202 is provided with a high resolution camera or a zoom lens that enables the robot 202 to detect the markers on or near the ceiling. As the robot 202 moves in the home 300, the simultaneous localization and mapping (SLAM) sensors will track the locations of the objects on or near the ceiling, including the markers (e.g., the QR code 1202).

For example, when the augmented reality module 2308 is used to determine coordinates of the robot 202 and the objects, a robot management program 2312 (FIG. 21) executing on the mobile computing device 94 prompts the user 10 to scan the markers, such as the QR code 1202 on the ceiling. The augmented reality module 2308 determines the coordinates of the markers on the ceiling and uses that information to assist in sharing the virtual space coordinate system with the robot 202. This way, when the user 10 identifies an object in the virtual space, and the augmented reality module 2308 determines the coordinates of the object in the virtual space, the robot 202 can determine which object is being identified by the user 10.

For example, using the augmented reality module 2308, the user 10 can walk around the home 300, point the camera 2306 of the mobile computing device 94 at various objects, and the images of the objects appear on the touch screen display of the mobile computing device 94. The user 10 taps on an object in the image, such as a chair, and provides the label "Chair" through the user interface 2304. The augmented reality module 2308 determines the coordinates of the chair in the virtual space. The mobile computing device 94 sends the virtual space coordinates of the chair and the label "Chair" to the robot 202. Using coordinate transformation or triangulation, the robot 202 determines the robot coordinates of the object being labeled as "Chair." The next time the robot 202 navigates near the chair, the robot 202 knows that the object is associated with the label "Chair" provided by the user 10. In a similar manner, the user can quickly provide labels to the other objects in the home 300, and the robot 202 will be able to determine which labels apply to which objects.

In some implementations, the user 10 can assign properties to the objects in the home 300, and the mobile robot 202 can perform tasks taking into account of the properties. The properties of the objects can be added to the persistent map 110. For example, the user 10 can indicate that certain objects, such as floor vases or certain wood furniture, have the "No Touch" property. When the mobile robot 202 encounters an object associated with the "No Touch" property, the robot 202 may use a "No-Touch" navigation mode near the object so that the robot 202 does not contact the object to avoid damaging the object.

Figure 13:
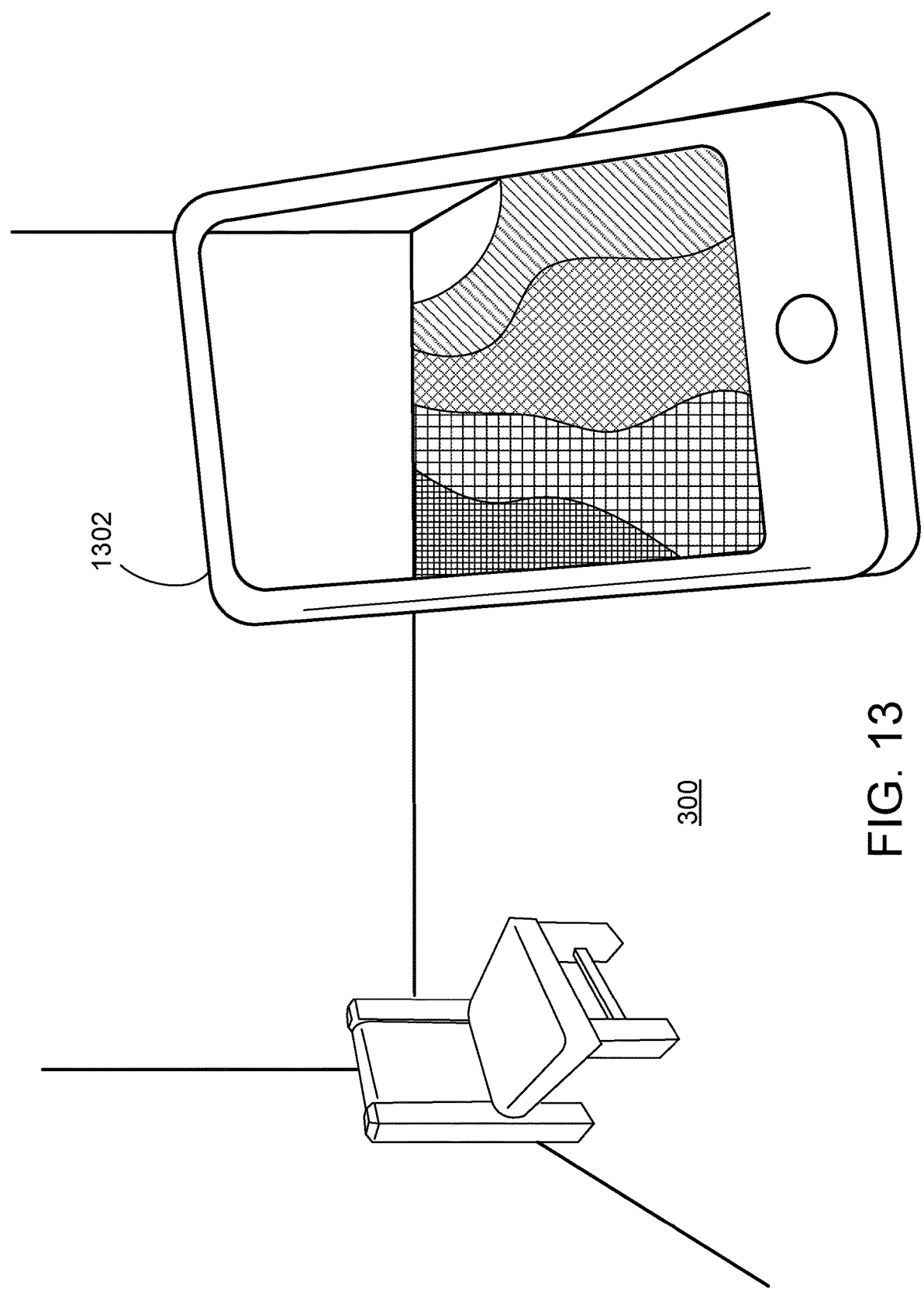
FIG. 13 is a diagram of an example in which information is overlaid on a floor map established by a mobile cleaning robot.

Referring to FIG. 13, in some implementations, the persistent map 110 can include additional information useful to the user 10. For example, as the robot 102 moves about the home 300, the robot 102 determines the Wi-Fi signal strength at various locations in the home 300 and records that information in the persistent map 110. The robot 102 transmits the information about the Wi-Fi signal strength at various locations to the mobile computing device 104, and the robot management program 2312 uses that information to generate a Wi-Fi heat map 1302 that is overlaid on the map 2302 that is shown to the user 10.

The Wi-Fi heat map 2302 shows the regions in the home 300 that have stronger Wi-Fi signals, and the regions in the home 300 that have weaker Wi-Fi signals. The Wi-Fi heat map 2302 can help the user 10 determine whether the Wi-Fi router is placed at the optimal location, and determine where to place electronic devices in the home 300 so that the devices can receive stronger Wi-Fi signals.

Figure 14:
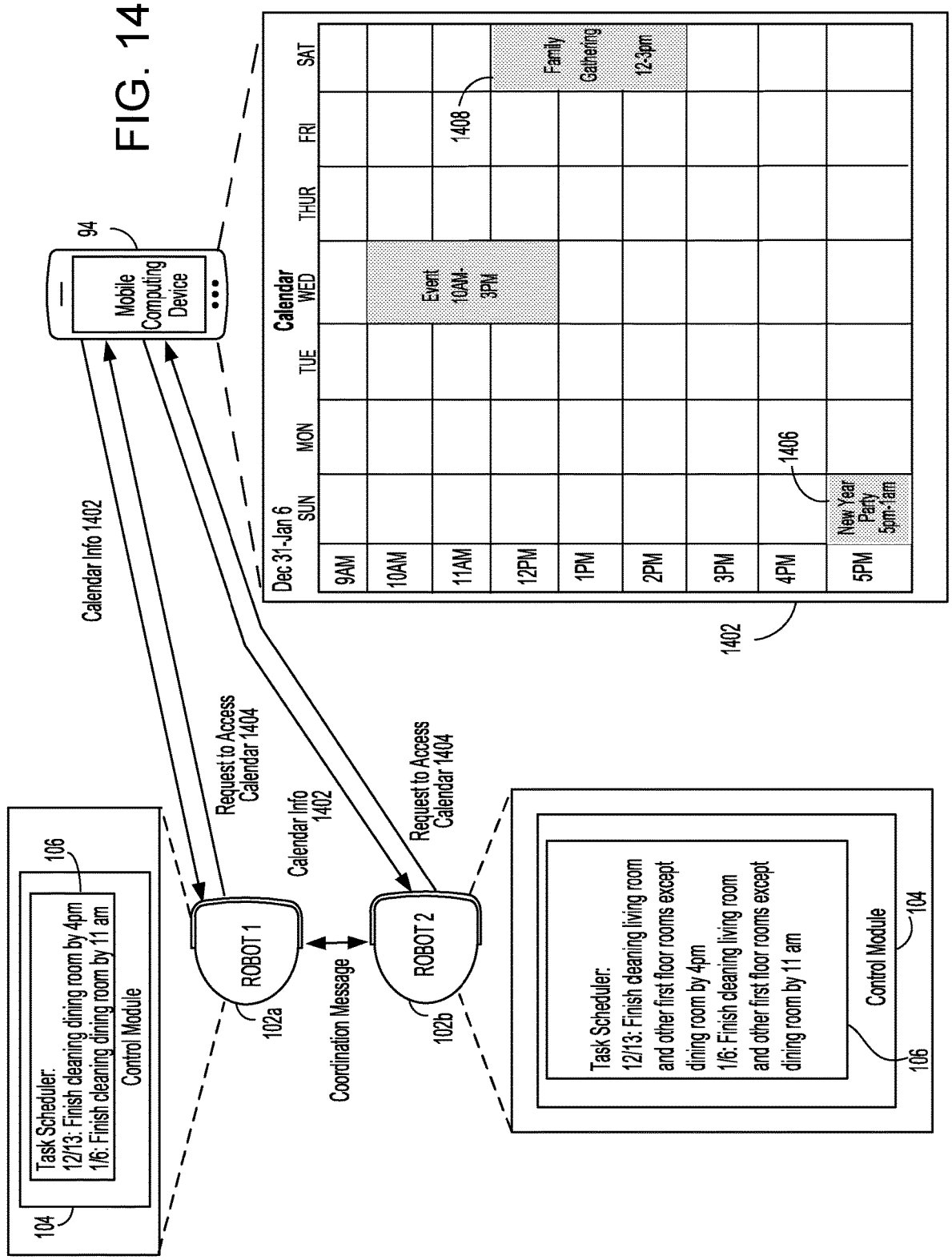
FIG. 14 is a diagram of an example in which mobile cleaning robots schedule tasks taking into account of user calendar information.

Referring to FIG. 14, in some implementations, the robots 102a, 102b can intelligently schedule tasks using information from a calendar 1402 of the user 10. The robots 102a, 102b send requests 1404 to the mobile computing device 94 asking for access to the calendar 1402 of the user 10. The mobile computing device 94 sends the calendar 1402 to the robots 102a, 102b. It is understood that the user 10 has previously approved sharing of the calendar between the mobile computing device 94 and the robots 102a and 102b. The calendar 1402 includes a calendar entry 1406 indicating there is a New Year Party from 5 pm to 1 am on Sunday, December 31, and a family gathering from 12 pm to 3 pm on Saturday, January 6.

The task scheduler 106 of the robots 102a, 102b schedule cleaning tasks taking into account of the calendar information 1402. For example, the task scheduler 106 of the robots 102a, 102b may schedule cleaning tasks in the first floor rooms to be finished by 4 pm on December 31 so that the home can be ready for the New Year Party starting at 5 pm that day. The task scheduler 106 of the robots 102a, 102b may schedule cleaning tasks in the first floor rooms to be finished by 11 am on January 6 so that the home can be ready for the family gathering starting at noon that day. The robots 102a and 102b may coordinate with each other to divide up the cleaning tasks in the various rooms on the first floor so that the cleaning tasks can be completed on time. In some examples, the robots 102a and 102b may perform the cleaning tasks in parallel. In some examples, the robots 102a and 102b may perform the cleaning tasks in sequence, so that the first robot 102a performs the cleaning tasks when the second robot 102b is charging at the docking station 332, and the second robot 102b performs the cleaning tasks when the first robot 102a is charging at the docking station 332.

In some implementations, the mobile robots 102a and 102b may change how they collaborate in performing the cleaning tasks depending on the schedule of the user 10. For example, each of the cleaning robots 102a, 102b may keep track of the amount of time needed to perform a particular cleaning task, such as the amount of time needed to clean each of the rooms 302A, 302B, 302C, and 302D. The robots 102a and 102b may normally operate in "Sequential Mode" such that the robots 102a and 102b operate in sequence so that only one robot is cleaning the home at a given time. Suppose the robots 102a, 102b are normally scheduled to clean the home between 9 am to 11 pm, and that it takes about 2 hours to finish cleaning the rooms 302A to 302D when the robots 102a and 102b operate in sequence. Based on information provided by the calendar 1402, the robots 102a, 102b know there is an event 1410 at 10 am on January 3. The robots 102a and 102b may switch to operating in "Parallel Mode" such that the robots 102a and 102b operate in parallel. This way, the robots 102a, 102b can finish cleaning the home in one hour, from 9 am to 10 am.

Figure 15:
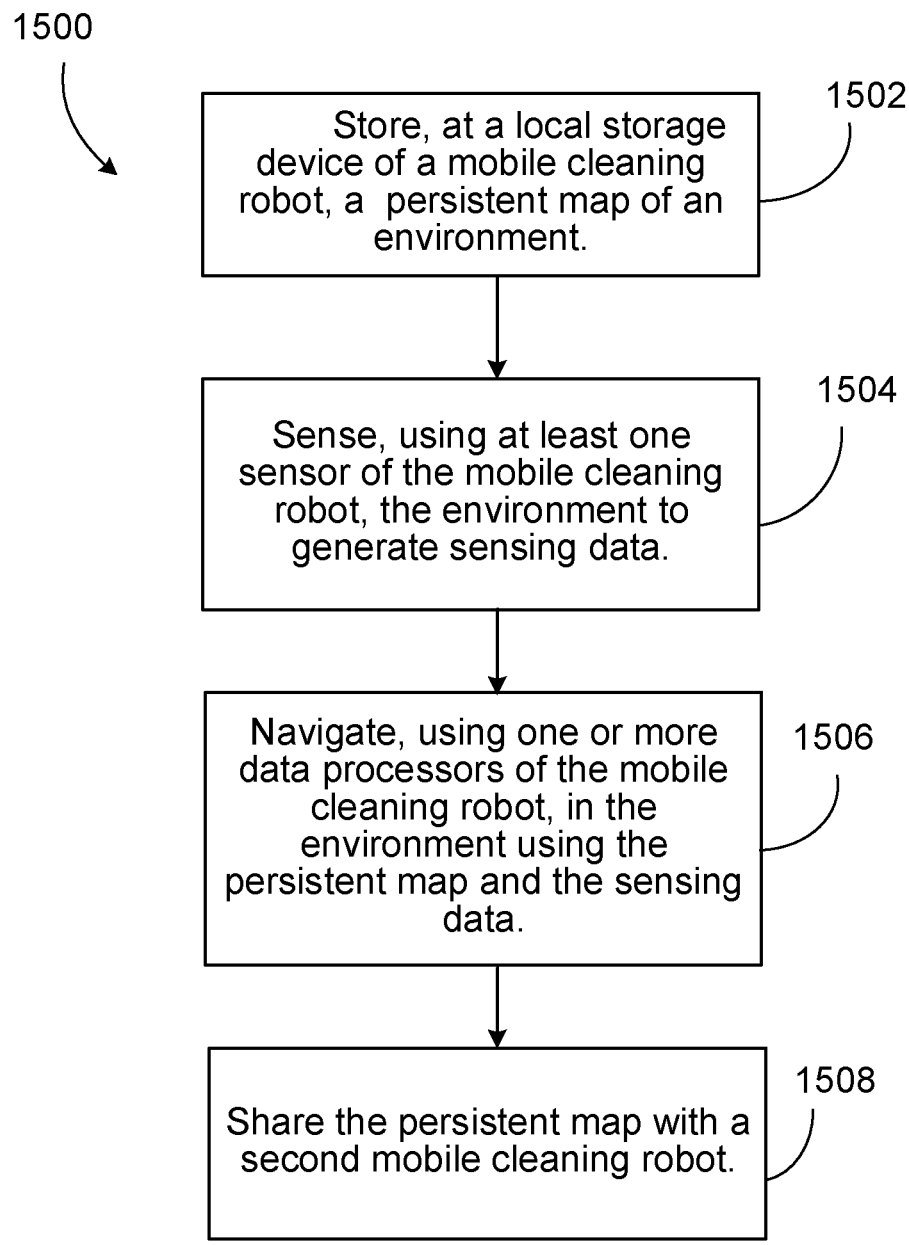
FIG. 15 is a flow diagram of an example process for operating a mobile cleaning robot having teaming capabilities.

Referring to FIG. 15, an example process 1500 for operating a mobile robot to coordinate with another mobile robot is provided. For example, the mobile robot can be a mobile cleaning robot, such as the robot 102a or 102b of FIG. 1 or the robot 202a or 202b of FIG. 2. The process 1500 includes storing 1502, at a local storage device of a mobile cleaning robot, a persistent map of an environment. For example, the mobile cleaning robot can be the mobile robot 102a, the local storage device can be the storage device 108, and the persistent map can be the persistent map 110 (FIG. 1).

The process 1500 includes, sensing 1504, using at least one sensor of the mobile cleaning robot, the environment to generate sensing data. For example, the at least one sensor can be the one or more cameras 114, and the environment can be the home 300 or 400. The sensing data can be images captured by the camera 114.

The process 1500 includes navigating 1506, using one or more data processors of the mobile cleaning robot, in the environment using the persistent map and the sensing data. For example, the one or more data processors can be the one or more data processors of the control module 104, which in combination with the navigation module 112 controls the robot 102a in navigating the environment.

The process 1500 includes sharing 1508 the persistent map with a second mobile cleaning robot. For example, the first mobile robot 102a can generate or update the persistent map 110 and share the map with the second mobile robot 102b. In some examples, as shown in FIG. 1, sharing the map 110 can involve uploading the map 110 to the remote computing system 116. In some examples, as shown in FIG. 2, sharing the map 110 can involve sending the map from the first mobile robot 202a to the second mobile robot 202b.

The process 1500 includes coordinating with the second mobile cleaning robot to perform cleaning tasks. For example, the first mobile robot 102a can coordinate with the second mobile robot 102b when cleaning the home 300. For example, the first robot 102a can perform a first cleaning task, and upon finishing the first cleaning task and returning to its docking station, inform the second robot 102b that the first robot 102a has finished the first cleaning task. The second robot 102b can, in response to receiving the message that the first robot 102 has finished a first cleaning task, start to perform a second cleaning task.

For example, the first robot 102a can perform a first cleaning task without completing the first cleaning task. The first robot 102a may clean a first portion of the room 302B and return to the docking station to recharge its battery. The first robot 102a may send a message to the second robot 102b that the first portion of the room 302B has been cleaned, and that the cleaning stopped at a first location in the room 302B. The second robot 102b, upon receiving the message from the first robot 102a, navigates to the first location in the room 302B and continues to clean the remaining portion of the room 302B.

For example, the first mobile robot 102a can clean a room in parallel with the second mobile robot 102b, in which the first mobile robot 102a starts cleaning from one end of the room while the second mobile robot 102 starts cleaning from the other end of the room.

Figure 16:
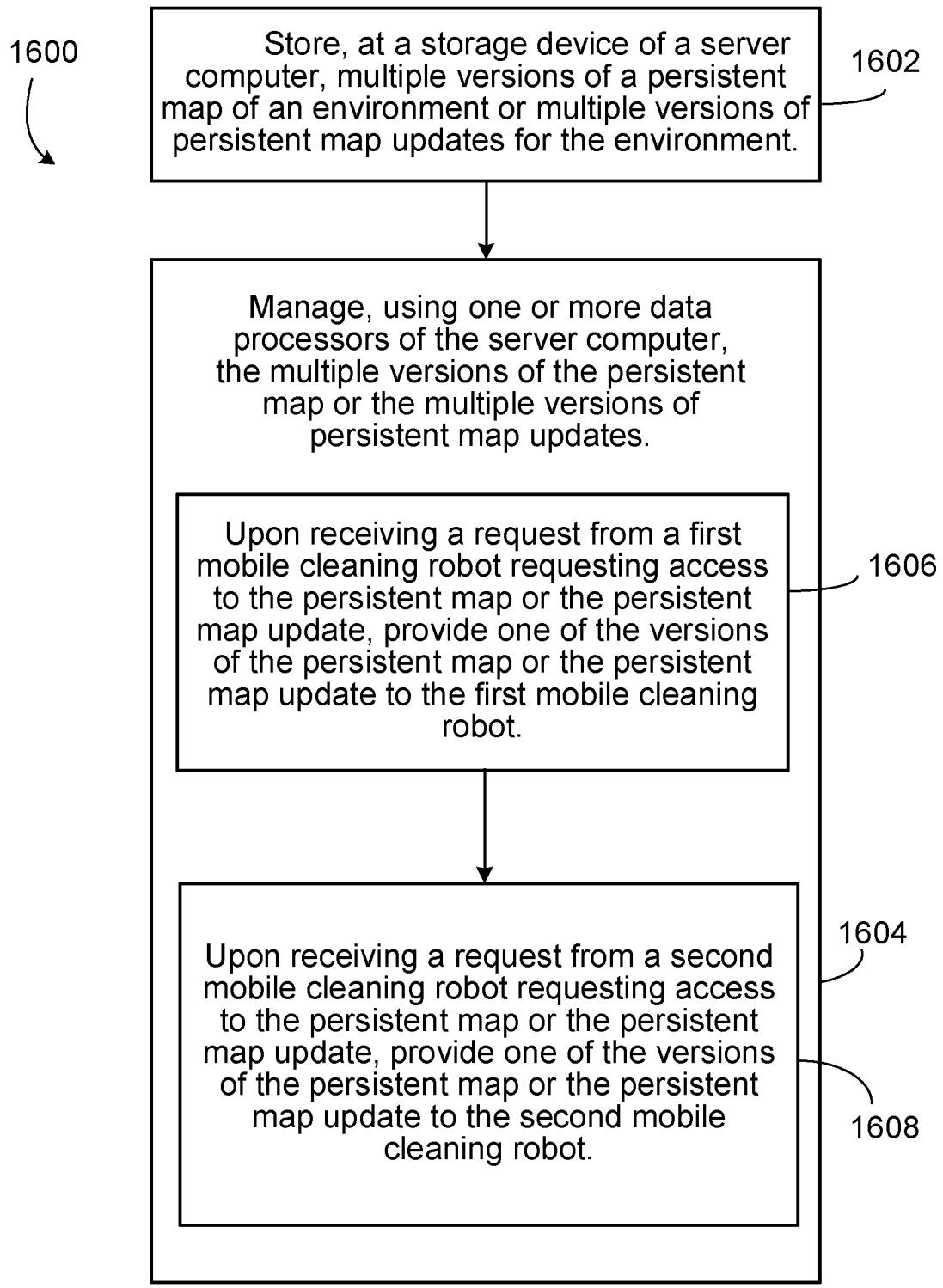
FIG. 16 is a flow diagram of an example process for operating a server computer to manage multiple versions of a persistent map and map updates.

Referring to FIG. 16, an example process 1600 for operating multiple mobile robots having teaming capabilities is provided. For example, the mobile robots can be mobile cleaning robots, such as the robots 102a, 102b of FIG. 1 or the robots 202a, 202b of FIG. 2. The process 1600 includes storing 1602, at a storage device of a server computer, multiple versions of a persistent map of an environment or multiple versions of persistent map updates for the environment. For example, the server computer can be the remote computing system 116 (FIG. 1), and the storage device can be the storage device 118. The multiple versions of the persistent map can be the versions of the persistent map 120, and the multiple versions of the persistent map updates can be the versions of the persistent map updates 122. The environment can be, e.g., the home 300 or 400.

The process 1600 includes managing 1604, using one or more data processors of the server computer, the multiple versions of the persistent map or the multiple versions of persistent map updates.

Managing the versions of the map or map updates includes, upon receiving a request from a first mobile cleaning robot requesting access to the persistent map or the persistent map update, providing 1606 one of the versions of the persistent map or the persistent map update to the first mobile cleaning robot. For example, the remote computing system 116 may receive a request from the first mobile robot 102a, and in response provides one of the versions of the persistent map 120 or the persistent map update 122 to the first mobile cleaning robot 102a.

Managing the versions of the map or map updates further includes, upon receiving a request from a second mobile cleaning robot requesting access to the persistent map or the persistent map update, providing 1608 one of the versions of the persistent map or the persistent map update to the second mobile cleaning robot. For example, the remote computing system 116 may receive a request from the second mobile robot 102b, and in response provides one of the versions of the persistent map 120 or the persistent map update 122 to the second mobile cleaning robot 102b.

Figure 17:
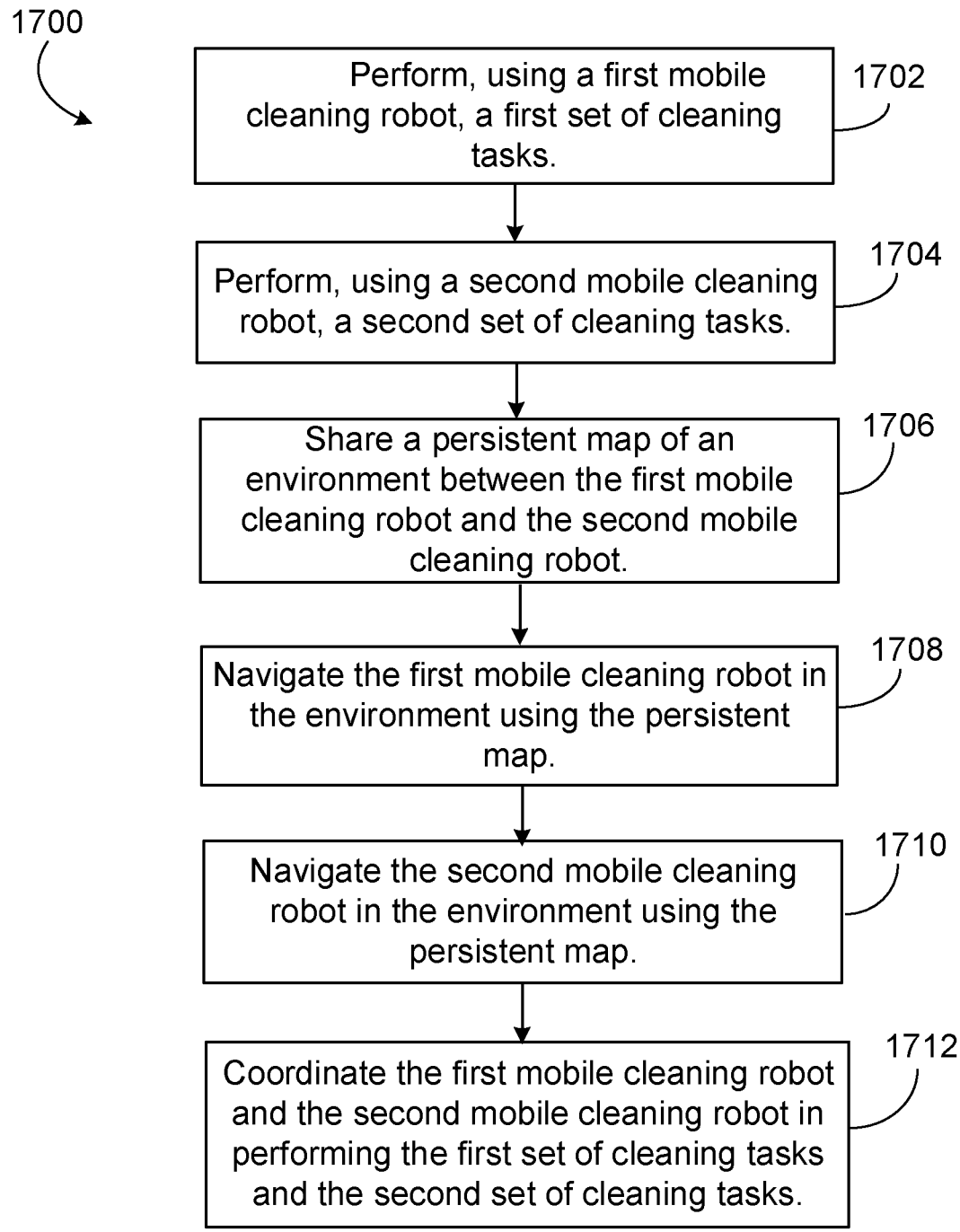
FIGS. 17, 18A, 18B, and 19 are flow diagrams of example processes for operating multiple mobile cleaning robots having teaming capabilities.

Referring to FIG. 17, an example process 1700 for operating multiple mobile robots having teaming capabilities is provided. For example, the mobile robots can be mobile cleaning robots, such as the robots 102a, 102b of FIG. 1 or the robots 202a, 202b of FIG. 2. The process 1700 includes performing 1702, using a first mobile cleaning robot, a first set of cleaning tasks. For example, the first mobile cleaning robot can be the first robot 102a or 202a.

The process 1700 includes performing 1704, using a second mobile cleaning robot, a second set of cleaning tasks. For example, the second mobile cleaning robot can be the second robot 102b or 202b.

The process 1700 includes sharing 1706 a persistent map of an environment between the first mobile cleaning robot and the second mobile cleaning robot. For example, the persistent map can be the persistent map 110.

The process 1700 includes navigating 1708 the first mobile cleaning robot in the environment using the persistent map. For example, the first mobile robot 102a can navigate in the home 300 using the map 110 stored in the storage device of the first mobile robot 102a.

The process 1700 includes navigating 1710 the second mobile cleaning robot in the environment using the persistent map. For example, the second mobile robot 102b can navigate in the home 300 using the map 110 stored in the storage device of the second mobile robot 102b.

The process 1700 includes coordinating 1712 the first mobile cleaning robot and the second mobile cleaning robot in performing the first set of cleaning tasks and the second set of cleaning tasks. For example, the first and second mobile robots 102a and 102b (or 202a and 202b) can coordinate with each other when cleaning the home 300. The robot 102a can clean the bedroom 302A, the robot 102b can clean the bathroom 302C, and both robots 102a and 102b can clean the dining room 302B in parallel. The first mobile robot 102a can start cleaning from one end of the dining room 302B, and the second mobile robot 102b can start cleaning from the other end of the dining room 302B.

Figure 18A:
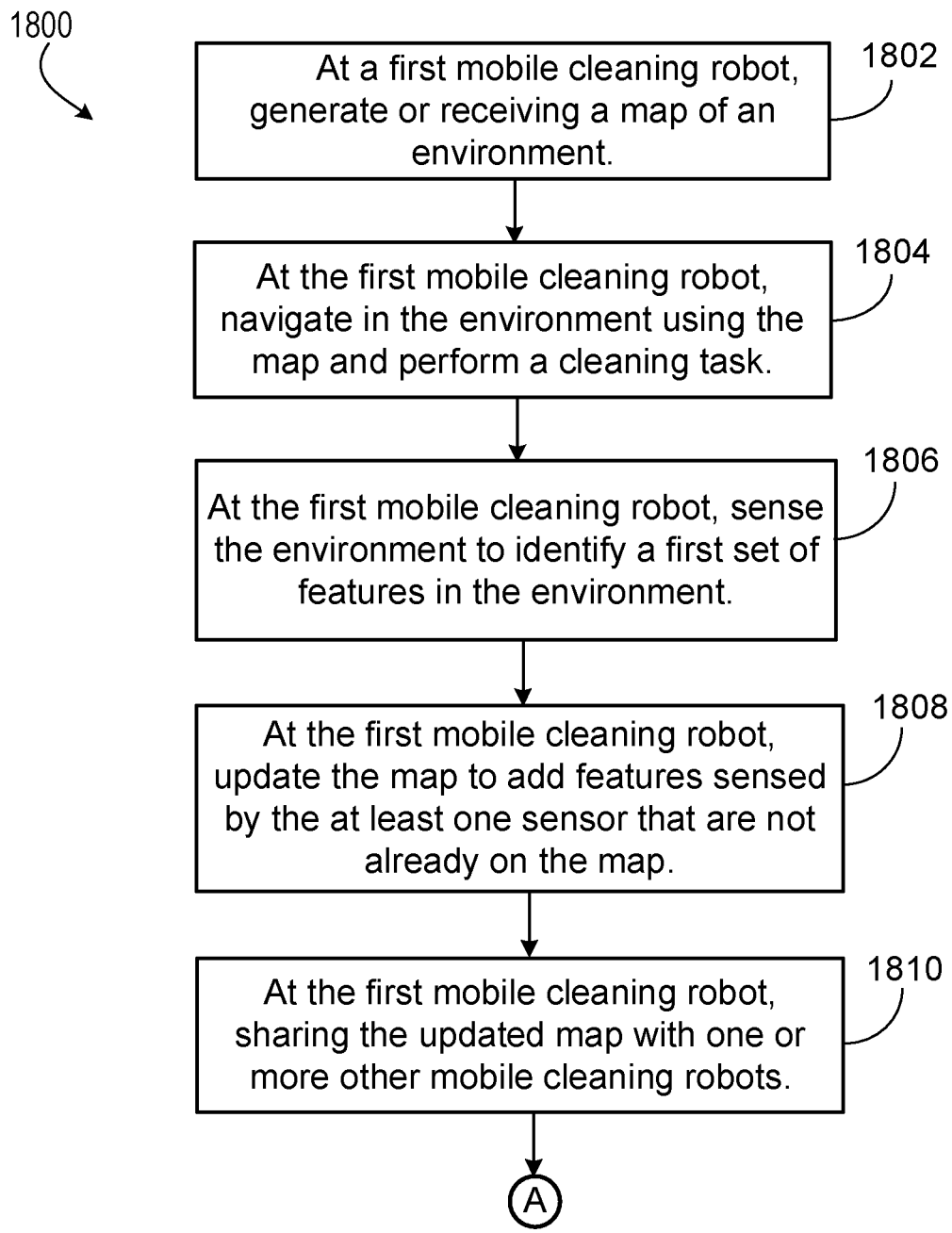
Figure 18B:
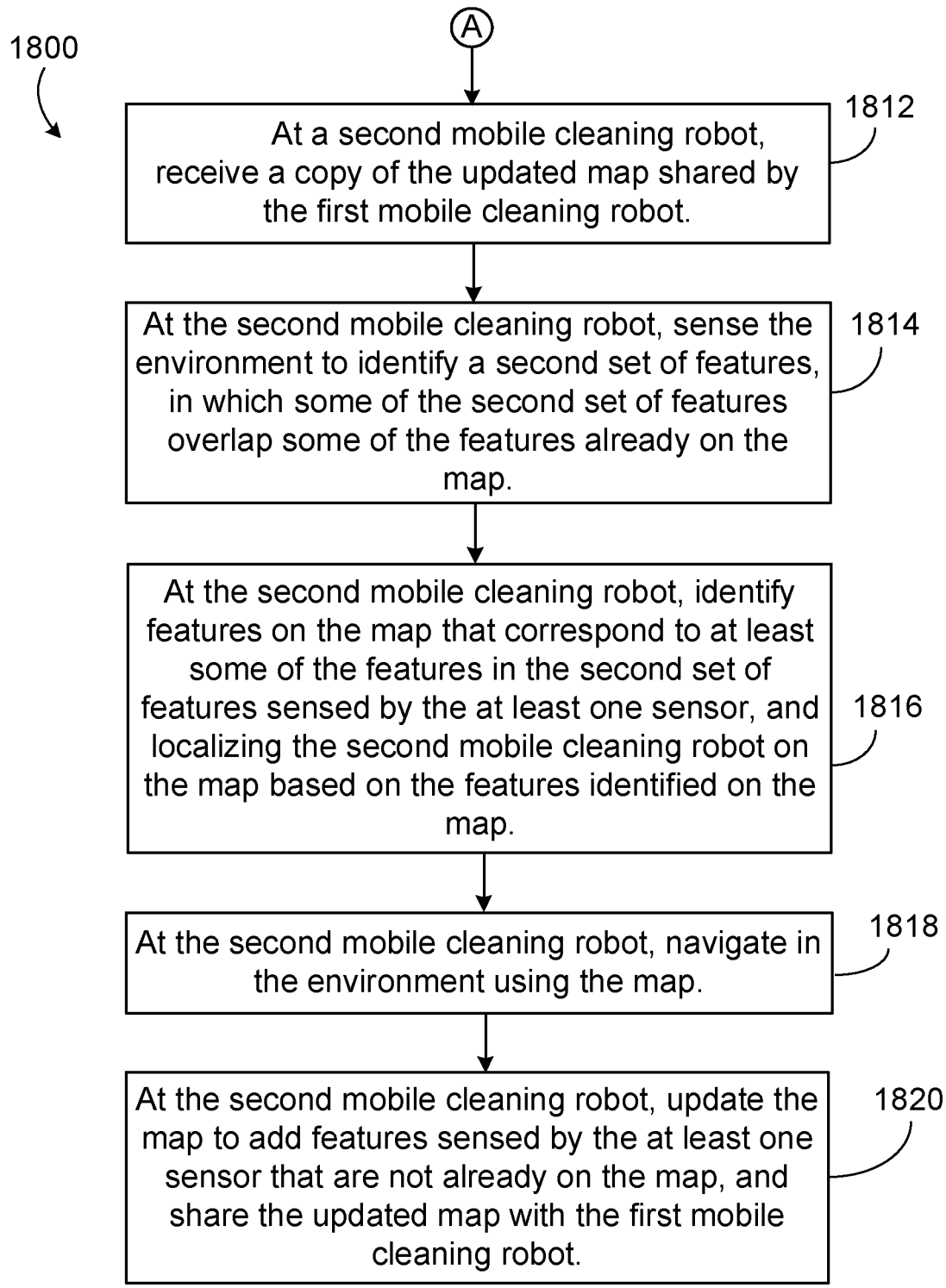

Referring to FIG. 18, an example process 1800 for operating multiple mobile robots having teaming capabilities is provided. For example, the mobile robots can be mobile cleaning robots, such as the robots 102a, 102b of FIG. 1 or the robots 202a, 202b of FIG. 2. The process 1800 includes, at a first mobile cleaning robot, generating or receiving 1802 a map of an environment. For example, the first mobile cleaning robot can be the first mobile robot 102a or 202a. The map can be the persistent map 110.

The process 1800 includes, at the first mobile cleaning robot, navigating 1804 in the environment using the map and perform a cleaning task. For example, the first mobile robot 102a or 202a can navigate in the home 300, 400 using the map 110 and perform a cleaning task in the home 300, 400.

The process 1800 includes, at the first mobile cleaning robot, sensing 1806 the environment to identify a first set of features in the environment. For example, the first mobile robot 102a, 202a can capture images of the home 300 and identify objects in the home 300.

The process 1800 includes, at the first mobile cleaning robot, updating 1808 the map to add features sensed by the at least one sensor that are not already on the map. For example, the mobile robot 102a, 202a can detect new objects such as furniture in the home 300 that are not already on the map 110, and update the map 110 to add information about the new objects (e.g., new furniture).

The process 1800 includes, at the first mobile cleaning robot, sharing 1810 the updated map with one or more other mobile cleaning robots.

The process 1800 includes, at a second mobile cleaning robot, receiving 1812 a copy of the updated map shared by the first mobile cleaning robot.

The process 1800 includes, at the second mobile cleaning robot, sensing 1814 the environment to identify a second set of features, in which some of the second set of features overlap some of the features already on the map. For example, the second robot 102*a* may identify furniture items that are already on the map 110.

The process 1800 includes, at the second mobile cleaning robot, identifying 1816 features on the map that correspond to at least some of the features in the second set of features sensed by the at least one sensor, and localizing the second mobile cleaning robot on the map based on the features identified on the map. For example, the second robot 102*a* may compare the locations of the furniture items that it has identified, with the locations on the furniture on the map 110, to assist in determining the location of the robot 102 on the map.

The process 1800 includes, at the second mobile cleaning robot, navigating 1818 in the environment using the map.

The process 1800 includes, at the second mobile cleaning robot, updating the map to add features sensed by the at least one sensor that are not already on the map, and sharing the updated map with the first mobile cleaning robot.

Figure 19:
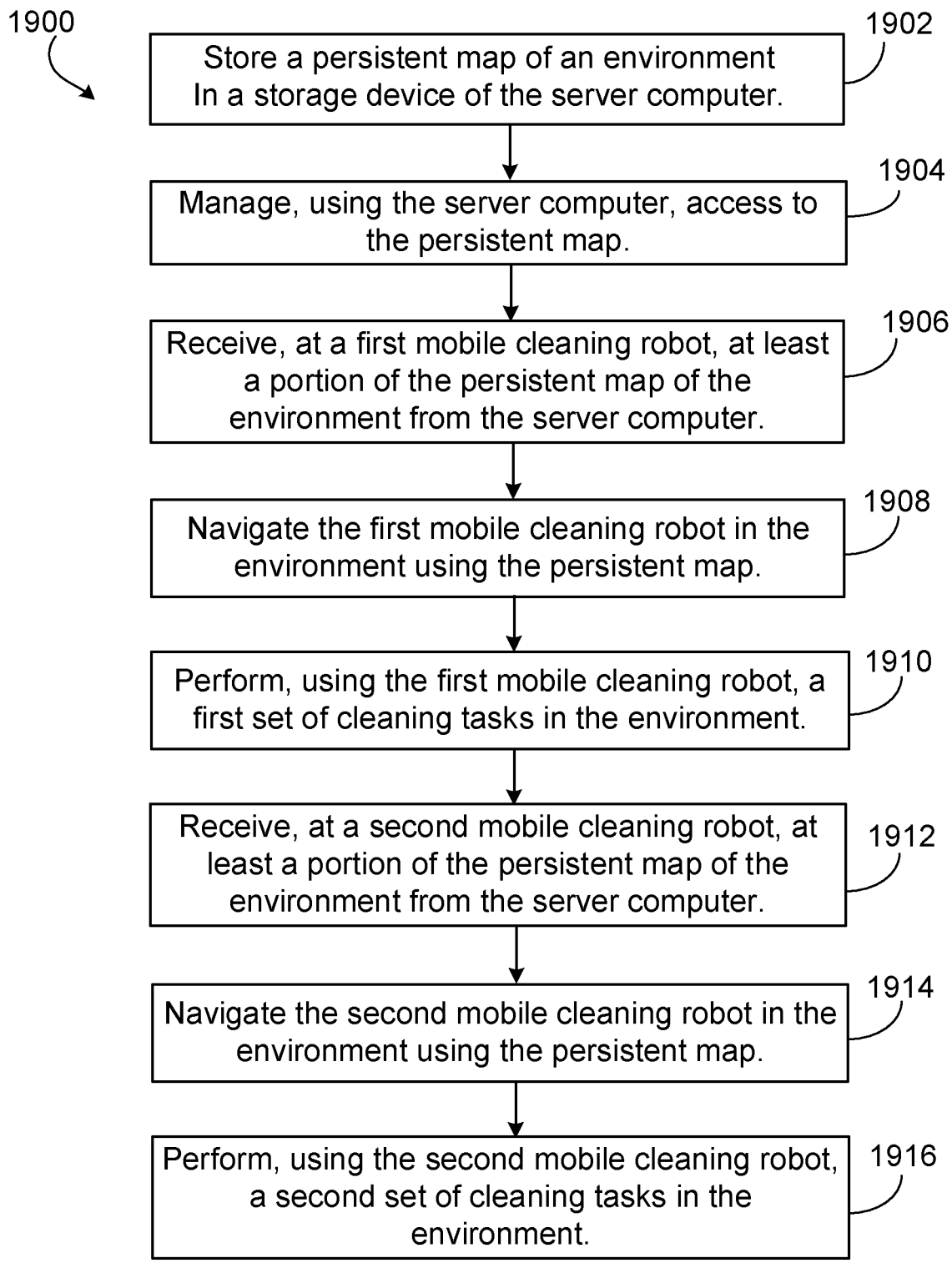

Referring to FIG. 19, an example process 1900 for operating multiple mobile robots having teaming capabilities is provided. For example, the mobile robots can be mobile cleaning robots, such as the robots 102*a*, 102*b* of FIG. 1 or the robots 202*a*, 202*b* of FIG. 2. The process 1900 includes storing 1902 a persistent map of an environment in a storage device of the server computer.

The process 1900 includes managing 1904, using the server computer, access to the persistent map.

The process 1900 includes receiving 1906, at a first mobile cleaning robot, at least a portion of the persistent map of the environment from the server computer.

The process 1900 includes navigating 1908 the first mobile cleaning robot in the environment using the persistent map.

The process 1900 includes performing 1910, using the first mobile cleaning robot, a first set of cleaning tasks in the environment.

The process 1900 includes receiving 1912, at a second mobile cleaning robot, at least a portion of the persistent map of the environment from the server computer.

The process 1900 includes navigating 1914 the second mobile cleaning robot in the environment using the persistent map.

The process 1900 includes performing 1916, using the second mobile cleaning robot, a second set of cleaning tasks in the environment.

Figure 20:
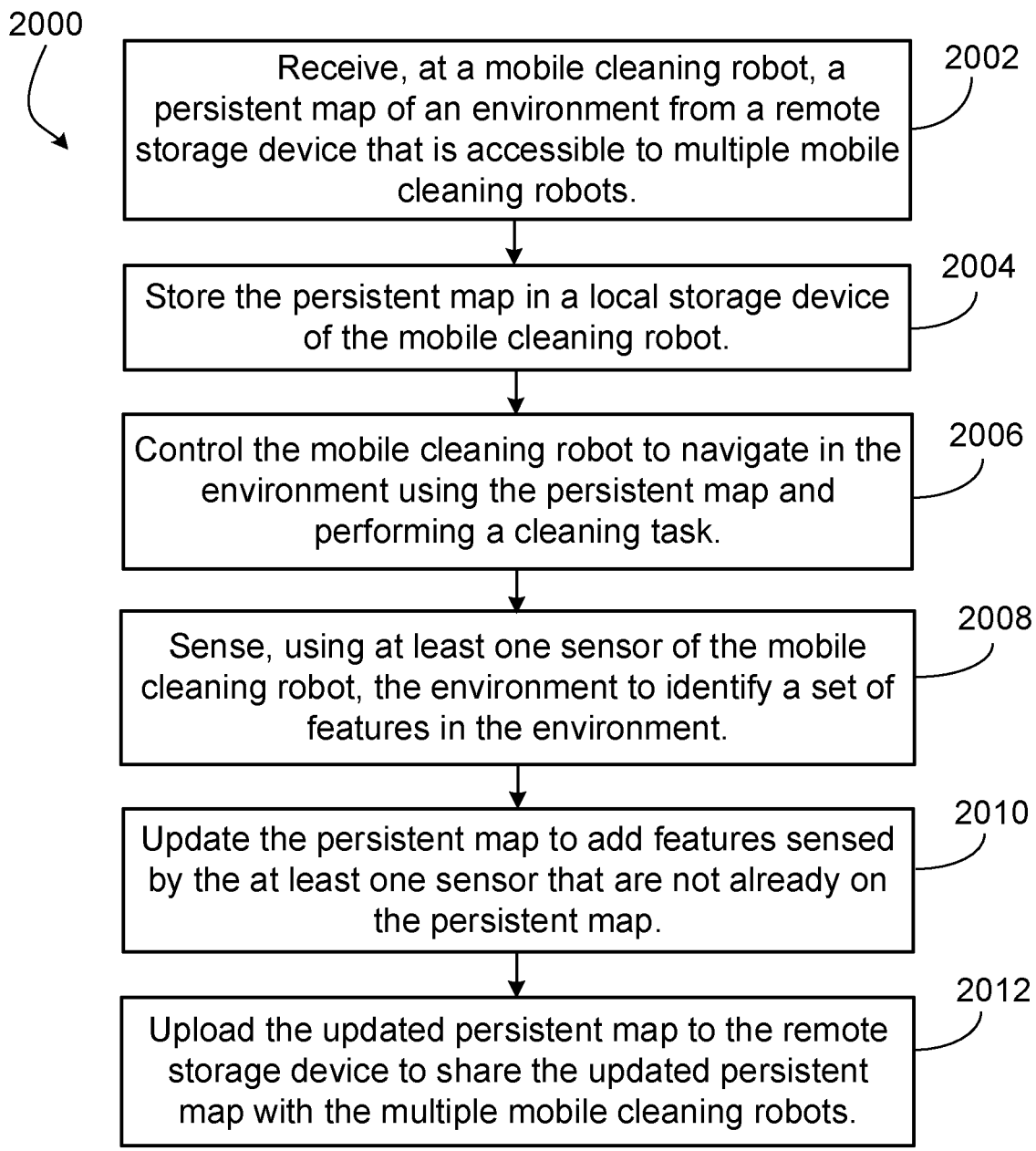
FIG. 20 is a flow diagram of an example process for operating a mobile cleaning robot capable of updating a persistent map.

Referring to FIG. 20, an example process 2000 for operating a mobile robot having teaming capabilities is provided. For example, the mobile robot can be a mobile cleaning robot, such as the robot 102*a* or 102*b* of FIG. 1 or the robot 202*a* or 202*b* of FIG. 2. The process 2000 includes receiving 2002, at a mobile cleaning robot, a persistent map of an environment from a remote storage device that is accessible to multiple mobile cleaning robots.

The process 2000 includes storing 2004 the persistent map in a local storage device of the mobile cleaning robot.

The process 2000 includes controlling 2006 the mobile cleaning robot to navigate in the environment using the persistent map and performing a cleaning task.

The process 2000 includes sensing 2008, using at least one sensor of the mobile cleaning robot, the environment to identify a set of features in the environment.

The process 2000 includes updating 2010 the persistent map to add features sensed by the at least one sensor that are not already on the persistent map.

The process 2000 includes uploading 2012 the updated persistent map to the remote storage device to share the updated persistent map with other mobile cleaning robots.

Figure 21:
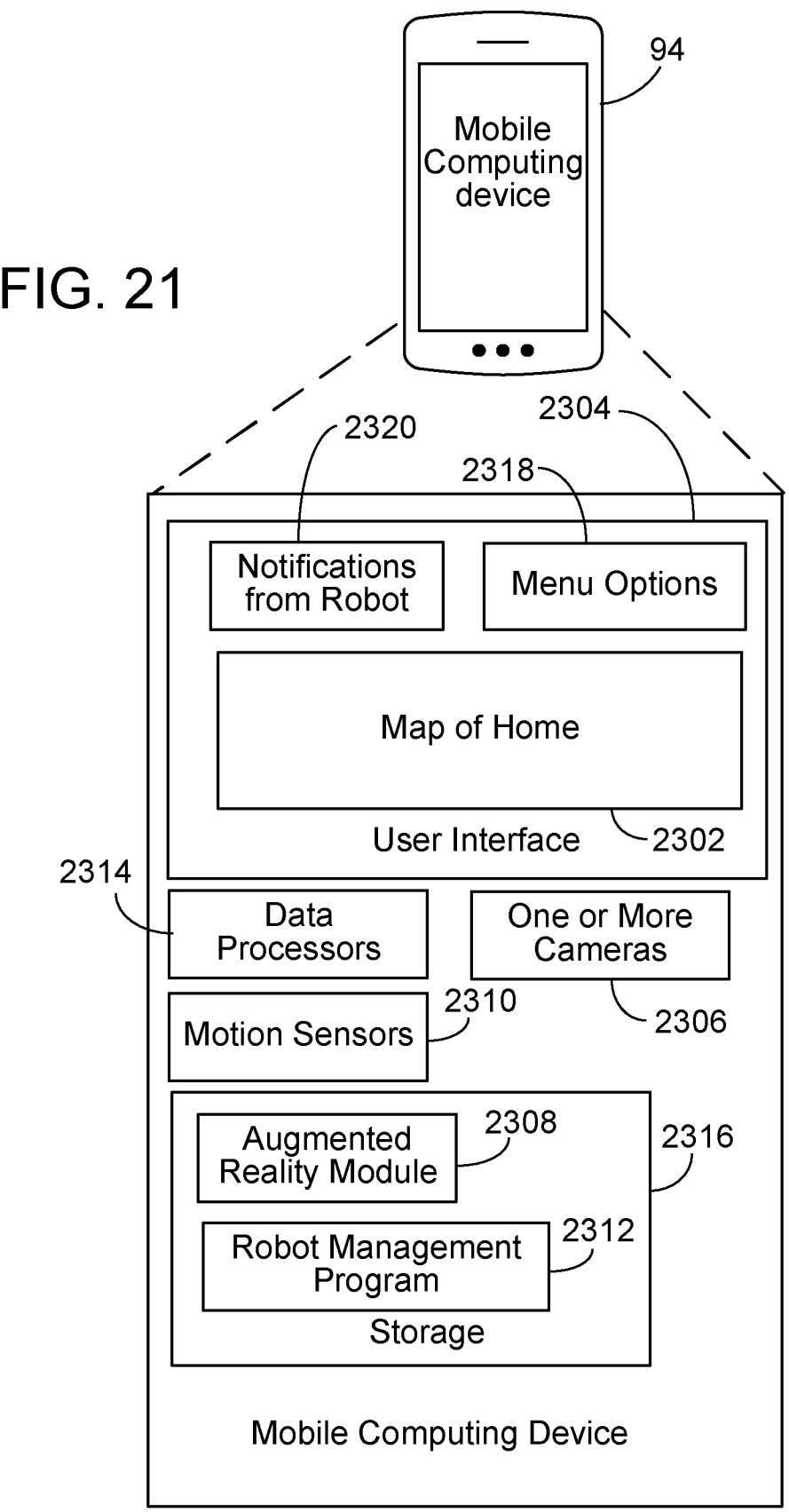
FIG. 21 is a block diagram of an example mobile computing device.

Referring to FIG. 21, in some implementations, the mobile computing device 94 can be, e.g., a mobile phone, a tablet computer, or a wearable computing device, such as smart glasses. The mobile computing device 94 includes one or more data processors 2314, and one or more cameras 2306. Each camera 2306 includes one or more image sensors that are sensitive to visible light and optionally, infrared light. The mobile computing device 94 includes one or more motion sensors 2310 that enable detection of the movement and orientation of the device 94.

The mobile computing device 94 includes a storage device 2316 storing program instructions for an augmented reality toolkit or module 2308 and program instructions for a mobile robot management program 2312. The robot management program 2312 enables the user to manage the operations of the robot 102 or 202, such as scheduling cleaning tasks to be performed by the robot 102 or 202, or modifying the map 2302 such as adding labels to objects in the map 2302. The augmented reality module 2308 provides tools that allow the user to identify objects in the environment in an augmented reality session. Information about the identification of various objects can be sent to the mobile robot 102 or 202.

Each of the mobile computing device 94 and the mobile cleaning robot 102 has a wireless communication module, enabling the mobile computing device 94 to communicate with the mobile cleaning robot 102. The mobile computing device 94 includes a touch screen display showing a user interface 2304 that enables the user to manage the operations of the mobile robot 102. For example, the user interface 2304 can show a map 2302 of the home, in which the map 2302 is generated based on the persistent map 110 maintained by the mobile robot 102. The persistent map 110 includes a wealth of information that is useful for the robot 102 to navigate in the home and perform various tasks, but not all of the information in the persistent map 110 is useful to the user. Thus, the map 2302 can include a portion of the information from the persistent map 110, presented in a user-friendly manner.

For example, the map 2302 shown on the user interface 2304 can include an outline of the walls of the various rooms in the home, and representations of the doorways, the stairways, the furniture, and the appliances. The map 2302 can show the current location of the mobile robot 102 in the home. Additional useful information can be overlaid on the map 2302, such as the regions that have been recently cleaned by the robot 102, or conditions that prevent the robot 102 from performing the assigned tasks. The user interface 2304 can show a menu 2318 having selectable options, e.g., enabling the user to select operation modes of the robot 102. The user interface 2304 can show notifications 2320 from the robot 102, such as informing the user that a cleaning task has been completed, a particular room has been cleaned, or a condition that prevents a cleaning task from being performed.

The autonomous mobile robots described in this document can be controlled, at least in part, using one or more computer program products, e.g., one or more computer programs tangibly embodied in one or more information carriers, such as one or more non-transitory machine-readable media, for execution by, or to control the operation of, one or more data processing apparatus, e.g., a programmable processor, a computer, multiple computers, and/or programmable logic components.

Operations associated with controlling the autonomous mobile robots described in this document can be performed by one or more programmable processors executing one or more computer programs to perform the functions described in this document. A computer program can be written in any form of programming language, including compiled or interpreted languages, and it can be deployed in any form, including as a stand-alone program or as a module, component, subroutine, or other unit suitable for use in a computing environment. Control over all or part of the robots described in this document can be implemented using special purpose logic circuitry, e.g., an FPGA (field programmable gate array) and/or an ASIC (application-specific integrated circuit).

The controllers described in this document can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as hard drives, magnetic disks, magneto-optical disks, or optical disks. Machine-readable storage media suitable for embodying computer program instructions and data include various forms of non-volatile storage area, including by way of example, semiconductor storage devices, e.g., EPROM, EEPROM, and flash storage devices; magnetic disks, e.g., internal hard disks or removable disks; magneto-optical disks; and CD-ROM and DVD-ROM discs.

The processes for enabling robot artificial intelligence for situational awareness described above can be implemented using software for execution on one or more mobile computing devices, one or more mobile robots, and/or one or more remote computing devices. For instance, the software forms procedures in one or more computer programs that execute on one or more programmed or programmable computer systems, either in the mobile robots, the mobile computing devices, or remote computing systems (which may be of various architectures such as distributed, client/server, or grid), each including at least one processor, at least one data storage system (including volatile and non-volatile memory and/or storage elements), at least one wired or wireless input device or port, and at least one wired or wireless output device or port. The software may form one or more modules of a larger program, for example, that provides other services related to managing the operations of a home, such as cleaning sessions and security monitoring of the home.

The software may be provided on a medium, such as a CD-ROM, DVD-ROM, or Blu-ray disc, readable by a general or special purpose programmable computer or delivered (encoded in a propagated signal) over a network to the computer where it is executed. The functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the description have been described. Nevertheless, it will be understood that various modifications may be made without departing from the spirit and scope of the description. For example, some of the steps described above may be order independent, and thus can be performed in an order different from that described. It is to be understood that the foregoing description is intended to illustrate and not to limit the scope of the invention, which is defined by the scope of the appended claims.

The mobile robot 102a and 102b can also have the recognition module 206 (including the neural network 208), the learning module 210, and the additional sensors 212, similar to the mobile robots 202a and 202b.

The mobile computing device 94 can be, e.g., a smart watch, a smart camera, a smart goggle, or any other portable device that is capable of performing the functions of the mobile computing device described above. The user 10 can identify the objects using various methods. For example, the user may have a home robot and a mobile cleaning robot. The home robot may move about in the home and interact with the user using natural language. The home robot may provide security monitor functions and other services, such as playing music, answering user questions, setting up user calendar, and controlling various devices in the home. The user can point to an object and speak to the home robot: "This is a chair." The home robot has a camera and can recognize the object (e.g., chair) pointed out by the user, determine the coordinates of the object, and send the information about the coordinates and the label (e.g., "Chair") to the mobile cleaning robot.

The recognition module 122 can be trained using various machine learning techniques. For example, supervised learning techniques may be implemented in which training is based on a desired output that is known for an input. Supervised learning can be considered an attempt to map inputs to outputs and then estimate outputs for previously unused inputs. Unsupervised learning techniques may also be used in which training is provided from known inputs but unknown outputs. Reinforcement learning techniques may also be employed in which the system can be considered as learning from consequences of actions taken (e.g., inputs values are known and feedback provides a performance measure). In some arrangements, the implemented technique may employ two or more of these methodologies.

As discussed above, neural network techniques can be implemented using images of various models of mobile cleaning robots to invoke training algorithms for automatically learning to identify the robots and their orientation angles. Such neural networks typically employ a number of layers. Once the layers and number of units for each layer is defined, weights and thresholds of the neural network are typically set to minimize the prediction error through training of the network. Such techniques for minimizing error can be considered as fitting a model (represented by the network) to the training data. A function may be defined that quantifies error (e.g., a squared error function used in regression techniques). By minimizing error, a first neural network may be developed that is capable of identifying an object (e.g., a chair or a robot), and a second neural network may be developed that is capable of determining the angle of orientation of the object. When training the second neural network for recognizing the angle of orientation, because the error in the orientation angle is cyclical (having a value in a range between 0 to 360°), a cyclical loss function such as (min(|Delta_error-360|,|360-Delta_error|)^2) can be used in training the neural network. Other factors may also be accounted for during neutral network development. For example, a model may too closely attempt to fit data (e.g., fitting a curve to the extent that the modeling of an overall function is degraded). Such overfitting of a neural network may occur during the model training and one or more techniques may be implemented to reduce its effects.

One or more techniques may be implemented for training the recognition module from the data calculated from the training images. For example, the neural network of the recognition module may be trained by defining a cost function from the calculated data. In general, the cost function can be considered as providing a measure of a solution compared to an optimal solution. For machine learning that employs supervised learning, a cost function can be considered to assist with mapping (e.g., by minimizing error) between an output and a target. Implementing unsupervised learning, a cost function can be defined (e.g., as a function of data) and minimized to provide an output value. Techniques involved in the training of artificial neural networks may also employ techniques that involve cost functions. For example, a cost function may be processed (e.g., compute a derivative) with respect to parameters of the function to determine output values. A regularization component can be added to the cost function to counteract over-fitting by the function. To assist with the machine learning, the costs function provides a cost along with a derivative.

Typically a series of training cycles are executed to prepare a machine learning system (e.g., the recognition module 122 in FIG. 2). Once training is complete, the system may be used for detecting objects in images, and orientation angles of the objects.

Deep machine learning may be utilized for the recognition module 122 in which a set of algorithms attempt to model high-level abstractions in data by using model architectures, with complex structures or otherwise, composed of multiple non-linear transformations. Such deep learning techniques can be considered as being based on learning representations of data. The deep learning techniques can be considered as using a cascade of many layers of nonlinear processing units for feature extraction and transformation. The next layer uses the output from the previous layer as input. The algorithms may be supervised, unsupervised, or combinations of supervised and unsupervised. The techniques are based on the learning of multiple levels of features or representations of the data (e.g., features of mobile cleaning robots). Multiple layers of nonlinear processing units along with supervised or unsupervised learning of representations can be employed at each layer, with the layers forming a hierarchy from low-level to high-level features. By employing such layers, a number of parameterized transformations are used as data propagates from the input layer to the output layer.

Other embodiments are within the scope of the following claims.

What is claimed is:

1. A system comprising:
a mobile cleaning robot comprising:
a local storage device to store a persistent map representative of a configuration of an environment;
at least one sensor to sense the environment; and
a control module configured to:
control the mobile cleaning robot to navigate in the environment using the persistent map and sensing data provided by the at least one sensor,
transmit the persistent map representative of the configuration of the environment to a second mobile cleaning robot, and
coordinate with the second mobile cleaning robot to perform cleaning tasks.

2. The system of claim 1 in which the control module is configured to:
control the at least one sensor to sense the environment to identify a set of features in the environment,
update the persistent map to add representations of the features sensed by the at least one sensor that are not already on the persistent map, and
transmit the updated persistent map to the second mobile cleaning robot.

3. The system of claim 1 in which the mobile cleaning robot is configured to:
perform multiple cleaning sessions, and prior to the start of each cleaning session, receive at least one of a version of the persistent map or a persistent map update from a remote storage device, and perform at least one of (i) store the received persistent map in the local storage device, or (ii) update a locally stored persistent map using the received persistent map update; and
during each cleaning session, localize the second mobile cleaning robot on the persistent map, sense features in the environment, update the persistent map to add representations of the features sensed by the second mobile cleaning robot that are not already on the map, and store the updated persistent map in the remote storage device.

4. A system comprising:
a server computer comprising:
a storage device configured to store at least one of multiple versions of a persistent map of an environment or multiple versions of a persistent map update for the environment; and
one or more data processors configured to execute instructions to perform:
managing the at least one of the multiple versions of the persistent map or multiple versions of the persistent map update;
upon receiving a request from a first mobile cleaning robot requesting access to the persistent map or the persistent map update, providing one of the versions of the persistent map or the persistent map update to the first mobile cleaning robot; and
upon receiving a request from a second mobile cleaning robot requesting access to the persistent map or the persistent map update, providing one of the versions of the persistent map or the persistent map update to the second mobile cleaning robot.

5. The system of claim 4 in which the server computer is configured to provide a latest version of the persistent map or the persistent map update to each of the mobile cleaning robots upon receiving the request from the second mobile cleaning robot.

6. The system of claim 4 in which the server computer is configured to receive an updated persistent map or an additional persistent map update from the first mobile cleaning robot, and provide the updated persistent map or the additional persistent map update to the second mobile cleaning robot upon receiving the request from the second mobile cleaning robot.

7. The system of claim 4 in which the server computer is configured to receive a first updated persistent map or a first persistent map update from the first mobile cleaning robot, receive a second updated persistent map or a second persistent map update from the second mobile cleaning robot, and merge (i) the first updated persistent map or the first persistent map update with (ii) the second updated persistent map or the second persistent map update, to generate a new version of the persistent map or the persistent map update.

8. A system of mobile cleaning robots comprising:
a first mobile cleaning robot configured to navigate in an environment and perform a first set of cleaning tasks; and
a second mobile cleaning robot configured to navigate in the environment and perform a second set of cleaning tasks,
wherein the first mobile cleaning robot and the second mobile cleaning robot are configured to:
transmit, to each other, a persistent map for navigation, the persistent map being representative of a configuration of the environment, and
coordinate with each other when performing the first set of cleaning tasks and the second set of cleaning tasks.

9. The system of claim 8 in which the first mobile cleaning robot and the second mobile cleaning robot communicates directly with each other to coordinate performance of the first set of cleaning tasks and the second set of cleaning tasks.

10. The system of claim 8, comprising a central server, in which each of the first mobile cleaning robot and the second mobile cleaning robot communicates with the central server, and the central server coordinates the first mobile cleaning robot and the second mobile cleaning robot in performing the first set of cleaning tasks and the second set of cleaning tasks.

11. The system of claim 8 in which the first mobile cleaning robot is configured to perform a first cleaning task that cleans a first portion of the environment, end the cleaning task at a first location, and provide coordinates of the first location to the second mobile cleaning robot, and
the second mobile cleaning robot is configured to, upon receiving the coordinates of the first location, perform a second cleaning task starting from the first location, the second cleaning task involving cleaning a second portion of the environment.

12. The system of claim 8 in which the first mobile cleaning robot and the second mobile cleaning robot are configured to perform a first cleaning task and a second cleaning task, respectively, in parallel, wherein the first cleaning task involves cleaning a first portion of the environment, and the second cleaning task involves cleaning a second portion of the environment.

13. The system of claim 8 in which the first mobile cleaning robot has a first type of cleaning head, the second mobile cleaning robot has a second type of cleaning head,
the first mobile cleaning robot is configured to clean a first region in the environment using the first type of cleaning head, send a message indicating that the first region has been cleaned, and clean a second region in the environment after cleaning the first region, and
the second mobile cleaning robot is configured to, after receive a message indicating that the first region has been cleaned, clean the first region using the second type of cleaning head while the first mobile cleaning robot cleans the second region.

14. The system of claim 8, comprising a server computer configured to:
manage multiple versions of the persistent map or multiple versions of a persistent map update, the server computer having a storage device to store the multiple versions of the persistent map or the multiple versions of the persistent map update;
upon receiving a request from the first mobile cleaning robot requesting access to the persistent map or the persistent map update, providing one of the versions of the persistent map or the persistent map update to the first mobile cleaning robot; and
upon receiving a request from the second mobile cleaning robot requesting access to the persistent map or the persistent map update, providing one of the versions of the persistent map or the persistent map update to the second mobile cleaning robot.

15. The system of claim 14 in which the server computer is configured to provide a latest version of the persistent map or the persistent map update to the first mobile cleaning robot upon receiving the request from the first mobile cleaning robot.

16. The system of claim 14 in which the server computer is configured to receive an updated persistent map or an additional persistent map update from the first mobile cleaning robot, and provide the updated persistent map or the additional persistent map update to the second mobile cleaning robot upon receiving the request from the second mobile cleaning robot.

17. The system of claim 14 in which the server computer is configured to receive a first updated persistent map or a first persistent map update from the first mobile cleaning robot, receive a second updated persistent map or a second persistent map update from the second mobile cleaning robot, and merge (i) the first persistent map or the first persistent map update with (ii) the second updated persistent map or the second persistent map update, to generate a new version of the persistent map or a new persistent map update.

18. A system of mobile cleaning robots comprising:
a first mobile cleaning robot comprising:
at least one first sensor; and
a first control module configured to:
generate or receive a map representative of a configuration of an environment,
control the first mobile cleaning robot to navigate in the environment using the map and perform a cleaning task,
control the at least one first sensor to sense the environment to identify a first set of features in the environment,
update the map to add features sensed by the at least one first sensor that are not already on the map, and
transmit the updated map to one or more other mobile cleaning robots; and
a second mobile cleaning robot comprising:
at least one second sensor; and
a second control module configured to:
receive a copy of the updated map transmitted by the first mobile cleaning robot,
control the at least one second sensor to sense the environment to identify a second set of features, in which some of the second set of features overlap some of the features already on the map,
identify features on the map that correspond to at least some of the features in the second set of features sensed by the at least one second sensor, and localize the second mobile cleaning robot on the map based on the features identified on the map, control the second mobile cleaning robot to navigate in the environment using the map, and update the map to add features sensed by the at least one second sensor that are not already on the map, and transmit the updated map to the first mobile cleaning robot.

19. The system of claim 18, comprising a remote storage device configured to store one or more versions of the map, wherein the first mobile cleaning robot comprises a first local storage device to locally store a copy of at least a portion of the map while the first mobile cleaning robot navigates in the environment, the first control module is configured to transmit the updated map by uploading the updated map to the remote storage device.

20. The system of claim 19, comprising a user interface to enable a user to configure the map stored in the first local storage device to add a keep-out zone to the map to generate an additional updated map, wherein the first mobile cleaning robot is configured to upload the additional updated map to the remote storage device, the second mobile cleaning robot is configured to download the additional updated map from the remote storage device, and the second mobile cleaning robot is configured to perform cleaning tasks taking into account of the keep-out zone.

21. The system of claim 18 in which the first and second mobile cleaning robots are configured to coordinate with each other when performing cleaning tasks.

22. The system of claim 18 in which the first mobile cleaning robot and the second mobile cleaning robot have different capabilities such that a first portion of the environment represented by a first portion of the map is reachable by the first mobile cleaning robot but not by the second mobile cleaning robot.

23. The system of claim 18 in which the at least one sensor comprises at least one camera, and the first set of features comprises a set of visual landmarks sensed by the at least one camera.

24. The system of claim 18, comprising a computer configured to provide a user interface to enable a user to configure and modify the map.

25. The system of claim 24 in which the user interface is configured to enable the user to label each of a plurality of rooms in the environment, and the same label for each room is shared by the first mobile cleaning robot and the second mobile cleaning robot.

26. The system of claim 25 in which the user interface is configured to enable the user to perform at least one of (i) instruct one of the first mobile cleaning robot or the second mobile cleaning robot to clean a particular room, or (ii) instruct both the first mobile cleaning robot and the second mobile cleaning robot to clean a particular room in parallel.

27. The system of claim 24 in which the user interface is configured to enable the user to perform at least one of (i) identify a border, or (ii) modify a border, of each of a plurality of rooms in the environment.

28. A method comprising:

storing, at a local storage device of a mobile cleaning robot, a persistent map representative of a configuration of an environment;

sensing, using at least one sensor of the mobile cleaning robot, the environment to generate sensing data;

navigating, using one or more data processors of the mobile cleaning robot, in the environment using the persistent map and the sensing data;

transmitting the persistent map to a second mobile cleaning robot; and coordinating with the second mobile cleaning robot to perform cleaning tasks.

29. The method of claim 28, comprising sensing, using the at least one sensor, the environment to identify a set of features in the environment, updating the persistent map to add representations of the features sensed by the at least one sensor that are not already on the persistent map, and transmitting the updated persistent map to the second mobile cleaning robot.

30. The method of claim 28, comprising:

performing, using the mobile cleaning robot, multiple cleaning sessions, and prior to the start of each cleaning session, receiving at least one of a version of the persistent map or a persistent map update from a remote storage device, and performing at least one of (i) storing the received persistent map in the local storage device, or (ii) updating a locally stored persistent map using the received persistent map update; and during each cleaning session, localizing the mobile cleaning robot on the persistent map, sensing features in the environment, updating the persistent map to add representations of the features sensed by the mobile cleaning robot that are not already on the map, and storing the updated persistent map in the remote storage device.

* * * * *